United States Patent
Iguchi et al.

(10) Patent No.: US 10,361,801 B2
(45) Date of Patent: Jul. 23, 2019

(54) TRANSMISSION METHOD, TRANSMISSION APPARATUS AND SYSTEM

(71) Applicant: Panasonic Intellectual Property Management Co., Ltd., Osaka (JP)

(72) Inventors: Noritaka Iguchi, Osaka (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/478,387

(22) Filed: Apr. 4, 2017

(65) Prior Publication Data

US 2017/0207869 A1    Jul. 20, 2017

Related U.S. Application Data

(63) Continuation of application No. PCT/JP2015/004967, filed on Sep. 30, 2015.
(Continued)

(30) Foreign Application Priority Data

Sep. 17, 2015    (JP) .................................. 2015-184212

(51) Int. Cl.
*H04H 60/40*    (2008.01)
*H04N 21/236*    (2011.01)
(Continued)

(52) U.S. Cl.
CPC ............ *H04H 60/40* (2013.01); *H04H 20/95* (2013.01); *H04N 21/23605* (2013.01);
(Continued)

(58) Field of Classification Search
CPC ....... H04N 21/23605; H04N 21/23611; H04N 21/23614; H04N 21/23892; H04N 21/434;
(Continued)

(56) References Cited

U.S. PATENT DOCUMENTS

| | | | | |
|---|---|---|---|---|
| 2015/0229443 A1* | 8/2015 | Hwang | ............... | H04L 27/2602 370/474 |
| 2016/0088321 A1* | 3/2016 | Tsukagoshi | ........ | H04N 21/2387 725/25 |

(Continued)

FOREIGN PATENT DOCUMENTS

| | | |
|---|---|---|
| JP | 2015-216616 | 12/2015 |
| WO | 2010/106796 | 9/2010 |
| WO | 2014/196336 | 12/2014 |

OTHER PUBLICATIONS

International Search Report dated Dec. 22, 2015 in International (PCT) Application No. PCT/JP2015/004967.
(Continued)

*Primary Examiner* — Benjamin R Bruckart
*Assistant Examiner* — Tien M Nguyen
(74) *Attorney, Agent, or Firm* — Wenderoth, Lind & Ponack, L.L.P.

(57) ABSTRACT

A transmission method according to one aspect of the present disclosure is a transmission method for transmitting content through broadcasting, including: generating a plurality of frames for transfer, each of which includes a plurality of first transfer units in which the content is to be stored, each of the plurality of frames having a fixed length, each of the plurality of first transfer units having a variable length; and transmitting the plurality of frames generated. The generating includes sequentially placing the plurality of first transfer units into the plurality of frames, and in the placing, even when a data size of a current first transfer unit
(Continued)

to be processed is smaller than a remaining capacity of a current frame to be processed, the current first transfer unit is placed into a next frame.

9 Claims, 44 Drawing Sheets

Related U.S. Application Data

(60) Provisional application No. 62/062,430, filed on Oct. 10, 2014.

(51) Int. Cl.
*H04N 21/434* (2011.01)
*H04N 21/63* (2011.01)
*H04N 21/2389* (2011.01)
*H04H 20/95* (2008.01)
*H04N 21/643* (2011.01)

(52) U.S. Cl.
CPC . *H04N 21/23611* (2013.01); *H04N 21/23614* (2013.01); *H04N 21/23892* (2013.01); *H04N 21/434* (2013.01); *H04N 21/631* (2013.01); *H04N 21/64322* (2013.01)

(58) Field of Classification Search
CPC ........... H04N 21/631; H04N 21/64322; H04H 60/40; H04H 20/95
See application file for complete search history.

(56) References Cited

U.S. PATENT DOCUMENTS

2016/0112731 A1 4/2016 Tsukagoshi
2017/0118317 A1* 4/2017 Hasegawa ............. H04L 69/326
2018/0019903 A1* 1/2018 Hwang ............... H04L 27/2627

OTHER PUBLICATIONS

Information technology—High efficiency coding and media delivery in heterogeneous environments—Part 1: MPEG media transport (MMT), ISO/IEC DIS 23008-1, Apr. 26, 2013.
English translation of Chapter 3: "Guideline for Time Information Transmission" in ARIB Standard ARIB STD-B44 (Ver. 2.0) "Transmission System for Advanced Wide Band Digital Satellite Broadcasting", Jul. 31, 2014.
Extended European Search Report dated Jul. 4, 2017 in corresponding European Application No. 15849580.4.
Full English translation: "Transmission System for Advanced Wide Band Digital Satellite Broadcasting" in ARIB Standard ARIB STD-B44 (Ver. 2.0), Jul. 31, 2014, 144 pgs., XP055314241.

* cited by examiner

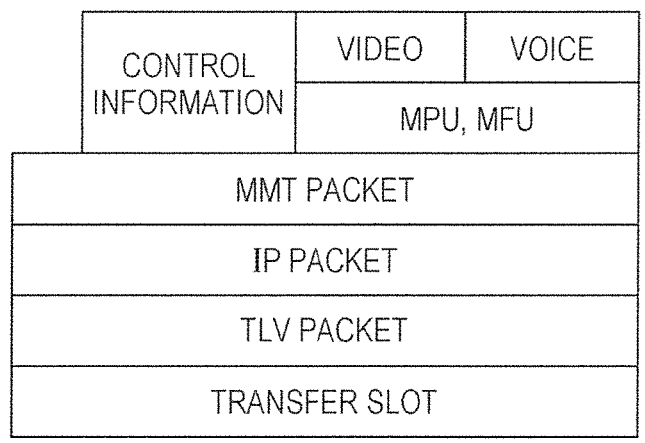

FIG. 9

DATA TYPE = LONG-FORMAT NTP, DATA LENGTH = 64 BITS

| DATA TYPE | DATA LENGTH | REFERENCE CLOCK INFORMATION |
|---|---|---|

FIG. 11

DATA TYPE = IP PACKET WITH REFERENCE CLOCK

| DATA TYPE | DATA LENGTH | REFERENCE CLOCK INFORMATION | IP PACKET |
|---|---|---|---|

FIG. 12

DATA TYPE = IP PACKET

| REFERENCE CLOCK INFORMATION | DATA TYPE | DATA LENGTH | IP PACKET |
|---|---|---|---|

FIG. 16

| CHANGE INSTRUCTION 8 | TRANSFER MODE/ SLOT INFORMATION 192 | STREAM CLASSIFICATION/ RELATIVE STREAM INFORMATION 128 | PACKET FORM/ RELATIVE STREAM INFORMATION 896 | POINTER/ SLOT INFORMATION 3840 | RELATIVE STREAM/ SLOT INFORMATION 480 | RELATIVE STREAM/ TRANSFER STREAM ID CORRESPONDENCE TABLE INFORMATION 256 | TRANSMISSION-RECEPTION CONTROL INFORMATION 8 | EXTENSION INFORMATION 3614 |

FIG. 17

| STREAM CLASSIFICATION OF RELATIVE STREAM 0 8 | STREAM CLASSIFICATION OF RELATIVE STREAM 1 8 | STREAM CLASSIFICATION OF RELATIVE STREAM 2 8 | STREAM CLASSIFICATION OF RELATIVE STREAM 3 8 | ... | STREAM CLASSIFICATION OF RELATIVE STREAM 12 8 | STREAM CLASSIFICATION OF RELATIVE STREAM 13 8 | STREAM CLASSIFICATION OF RELATIVE STREAM 14 8 | STREAM CLASSIFICATION OF RELATIVE STREAM 15 8 |
| --- | --- | --- | --- | --- | --- | --- | --- | --- |

*FIG. 18*

| HEAD TLV INSTRUCTION | REFERENCE CLOCK INFORMATION | UNDEFINED |
|---|---|---|

FIG. 22A

| EXTENSION IDENTIFICATION 16 | EXTENSION AREA 3598 |

FIG. 22B

| NUMBER OF PAGES 16 | PAGE NUMBER 16 | ADDITIONAL INFORMATION CLASSIFICATION 8 | OBJECT SERVICE SPECIFICATION METHOD 8 | ADDITIONAL INFORMATION PAYLOAD 3550 |

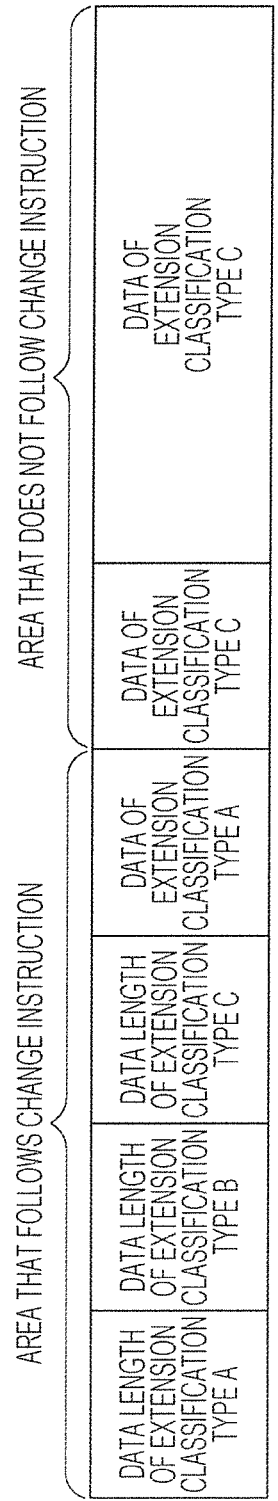

FIG. 24A

```
EXTENSION AREA(){
    EXTENSION CLASSIFICATION: TYPE A DATA LENGTH NA
    EXTENSION CLASSIFICATION: TYPE B DATA LENGTH NB
    EXTENSION CLASSIFICATION: TYPE C DATA LENGTH NC for(i=0; i<NA; i++){
        EXTENSION CLASSIFICATION: TYPE A DATA
    }
    for(i=0; i<NB; i++){
        EXTENSION CLASSIFICATION: TYPE B DATA
    }
    for(i=0; i<NC; i++){
        EXTENSION CLASSIFICATION: TYPE C DATA
    }
}
```

FIG. 24B

```
EXTENSION AREA(){
    EXTENSION AREA NUMBER
    for(i=0; i<EXTENSION AREA NUMBER; i++){
        EXTENSION CLASSIFICATION
        EXTENSION AREA LENGTH
    }
    for(i=0; i<EXTENSION AREA NUMBER; i++){
        EXTENSION DATA
    }
}
```

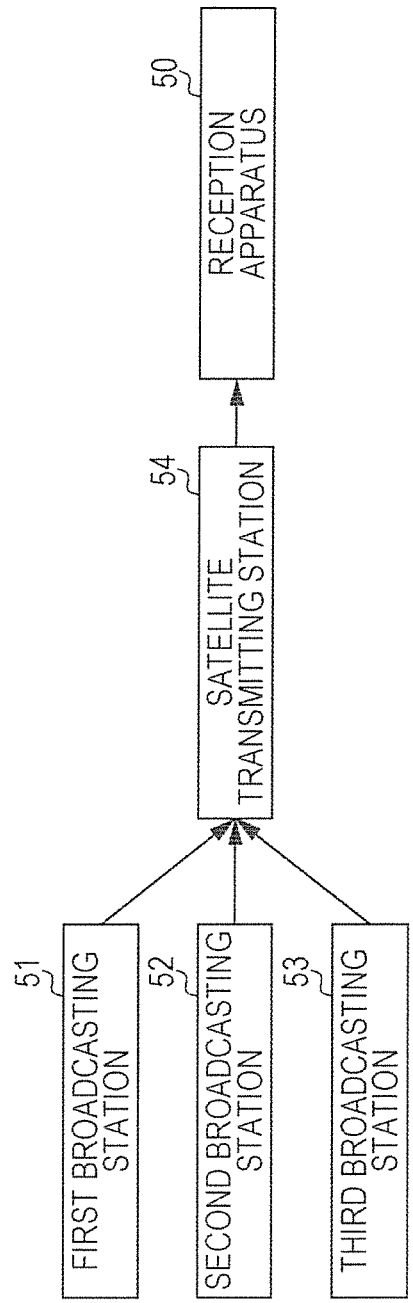

FIG. 31

| FRAME #n | BASE REFERENCE CLOCK INFORMATION | FIRST DIFFERENCE INFORMATION |
|---|---|---|
| FRAME #n+1 | BASE REFERENCE CLOCK INFORMATION | SECOND DIFFERENCE INFORMATION |
| FRAME #n+2 | BASE REFERENCE CLOCK INFORMATION | THIRD DIFFERENCE INFORMATION |

TRANSMISSION METHOD, TRANSMISSION APPARATUS AND SYSTEM

CROSS REFERENCE TO RELATED APPLICATIONS

This application is a U.S. continuation application of PCT International Patent Application Number PCT/JP2015/004967 filed on Sep. 30, 2015, claiming the benefit of priority of Japanese Patent Application Number 2015-184212 filed on Sep. 17, 2015, and U.S. Provisional Application No. 62/062,430 filed on Oct. 10, 2014, the entire contents of which are hereby incorporated by reference.

BACKGROUND

1. Technical Field

The present disclosure relates to a transmission method, a transmission apparatus and a system.

2. Description of the Related Art

An MMT (MPEG Media Transport) scheme (refer to NPL 1; Information technology-High efficiency coding and media delivery in heterogeneous environments-Part 1; MPEG media transport (MMT), ISO/IEC DIS 23008-1) is a multiplexing scheme for multiplexing and packetizing content such as video and voice and for transmitting the content through one or more transfer channels such as broadcast and broadband. When the MMT scheme is applied to broadcasting systems, reference clock information of a transmission apparatus is transmitted to a reception apparatus, and the reception apparatus generates a system clock in the reception apparatus based on the reference clock information.

SUMMARY

A transmission method according to one aspect of the present disclosure is a transmission method for transmitting content through broadcasting which includes generating a plurality of frames for transfer, each of which includes a plurality of first transfer units in which the content is to be stored, each of the plurality of frames having a fixed length, each of the plurality of first transfer units having a variable length; and transmitting the plurality of frames generated. The generating includes sequentially placing the plurality of first transfer units into the plurality of frames, and in the placing, even when a data size of a current first transfer unit to be processed is smaller than a remaining capacity of a current frame to be processed, the current first transfer unit is placed into a next frame.

It should be noted that general or specific embodiments may be implemented as a system, a method, an integrated circuit, a computer program, a storage medium, or any selective combination thereof.

BRIEF DESCRIPTION OF DRAWINGS

FIG. 1 is a diagram illustrating a protocol stack for performing transfer using an MMT scheme and an advanced BS transfer scheme;

FIG. 2 is a diagram illustrating data structure of a TLV packet;

FIG. 9 is a diagram illustrating an example in which a long-format NTP is stored in the TLV packet;

FIG. 11 is a diagram illustrating structure in which the reference clock information is appended immediately before an IP packet header;

FIG. 12 is a diagram illustrating structure in which the reference clock information is appended immediately before the TLV packet;

FIG. 16 is a diagram illustrating structure of TMCC control information under a transfer scheme for advanced broadband satellite digital broadcast;

FIG. 17 is a diagram illustrating stream classification/relative stream information of the TMCC control information;

FIG. 18 is a diagram illustrating an example in which the reference clock information is stored in an undefined field of the slot header;

FIG. 22A is a diagram illustrating an example of structure of TMCC extension information;

FIG. 22B is a diagram illustrating another example of structures of TMCC extension information;

FIG. 23 is a diagram illustrating an example of data structure of an extension area in which an extension classification classified in this way is used;

FIG. 24A is a diagram illustrating an example of syntax when the extension classification is used;

FIG. 24B is a diagram illustrating another example of syntax when the extension classification is used;

FIG. 29 is a block diagram for describing an example in which pieces of data of different broadcasting station apparatuses are stored in separate streams;

FIG. 30 is a diagram for describing a transmission method of difference information;

FIG. 31 is a diagram for describing a variation of the transmission method of the difference information;

Figure 3:
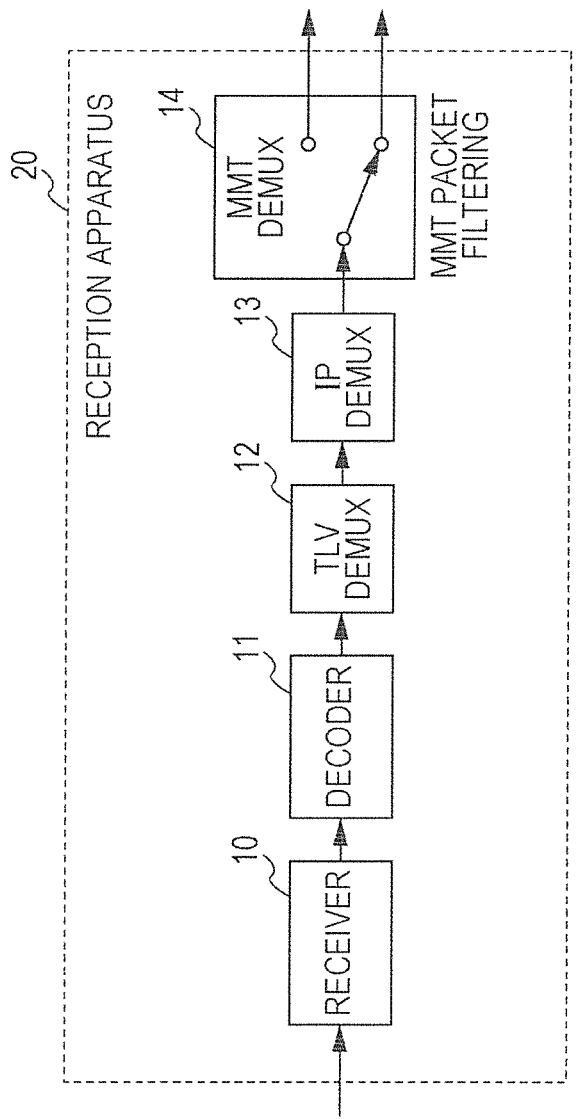
FIG. 3 is a block diagram illustrating a basic configuration of a reception apparatus.

DETAILED DESCRIPTION OF THE EMBODIMENTS (Underlying Knowledge Forming Basis of the Present Disclosure)

The present disclosure relates to a method and apparatus in which a reception apparatus receives reference clock information transmitted from a transmission apparatus and generates (reproduces) a reference clock in a hybrid delivery system using an MMT (MPEG Media Transport) scheme which is under standardization by MPEG (Moving Picture Expert Group).

The MMT scheme is a multiplexing scheme for multiplexing and packetizing video and voice to transmit the video and voice via one or more transfer channels, such as broadcast and broadband.

When the MMT scheme is applied to a broadcasting system, the reference clock of the transmission apparatus is synchronized with an NTP (Network Time Protocol) prescribed by IETF RFC 5905, and based on the reference clock, a time stamp such as PTS (Presentation Time Stamp) and DTS (Decode Time Stamp) is added to a medium. Furthermore, the transmission apparatus transmits the reference clock information to the reception apparatus, and the reception apparatus generates the reference clock (hereinafter referred to as a system clock) in the reception apparatus based on the reference clock information.

In the broadcasting system, a 64-bit long-format NTP capable of indicating absolute time is preferably used as the reference clock information. However, although the conventional MMT scheme prescribes storing a 32-bit short-format NTP in an MMT packet header and transferring the 32-bit short-format NTP, the conventional MMT scheme does not prescribe transferring the long-format NTP, and it is difficult for a reception apparatus to acquire high-precision reference clock information.

In contrast, control information, such as a message, a table, and a descriptor, is defined using the long-format NTP. It is possible to append the MMT packet header to the control information for transfer. An MMT packet, which is the control information to which the MMT packet header is appended, is stored in an IP packet, and is transferred through a broadcast transfer channel or a broadband transfer channel.

When the MMT packet is transferred using an advanced BS transfer scheme prescribed by the ARIB standard (STD-B44: transfer scheme of an advanced broadband satellite digital broadcast), after encapsulation of the MMT packet into the IP packet and encapsulation of the IP packet into a TLV (Type Length Value) packet, the MMT packet is stored in a transfer slot prescribed by the advanced BS transfer scheme.

However, when the transmission apparatus stores the reference clock information in an MMT packet layer, in order to obtain the reference clock information, the reception apparatus extracts the TLV packet from the transfer slot, extracts the IP packet from the TLV packet, extracts the MMT packet from the IP packet, and further extracts the reference clock information from the header or a payload of the MMT packet. Therefore, the reception apparatus involves many processes for acquiring the reference clock information, and needs longer time until the acquisition.

In addition, processes in layers equal to or higher than an IP layer are software processes. Accordingly, when the reference clock information is stored in the MMT packet, the reference clock information is extracted and reproduced by a software program. Therefore, the reference clock information to be acquired may contain jitter depending on throughput of a CPU, interruption by and priority of other software programs, and the like.

Moreover, when a TLV packet is placed across transfer frames, a problem is that the processing in the reception apparatus becomes complicated. Particularly, in the case where the TLV packet that includes data of predetermined type is always placed in a head of a transfer frame, the problem becomes significant when a normal TLV packet is placed across this packet.

A transmission method according to one aspect of the present disclosure is a transmission method for transmitting content through broadcasting which includes generating a plurality of frames for transfer, each of which includes a plurality of first transfer units in which the content is to be stored, each of the plurality of frames having a fixed length, each of the plurality of first transfer units having a variable length; and transmitting the plurality of frames generated. The generating includes sequentially placing the plurality of first transfer units into the plurality of frames, and in the placing, even when a data size of a current first transfer unit to be processed is smaller than a remaining capacity of a current frame to be processed, the current first transfer unit is placed into a next frame.

With this method, it is possible to prevent a first transfer unit from being placed across the frames. Therefore, the amount of processing performed by the reception apparatus can be reduced.

For example, a minimum data size may be defined for the first transfer unit, and in the generating, when a remaining capacity after the placement of the current first transfer unit into the current frame is smaller than the minimum data size, the current first transfer unit may be placed into the next frame.

With this feature, it is possible to prevent a first transfer unit from being placed across the frames even when a minimum data size is defined for the first transfer unit.

For example, in the generating, when the current first transfer unit is placed into the next frame, a NULL packet may be placed into a remaining part of the current frame.

For example, in the generating: a clock transfer unit which is a first transfer unit containing reference clock information may be placed as a first transfer unit positioned at a head of each frame; and when the current first transfer unit is placed into the next frame, the current first transfer unit may be placed immediately after the clock transfer unit of the next frame.

For example, the reference clock information may be a Network Time Protocol (NTP).

For example, each of the plurality of first transfer units may include an Internet Protocol (IP) packet in which the content is to be stored.

For example, the content may be stored in an MPEG Media Transport (MMT) packet in the IP packet.

For example, each of the plurality of frames may include a plurality of second transfer units each having a fixed length, and each of the plurality of second transfer units may include one or more of the plurality of first transfer units.

For example, each of the plurality of first transfer units may be a Type Length Value (TLV) packet, each of the plurality of second transfer units may be a slot under an advanced BS transfer scheme, and each of the plurality of frames may be a transfer slot under the advanced BS transfer scheme.

A transmission apparatus according to one aspect of the present disclosure is a transmission apparatus which transmits content through broadcasting, including: a generator which generates a plurality of frames for transfer, each of which includes a plurality of first transfer units in which the content is to be stored, each of the plurality of frames having a fixed length, each of the plurality of first transfer units having a variable length; and a transmitter which transmits the plurality of frames generated. The generator sequentially places the plurality of first transfer units into the plurality of frames, and in the placement, even when a data size of a current first transfer unit to be processed is smaller than a remaining capacity of a current frame to be processed, the current first transfer unit is placed into a next frame.

With such apparatus, it is possible to prevent a first transfer unit from being placed across the frames. Therefore, the amount of processing performed by the reception apparatus can be reduced.

A system according to one aspect of the present disclosure includes the transmission apparatus and a reception apparatus which receives the plurality of frames from the transmission apparatus.

Note that these general or specific aspects may be implemented using a system, an apparatus, a method, an integrated circuit, a computer program, or a computer-readable recording medium such as a CD-ROM. Also, these general or specific aspects may be implemented using any combination of a system, an apparatus, a method, an integrated circuit, a computer program, and a recording medium.

Exemplary embodiments will be specifically described below with reference to the drawings.

Note that each of the exemplary embodiments below describes a comprehensive or specific example. Numerical values, shapes, materials, elements, arranged positions and connection forms of the elements, steps, the order of the steps, and the like described in the following exemplary embodiments are merely an example, and do not intend to limit the present disclosure. Also, among elements described in the following exemplary embodiments, elements that are not included in an independent claim which represents the highest concept are described as optional elements.

First Exemplary Embodiment

[Basic Configuration of an MMT Scheme]

First, a basic configuration of an MMT scheme will be described. FIG. 1 illustrates a protocol stack diagram for performing transfer using the MMT scheme and an advanced BS transfer scheme.

Under the MMT scheme, information such as video and voice is stored in a plurality of MPUs (Media Presentation Units) and a plurality of MFUs (Media Fragment Units), and is MMT-packetized with an MMT packet header being added.

Meanwhile, under the MMT scheme, the control information such as an MMT message is MMT-packetized with the MMT packet header being added. The MMT packet header is provided with a field that stores a 32-bit short-format NTP, and this field may be used for QoS control of communication lines, etc.

MMT-packetized data is encapsulated into an IP packet having a UDP header or IP header. At this time, in the IP header or UDP header, when a set of packets with an identical source IP address, destination IP address, source port number, destination port number, and protocol classification is an IP data flow, headers of the plurality of IP packets contained in one IP data flow are redundant. Therefore, header compression of some IP packets is performed in one IP data flow.

Next, a TLV packet will be described in detail. FIG. 2 is a diagram illustrating data structure of the TLV packet.

As illustrated in FIG. 2, the TLV packet stores an IPv4 packet, IPv6 packet, compressed IP packet, NULL packet, and transfer control signal. These pieces of information are identified using an 8-bit data type. Examples of the transfer control signal include an AMT (Address Map Table) and NIT (Network Information Table). In addition, in the TLV packet, a data length (byte unit) is indicated using a 16-bit field, and a value of data is stored after the data length. Since there is 1-byte header information before the data type (not illustrated in FIG. 2), the TLV packet has a total of 4-byte header area.

The TLV packet is mapped to a transfer slot under the advanced BS transfer scheme. Pointer/slot information that indicates a head position of a first packet and a tail position of a last packet which are contained in every slot are stored in TMCC (Transmission and Multiplexing Configuration Control) control information (control signal).

Next, a configuration of a reception apparatus when the MMT packet is transferred by using the advanced BS transfer scheme will be described. FIG. 3 is a block diagram illustrating the basic configuration of the reception apparatus. Note that the configuration of the reception apparatus of FIG. 3 is simplified. More specific configuration will be described later individually according to a manner in which reference clock information is stored.

Reception apparatus 20 includes receiver 10, decoder 11, TLV demultiplexer (DEMUX) 12, IP demultiplexer (DEMUX) 13, and MMT demultiplexer (DEMUX) 14.

Receiver 10 receives transfer channel coded data.

Decoder 11 decodes the transfer channel coded data received by receiver 10, applies error correction and the like, and extracts the TMCC control information and TLV data. The TLV data extracted by decoder 11 undergoes DEMUX processing by TLV demultiplexer 12.

The DEMUX process performed by TLV demultiplexer 12 differs according to the data type. For example, when the data type is a compressed IP packet, TLV demultiplexer 12 performs processes such as decompressing the compressed header and passing the header to an IP layer.

IP demultiplexer 13 performs processing such as header analysis of an IP packet or UDP packet, and extracts the MMT packet for each IP data flow.

MMT demultiplexer 14 performs a filtering process (MMT packet filtering) based on a packet ID stored in the MMT packet header.

[Method for Storing the Reference Clock Information in the MMT Packet]

Under the MMT scheme described with reference to FIG. 1 to FIG. 3 described above, although the 32-bit short-format NTP can be stored in the MMT packet header for transfer, there exists no method for transferring a long-format NTP.

Hereinafter, a method for storing the reference clock information in the MMT packet will be described. First, the method for storing the reference clock information within the MMT packet will be described.

When a descriptor, a table, or a message for storing the reference clock information is defined and the control information is stored in the MMT packet, the descriptor indicating the reference clock information and an identifier indicating the table or message are indicated within the control information. Then, the control information is stored in the MMT packet in the transmission apparatus.

This allows reception apparatus 20 to identify the reference clock information based on the identifier. Note that the reference clock information may be stored in the MMT packet by using existing descriptors (for example, CRI_descriptor( ), etc.).

Next, a method for storing the reference clock information in the MMT packet header will be described.

For example, there is a method for storing the reference clock information by using a header_extension field (hereinafter referred to as an extension field). The extension field becomes effective when an extension_flag of the MMT packet header is set to '1'.

An extension field type indicating data classification of data to be stored in the extension field is stored in the extension field. Information indicating that the data is reference clock information (for example, a 64-bit long-format NTP) is stored in the extension field type. The reference clock information is stored in the extension field.

When header_extension_flag of the MMT packet header is '1', reception apparatus 20 refers to the extension field of the MMT packet. When the extension field type indicates that the data is reference clock information, reception apparatus 20 extracts the reference clock information and reproduces a clock.

Note that the reference clock information may be stored in an existing header field. In addition, when there is an unused field or when there is a field unnecessary for broadcast, the reference clock information may be stored in these fields.

In addition, the reference clock information may be stored by using the existing field and the extension field together. For example, the existing 32-bit short-format NTP field and the extension field may be used together.

Regarding the reference clock information, in order to maintain compatibility with an existing field, of the 64-bit long-format NTP, only a 32-bit section corresponding to a short-format format may be stored in the existing field, and remaining 32 bits may be stored in the extension field.

Here, the reference clock information is, for example, time when a head bit of the MMT packet in which the reference clock information is stored passes a predetermined position (for example, when the head bit is output from a specific component of a transmission apparatus). However, the reference clock information may be time when a bit of another position passes the predetermined position.

When the reference clock information is stored in the MMT packet as the control information, the MMT packet containing the control information is transmitted at predetermined transmission intervals.

When the reference clock information is stored in the extension field of the MMT packet, the reference clock information is stored in the extension field of a predetermined MMT packet header. Specifically, for example, at least one or more pieces of the reference clock information are stored in the header extension fields of the MMT packets at intervals of 100 ms.

Note that, when the reference clock information is stored in the MMT packet, the packet ID of the MMT packet that stores the reference clock information is stored in program information. Reception apparatus 20 analyzes the program information and acquires the MMT packet in which the reference clock information is stored. At this time, the packet ID of the MMT packet in which the reference clock information is stored may be prescribed in advance as a fixed value. This allows reception apparatus 20 to acquire the reference clock information without analyzing the program information.

[Operation Flow when the Reference Clock Information is Stored in the MMT Packet]

Next, an operation flow when the reference clock information is stored in the MMT packet (acquisition flow of the reference clock information) will be described.

Figure 4:
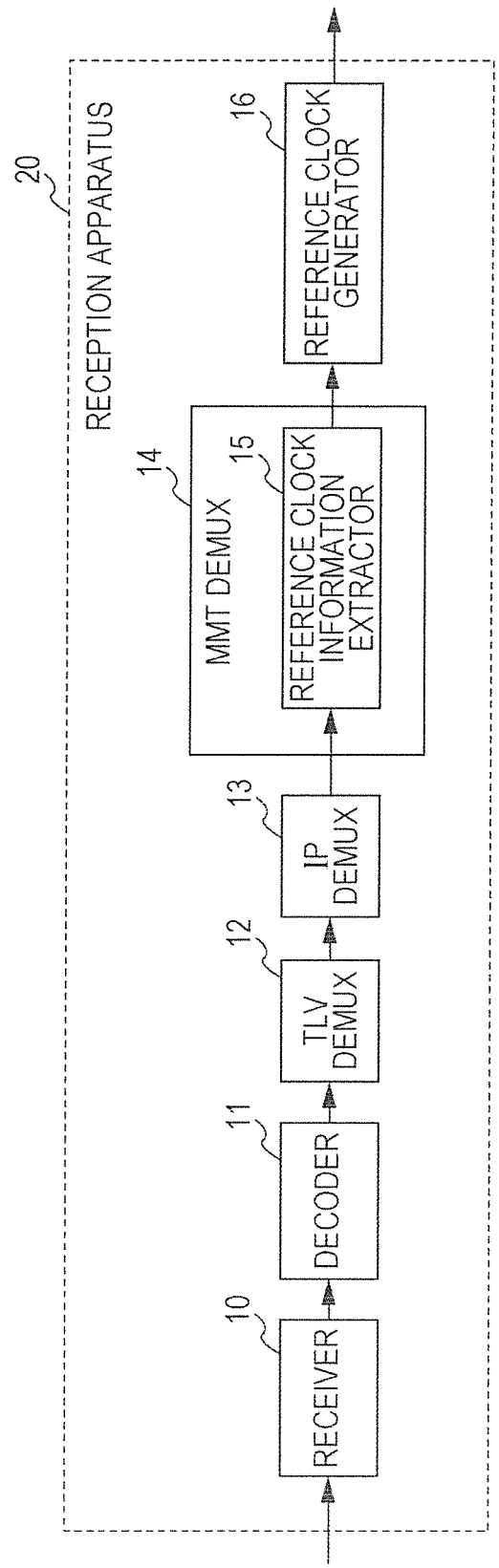
FIG. 4 is a block diagram illustrating a functional configuration of the reception apparatus when reference clock information is stored in an extension field of an MMT packet header.
Figure 5:
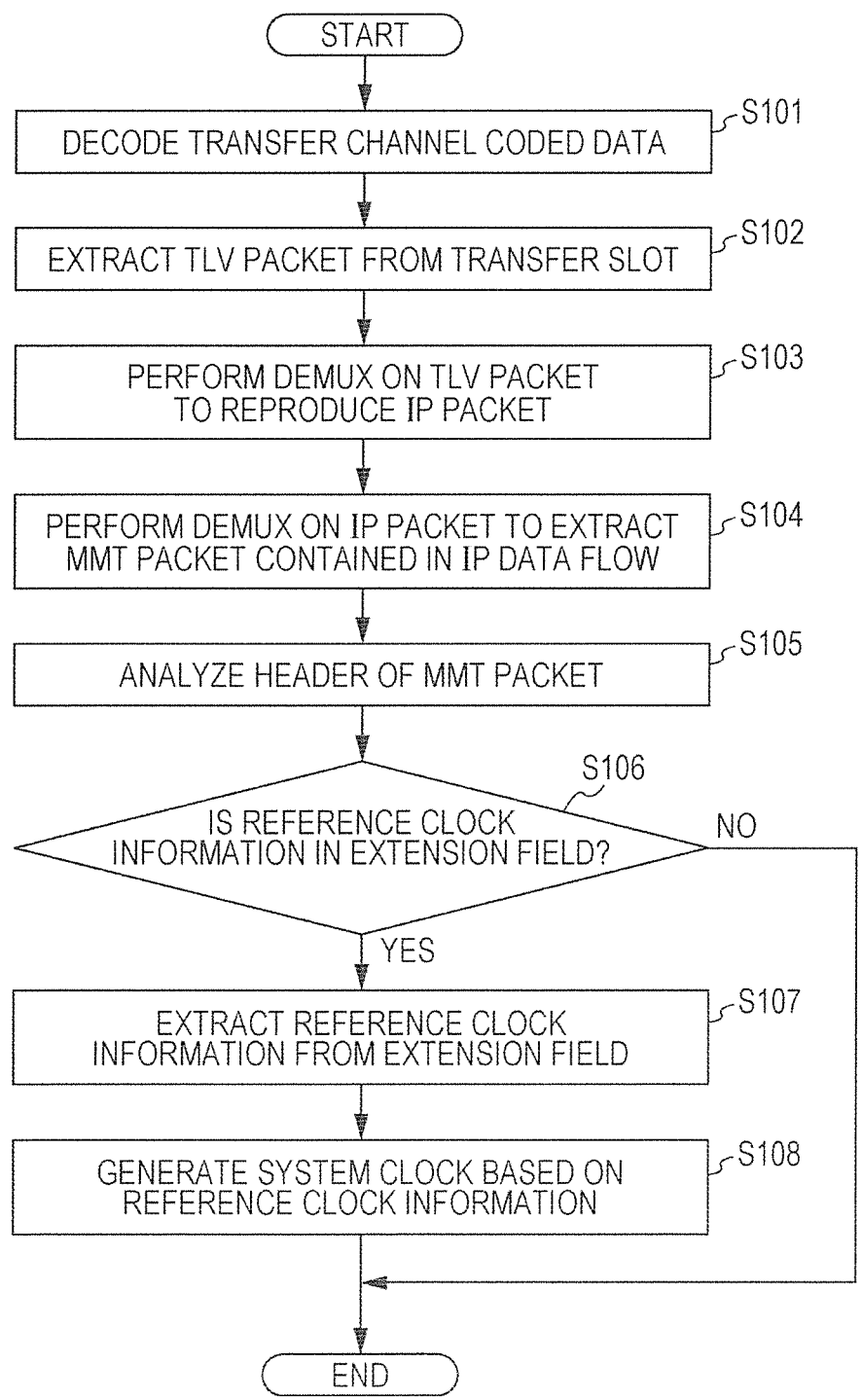
FIG. 5 is a diagram illustrating an acquisition flow of the reference clock information performed by the reception apparatus when the reference clock information is stored in the extension field of the MMT packet header.

First, the following describes the acquisition flow of the reference clock information performed by reception apparatus 20 when the reference clock information is stored in the extension field of the MMT packet header. FIG. 4 is a block diagram illustrating a functional configuration of reception apparatus 20 when the reference clock information is stored in the extension field of the MMT packet header. FIG. 5 is a diagram illustrating the acquisition flow of the reference clock information performed by reception apparatus 20 when the reference clock information is stored in the extension field of the MMT packet header.

In FIG. 4, when the reference clock information is stored in the extension field of the MMT packet header, MMT demultiplexer 14 includes reference clock information extractor 15 (an example of an extractor), and reference clock generator 16 (an example of a generator) is provided downstream of MMT demultiplexer 14.

In the flow of FIG. 5, decoder 11 of reception apparatus 20 decodes the transfer channel coded data received by receiver 10 (S101), and extracts the TLV packet from the transfer slot (S102).

Next, TLV demultiplexer 12 performs DEMUX on the extracted TLV packet to extract the IP packet (S103). At this time, the header of the compressed IP packet is reproduced.

Next, IP demultiplexer 13 performs DEMUX on the IP packet, acquires the specified IP data flow, and extracts the MMT packet (S104).

Next, MMT demultiplexer 14 analyzes the header of the MMT packet, and determines whether the extension field is used and whether the reference clock information is in the extension field (S106). When there is no reference clock information in the extension field (No in S106), the process ends.

On the other hand, when the determination is made such that the reference clock information is in the extension field (Yes in S106), reference clock information extractor 15 extracts the reference clock information from the extension field (S107). Then, reference clock generator 16 generates the system clock based on the extracted reference clock information (S108). The system clock is, in other words, a clock for reproducing content.

Figure 6:
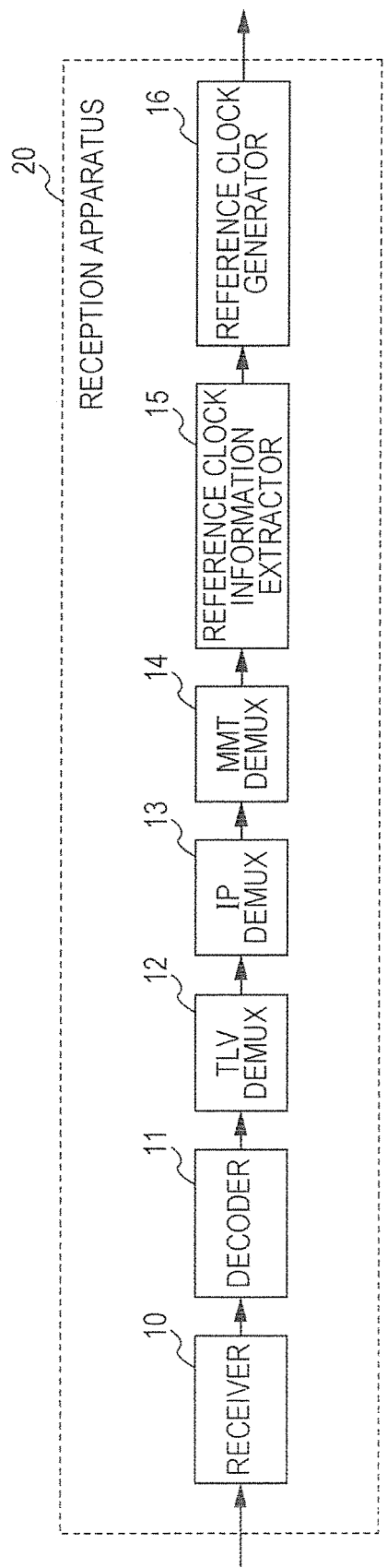
FIG. 6 is a block diagram illustrating the functional configuration of the reception apparatus when the reference clock information is stored in control information.
Figure 7:
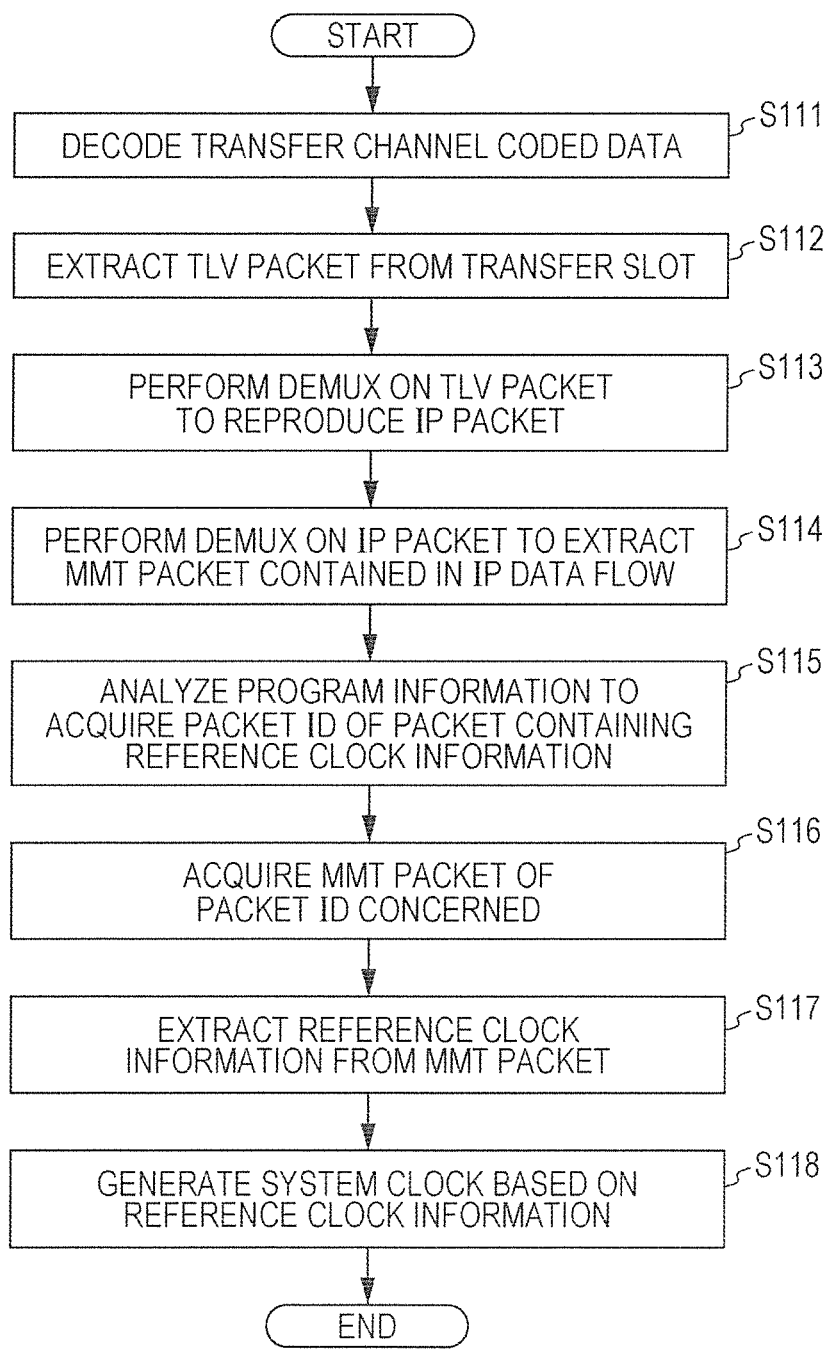
FIG. 7 is a diagram illustrating the acquisition flow of the reference clock information performed by the reception apparatus when the reference clock information is stored in the control information.

Next, the acquisition flow of the reference clock information by reception apparatus 20 when the reference clock information is stored in the control information will be described. FIG. 6 is a block diagram illustrating the functional configuration of reception apparatus 20 when the reference clock information is stored in the control information. FIG. 7 is a diagram illustrating the acquisition flow of the reference clock information performed by reception apparatus 20 when the reference clock information is stored in the control information.

As illustrated in FIG. 6, when the reference clock information is stored in the control information, reference clock information extractor 15 is disposed downstream of MMT demultiplexer 14.

In the flow of FIG. 7, the processes of step S111 to step S114 are identical to the flow of step S101 to step S104 described in FIG. 5.

Subsequently to step S114, MMT demultiplexer 14 acquires the packet ID of the packet containing the reference clock information from the program information (S115), and acquires the MMT packet of the packet ID (S116). Subsequently, reference clock information extractor 15 extracts the reference clock information from the control signal contained in the extracted MMT packet (S117), and reference clock generator 16 generates the system clock based on the extracted reference clock information (S118).

[Method for Storing the Reference Clock Information in the TLV Packet]

As described in FIG. 5 and FIG. 7, when the reference clock information is stored in the MMT packet, in order that the reception apparatus obtains the reference clock information, reception apparatus 20 extracts the TLV packet from the transfer slot, and extracts the IP packet from the TLV packet. Furthermore, reception apparatus 20 extracts the MMT packet from the IP packet, and further extracts the reference clock information from the header or a payload of the MMT packet. When the reference clock information is stored in the MMT packet, reception apparatus 20 has many processes for acquiring the reference clock information, and much time is required until the acquisition, which needs to be addressed.

Therefore, a method will be described for implementing a process of adding a time stamp to a medium, such as video and voice, based on the reference clock, and a process of transferring the medium by using the MMT scheme, and for performing transfer of the reference clock information by using a lower layer, lower protocol, or lower multiplexing scheme than the MMT layer.

Figure 8:
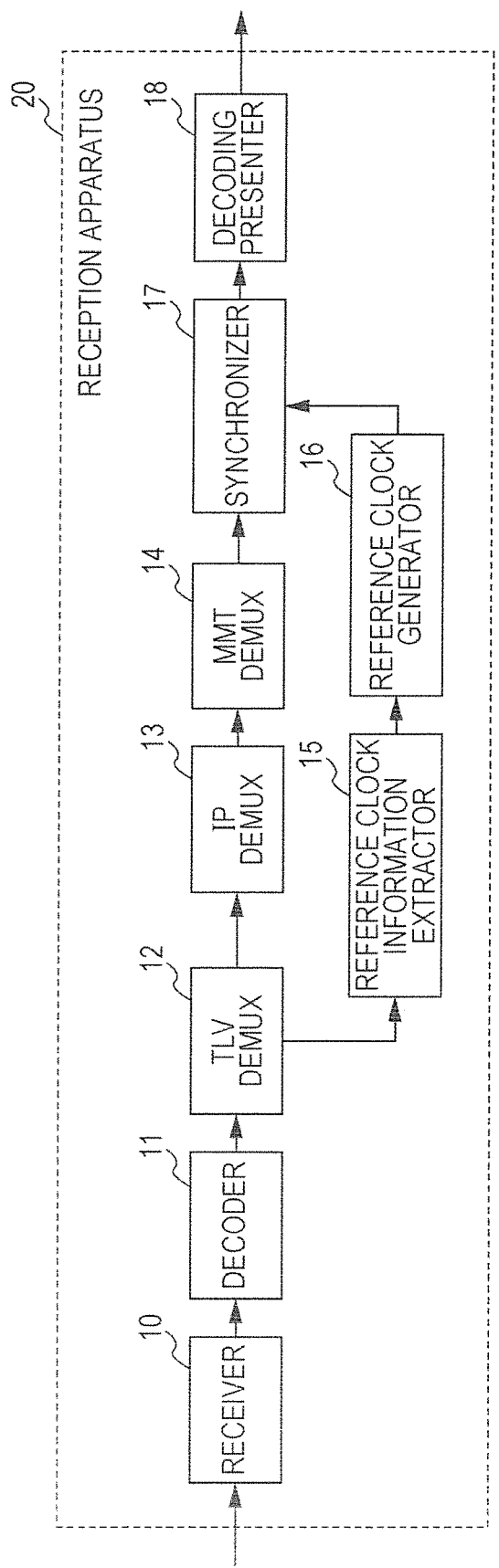
FIG. 8 is a block diagram illustrating the configuration of the reception apparatus when the reference clock information is stored in the TLV packet.

First, a method for storing the reference clock information in the TLV packet for transfer will be described. FIG. 8 is a block diagram illustrating the configuration of reception apparatus 20 when the reference clock information is stored in the TLV packet.

Reception apparatus 20 in FIG. 8 differs from reception apparatus 20 in FIG. 4 and FIG. 6 in placement of reference clock information extractor 15 and reference clock generator 16. In addition, synchronizer 17 and decoding presenter 18 are also illustrated in FIG. 8.

The TLV packet includes the 8-bit data type, 16-bit data length, and 8*N-bit data, as illustrated in aforementioned FIG. 2. In addition, 1-byte header which is not illustrated in FIG. 2 exists before the data type, as described above. Here, the data type is specifically prescribed, for example, as 0×01: IPv4 packet, 0×03: header-compressed IP packet, etc.

In order to store new data in the TLV packet, an undefined area of the data type is used to prescribe the data type. In order to indicate that the reference clock information is stored in the TLV packet, the data type describes that the data is the reference clock information.

Note that the data type may be prescribed for each kind of the reference clock. For example, the data types that indicate the short-format NTP, long-format NTP, and PCR (Program Clock Reference) may be prescribed individually. FIG. 9 is a diagram illustrating an example in which the long-format NTP is stored in the TLV packet. The long-format NTP is stored in a data field.

In this case, reference clock information extractor 15 analyzes the data type of TLV packet. When the reference clock information is stored, reference clock information extractor 15 analyzes the data length, and extracts the reference clock information from the data field.

Here, when the data length is uniquely determined by the data type, reference clock information extractor 15 may acquire the reference clock information without analyzing a data length field. For example, when the data type indicates a 64-bit long-format NTP, reference clock information extractor 15 may extract a section from (4 bytes+1 bit)-th bit to (4 bytes+64 bits)-th bit. Also, reference clock information extractor 15 may extract a desired bit from 64-bit data.

Figure 10:
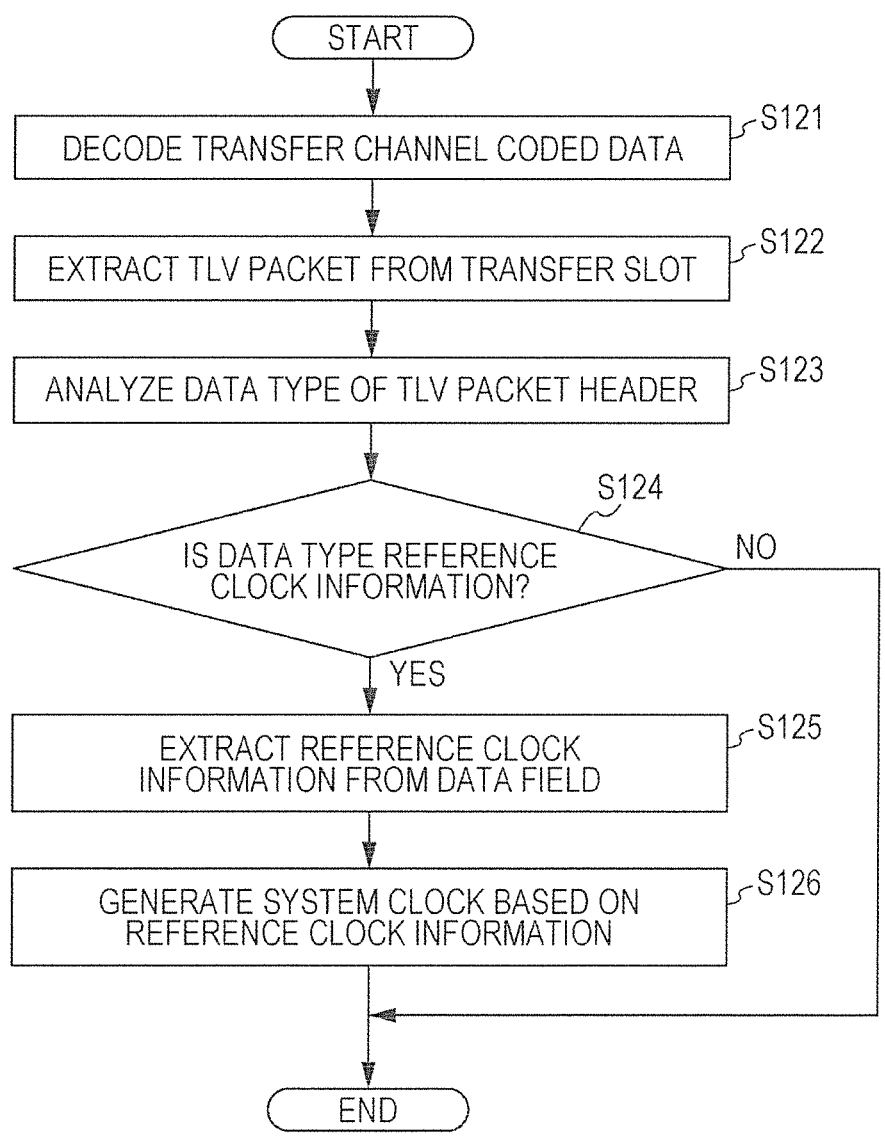
FIG. 10 is a diagram illustrating the acquisition flow of the reference clock information performed by the reception apparatus when the reference clock information is stored in the TLV packet.

Next, the operation flow of reception apparatus 20 when the reference clock information is stored in the TLV packet (acquisition flow of the reference clock information) will be described with reference to FIG. 10. FIG. 10 is a diagram illustrating the acquisition flow of the reference clock information performed by reception apparatus 20 when the reference clock information is stored in the TLV packet.

In the flow of FIG. 10, first, decoder 11 decodes the transfer channel coded data received by receiver 10 (S121), and extracts the TLV packet from the transfer slot (S122).

Next, TLV demultiplexer 12 analyzes the data type of TLV packet (S123), and determines whether the data type is the reference clock information (S124). When the data type is the reference clock (Yes in S124), reference clock information extractor 15 extracts the reference clock information from the data field of the TLV packet (S125). Then, reference clock generator 16 generates the system clock based on the reference clock information (S126). On the other hand, when the data type is not the reference clock information, (No in S124), the acquisition flow of the reference clock information ends.

In addition, in an unillustrated flow, IP demultiplexer 13 extracts the IP packet according to the data type. Then, the IP DEMUX process and MMT DEMUX process are performed on the extracted IP packet, and the MMT packet is extracted. Furthermore, synchronizer 17 outputs video data to decoding presenter 18 with timing with which the time stamp of the video data contained in the extracted MMT packet coincides with the reference clock generated in step S126. Decoding presenter 18 decodes and presents the video data.

In the transmission method described above, the type data of the TLV packet indicates a storage place of the reference clock information, and the reference clock information is stored in the data field of the TLV packet. Thus, by storing and transmitting the reference clock information by the transmission apparatus by using a lower layer or lower protocol than the MMT layer, reception apparatus 20 can reduce the processes and time until extraction of the reference clock information.

In addition, since reception apparatus 20 can extract and reproduce the reference clock information in a lower layer extending over the IP layers, reception apparatus 20 may extract the reference clock information by hardware implementation. This allows reception apparatus 20 to reduce more influence of jitter or the like than extracting the reference clock information by software implementation, and makes it possible to generate higher-precision reference clock.

Next, other methods for storing the reference clock information will be described.

When the data length is uniquely determined according to the data type in the aforementioned flow of FIG. 10, the data length field does not need to be transmitted. Here, when the data length field is not transmitted, an identifier is stored indicating that the data length field is data that is not transmitted.

Although the reference clock information is stored in the data field of the TLV packet according to the description of FIG. 10, the reference clock information may be appended immediately before or after the TLV packet. Also, the reference clock information may be appended immediately before or after data to be stored in the TLV packet. In these cases, a data type that allows specification of a position where the reference clock information is appended is added.

For example, FIG. 11 is a diagram illustrating structure in which the reference clock information is appended immediately before the IP packet header. In this case, the data type indicates an IP packet with reference clock information. When the data type indicates an IP packet with reference clock information, reception apparatus 20 (reference clock information extractor 15) can acquire the reference clock information by extracting bits of a previously prescribed predetermined length of the reference clock information from a head of the data field of the TLV packet. At this time, the data length may specify the length of data that includes the length of the reference clock information, and may specify the length that does not include the length of the reference clock information. When the data length specifies the length of data that includes the length of the reference clock information, reception apparatus 20 (reference clock information extractor 15) acquires data of a length obtained by subtracting the length of the reference clock information from the data length from immediately after the reference clock information.

Figure 13:
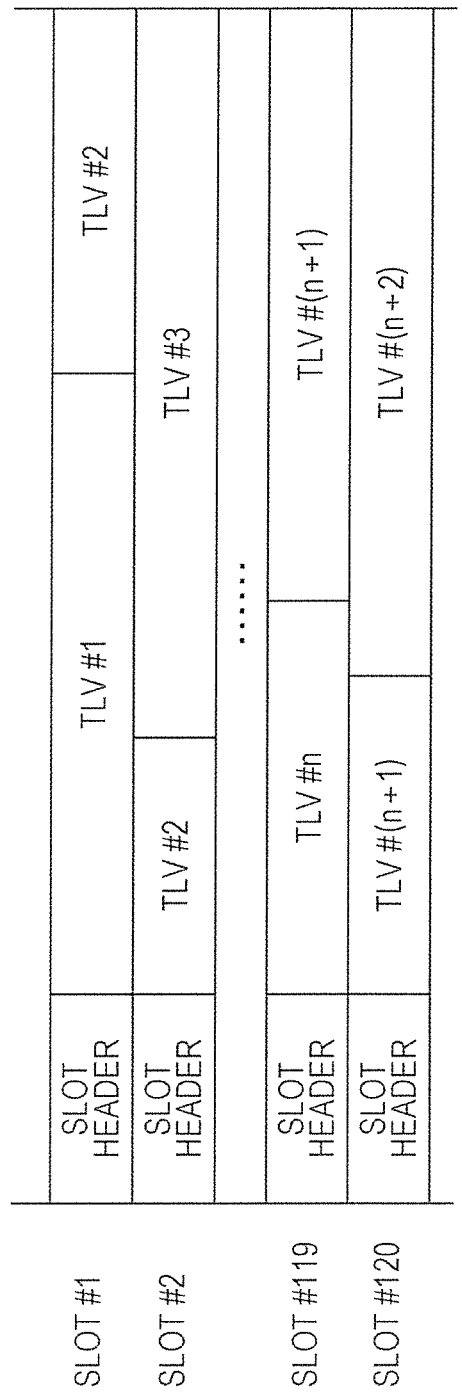
FIG. 13 is a diagram illustrating structure of a transfer slot.

In addition, FIG. 12 is a diagram illustrating structure in which the reference clock information is appended immediately before the TLV packet. The data type is a conventional data type. An identifier indicating that the TLV packet is a TLV packet with reference clock information is stored, for example, in a slot header of the transfer slot or the TMCC control information. FIG. 13 is a diagram illustrating structure of the transfer slot, and FIG. 14 is a diagram illustrating structure of the slot header of the transfer slot.

In FIG. 13, the transfer slot includes a plurality of slots (120 slots of Slot #1 to Slot #120 in the example of FIG. 13). A bit number contained in each slot is a fixed bit number uniquely determined based on a coding rate of error correction. Each slot has a slot header, and one or more TLV packets are stored. Note that, in FIG. 13, the TLV packet has a variable-length.

Figure 14:
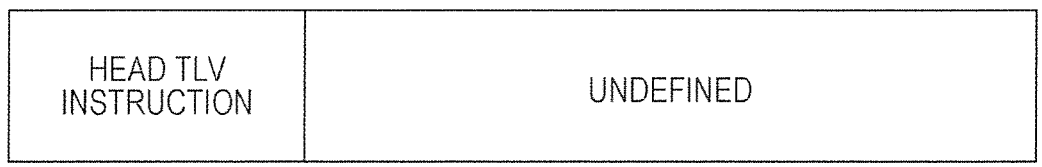
FIG. 14 is a diagram illustrating structure of a slot header of the transfer slot.

In FIG. 14, in a head TLV instruction field (16 bits) of the slot header is stored a value of a position of a head byte in a first TLV packet within the slot indicated with a number of bytes from a slot head except the slot header. Remaining 160 bits of the slot header is undefined. The transfer slot includes 120 slots per frame as described above, and a modulation scheme is assigned to the slots in 5-slot unit. In addition, up to 16 streams can be transferred within one frame. Note that the plurality of streams included in one transfer slot has, for example, different pieces of content (or a company that provides the content) transferred by the streams. In addition, each stream includes one or more slots, and one slot does not extend over the plurality of streams.

When the identifier indicating that the TLV packet is a TLV packet with reference clock information is stored in the slot header, for example, information that allows specification of a position of the TLV packet with reference clock information, kind of the reference clock information, data length, and the like are stored in the slot obtained by extending (using) an undefined field of the slot header.

Note that all pieces of information including the information that allows specification of the position of the TLV packet with reference clock information, kind of the reference clock information, and data length do not need to be stored in the slot header. The slot only needs to indicate information that allows specification of and reference to the TLV packet with reference clock information.

Figure 15:
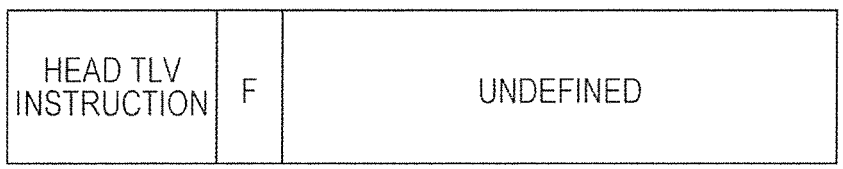
FIG. 15 is a diagram illustrating an example in which a flag is stored in an undefined area of the slot header.

For example, when definition is made such that the reference clock information is the 64-bit long-format NTP, that only one TLV packet with reference clock information can be stored in one slot, and that the one TLV packet with reference clock information is always the head TLV packet, a flag may be stored in the undefined area of the slot header in the slot. FIG. 15 is a diagram illustrating an example in which the flag is stored in the undefined area of the slot header.

In FIG. 15, the flag (described as "F" in the diagram) indicating whether the reference clock information is contained in the slot is stored in the undefined area of the slot header. With such a flag, reception apparatus 20 may determine that the head TLV packet is a TLV packet with reference clock information.

In addition, the identifier (information) indicating that the TLV packet is a TLV packet with reference clock information may be stored in the TMCC control information. FIG. 16 is a diagram illustrating structure of the TMCC control information under a transfer scheme for advanced broadband satellite digital broadcast.

The information for specifying and referencing the TLV packet with reference clock information may be stored in extension information within the TMCC control information illustrated in FIG. 16, and may be stored in another place within the TMCC control information. For example, stream classification/relative stream information in the TMCC control information may be used as information for specifying and referencing the TLV packet with reference clock information. FIG. 17 is a diagram illustrating the stream classification/relative stream information in the TMCC control information.

In FIG. 17, in the stream classification/relative stream information, the stream classification of each of 16 streams is indicated in 8 bits. That is, 1-frame transfer slot can transfer up to 16 (16-classification) streams. For example, the stream classification of an MPEG2-TS (Transport Stream) stream is "00000000", and the stream classification of a TLV stream is "00000010". However, under the current circumstances, the classifications of other streams are unassigned or undefined.

Therefore, when the stream classification of the TLV stream with reference clock is defined, for example, as "00000100" and the relative stream is a TLV stream with a reference clock, "00000100" is stored in the stream classification/relative stream information in the TMCC control information. Here, in the stream with the stream classification of "00000100", the TLV packet containing reference clock information is stored, for example, once per 5-slot unit, which is a slot assignment unit, or once per frame unit.

Reception apparatus 20 analyzes the stream classification/relative stream information in the TMCC control information. When the stream classification is "00000100", reception apparatus 20 acquires the TLV packet with a reference clock from the slot determined in advance.

Note that a case may be considered where the stream classification including download type TLV packets and the stream classification including stream type TLV packets, such as video and voice, are defined. In such a case, reception apparatus 20 may determine that the reference clock information is contained in the stream when the stream classification of the received stream is a stream type TLV packet. This is because the reference clock information is not used in reproduction of download type TLV packets.

In addition, when the information for specifying and referencing the TLV packet with reference clock information is stored in the extension information of the TMCC control information, for example, information for each of the 16 relative streams is stored in the extension area of the TMCC control information.

In addition, as illustrated in FIG. 18, an area into which the reference clock information is stored may be newly defined in the undefined field of the slot header. FIG. 18 is a diagram illustrating an example in which the reference clock information is stored in the undefined field of the slot header.

In addition, the reference clock information may be stored in a previously determined slot, and information indicating that the reference clock information is contained may be stored within the slot header. Here, the previously determined slot is, for example, a head slot of the transfer slot (Slot #1 in the example of FIG. 13), and the reference clock information stored in the IP packet may be contained in the head TLV packet within this slot. Also, when the plurality of streams are contained in the transfer slot, the previously determined slot may be, for example, a head slot of each stream contained in the transfer slot, and the reference clock information stored in the IP packet may be contained in the head TLV packet within this slot.

In addition, the TMCC control information may store information for specifying and referencing the slot header containing the reference clock information. Note that the storage method of the information for specifying and referencing the slot header containing reference clock information in the TMCC control information is similar to the aforementioned storage method of the information for specifying and referencing the TLV packet with reference clock information, and thus description thereof will be omitted.

Reception apparatus 20 analyzes the TMCC control information, and when determination is made such that the reference clock information is in the slot header, reception apparatus 20 extracts the reference clock information from the slot header.

Figure 19:
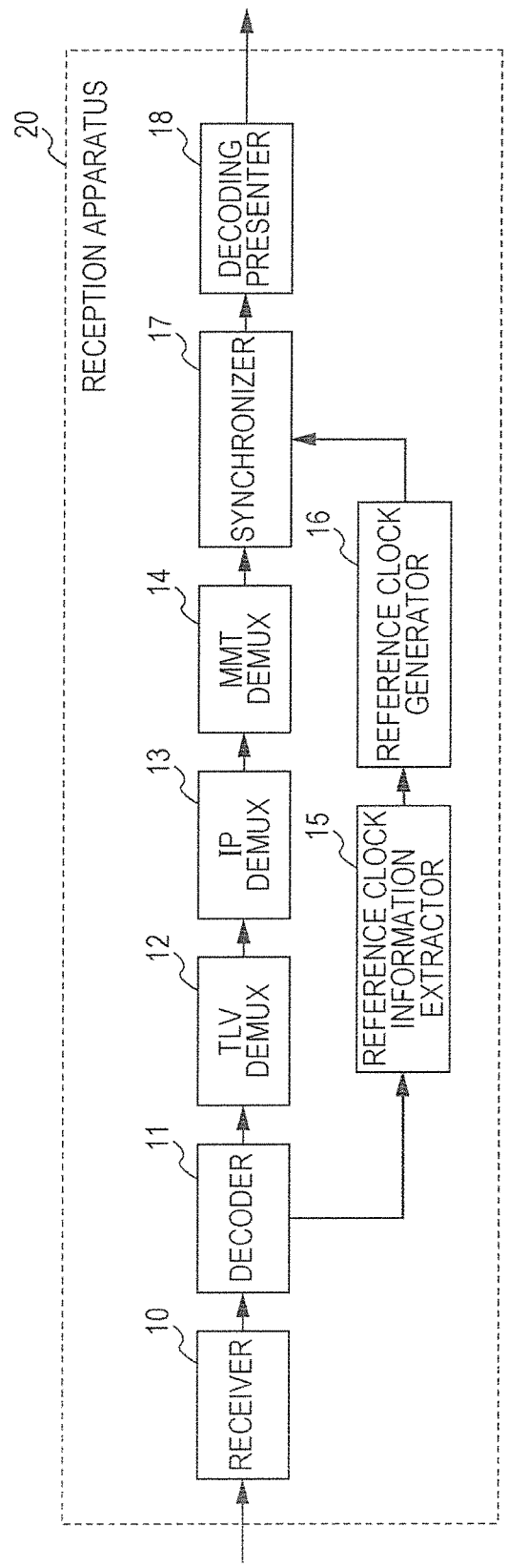
FIG. 19 is a block diagram illustrating the functional configuration of the reception apparatus when information indicating that the reference clock information is contained within the slot header is stored in TMCC control information.
Figure 20:
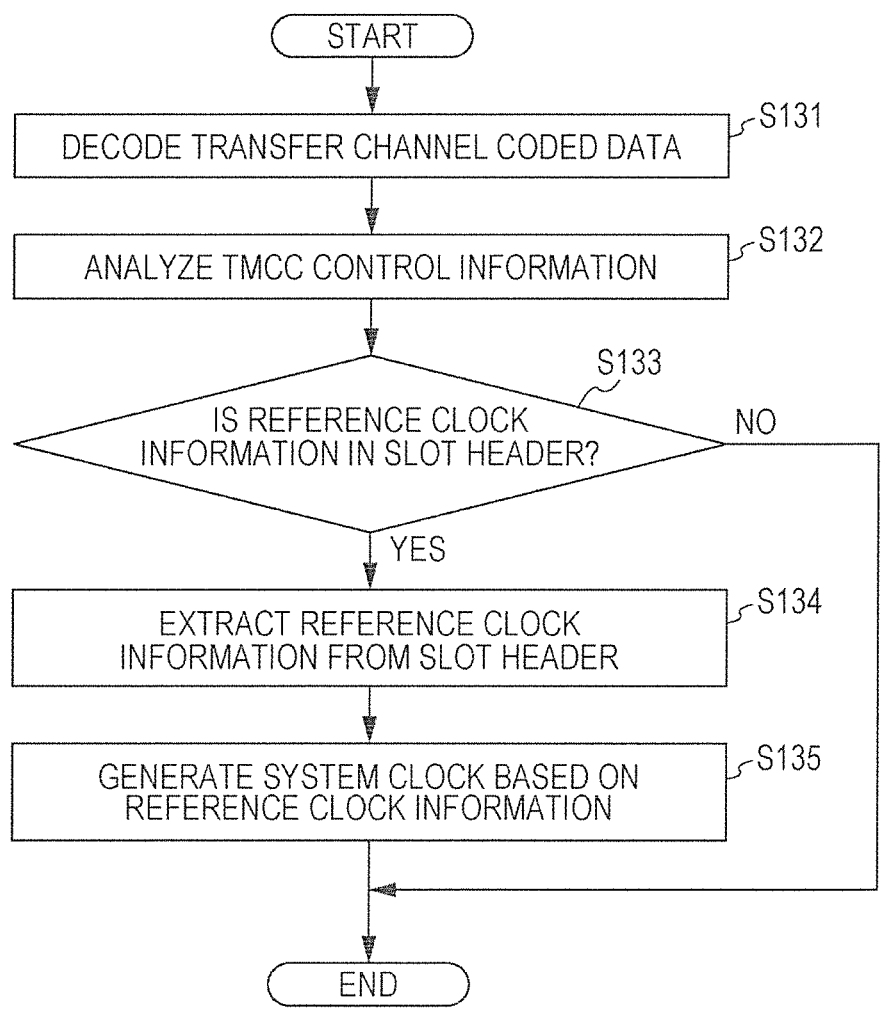
FIG. 20 is a diagram illustrating the acquisition flow of the reference clock information when the information indicating that the reference clock information is contained in the slot header is stored in the TMCC control information.

In addition, the TMCC control information may store information indicating that the reference clock information is contained. FIG. 19 is a block diagram illustrating a functional configuration of reception apparatus 20 when the information indicating that the reference clock information is contained within the slot header is stored in the TMCC control information. FIG. 20 is an acquisition flow of the reference clock information when the information indicating that the reference clock information is contained in the slot header is stored in the TMCC control information.

In FIG. 19, when the information indicating that the reference clock information is contained within the slot header is stored in the TMCC control information, in reception apparatus 20, reference clock information extractor 15 acquires the reference clock signal from the transfer slot that is output from decoder 11.

In the flow of FIG. 20, decoder 11 decodes the transfer channel coded data (S131), analyzes the TMCC control information (S132), and determines whether the reference clock information is in the slot header within the transfer slot (S133). When the reference clock information is in the slot header (Yes in S133), reference clock information extractor 15 extracts the reference clock information from the slot header (S134), and reference clock generator 16 generates the reference clock of the system (system clock) based on the reference clock information (S135). On the other hand, when the reference clock information is not in the slot header (No in S133), the acquisition flow of the reference clock information ends.

Such reception apparatus 20, which can acquire the reference clock information in the layer of the transfer slot, can acquire the reference clock information more quickly than a case where the reference clock information is stored in the TLV packet.

As described above, by storing the reference clock information in the TLV packet or transfer slot, reception apparatus 20 can reduce the processes until the acquisition of the reference clock information, and can shorten acquisition time of the reference clock information.

In addition, by storing the reference clock information in a physical layer, reception apparatus 20 can easily implement acquisition and reproduction of the reference clock information by hardware, and clock reproduction with high-precision is possible compared to the case of acquisition and reproduction of the reference clock information by software.

In addition, in the aforementioned transmission method according to the first exemplary embodiment, in a system in which a plurality of layers (protocols) exists including the IP layer, the transmission apparatus adds the time stamp of a medium based on the reference clock information in the layers upper than the IP layer, and transmits the reference clock information in the layers lower than the IP layer. This allows reception apparatus 20 to easily process the reference clock information by hardware.

Based on a similar idea, the reference clock information may be stored in a condition of not being stored in the MMT packet within the IP packet. Even in such a case, reception apparatus 20 can reduce the processes for acquiring the reference clock information as compared with the case where the reference clock information is stored in the MMT packet.

[Transmission Cycle of the Reference Clock Information]

A transmission cycle of the reference clock information will be supplemented below.

In the case of storing the reference clock information in the TLV packet, for example, the transmission apparatus stores time when a head bit of the TLV packet is transmitted as the reference clock information. In addition, not the transmission time of the head bit but predetermined time determined differently may be stored as the reference clock information.

The TLV packet that contains the reference clock information is transmitted at predetermined intervals. In other words, the TLV packet that contains the reference clock information is contained in the transfer slot and is transmitted in a predetermined transmission cycle. For example, at least one or more pieces of the reference clock information may be stored in the TLV packets for transfer at intervals of 100 ms.

In addition, the transmission apparatus may place the TLV packets that contain the reference clock information at predetermined intervals at predetermined positions of the transfer slot under the advanced BS transfer scheme. In addition, the transmission apparatus may store the TLV packet containing the reference clock information once every 5-slot unit, which is a slot assignment unit of the TLV packet, and may store the reference clock information in the head TLV packet of the first slot of the 5-slot unit. That is, the transmission apparatus may place the TLV packet that contains the reference clock information at a head within the head slot within the transfer slot (that is, immediately after the slot header).

In addition, the transmission apparatus may place the TLV packets that contain the reference clock information at predetermined intervals at predetermined positions of the transfer slot under the transfer scheme of the advanced broadband satellite digital broadcasting. For example, the transmission apparatus may store the reference clock information once every 5-slot unit, which is a slot assignment unit, in the head TLV packet of the first slot. That is, the TLV packet positioned at a head within the head slot of each stream contained in the transfer slot may contain the reference clock information. In addition, the reference clock information may be stored in the first slot within the relative stream.

In addition, the transmission cycle and transmission interval of the reference clock information may be changed according to a modulation scheme or coding rate of the transfer channel coding scheme.

[Method for Acquiring the Reference Clock Information in the Upper Layer Quickly]

Next, a method will be described for shorten time to the acquisition of the reference clock information by reception apparatus 20 performing batch DEMUX processing from the lower layer to the upper layer.

Here, a method will be described by which the transmission apparatus stores the reference clock information in the upper layer such as the MMT packet, and stores in the IP packet the MMT packet in which the reference clock information is stored. In the method described below, by defining a protocol for storing in the TLV packet the IP packet in which the reference clock information is stored, the reception apparatus makes a direct reference to the MMT packet, which is the upper layer, from the lower layer such as the TLV packet, and acquires the reference clock information contained in the MMT packet without performing normal DEMUX processing.

The transmission apparatus contains the reference clock information in the aforementioned control information stored in the MMT packet. The previously determined packet ID is added to the control information containing the reference clock information. Then, the transmission apparatus stores the MMT packet that contains the reference clock information in a dedicated IP data flow, and adds the previously determined source IP address, destination IP address, source port number, destination port number, and protocol classification.

On receipt of the generated transfer channel coded data, reception apparatus 20 can extract the IP packet that contains the reference clock information by TLV demultiplexer 12 acquiring the previously determined IP data flow.

Note that, when the IP packet undergoes header compression processing, the reception apparatus adds, for example, an identifier indicating that the IP packet contains the reference clock information to a context identifier that indicates identical IP data flow. The context identifier is stored in a compressed IP packet header. In this case, reception apparatus 20 can extract the IP packet that contains the reference clock information with reference to the context identifier in the compressed IP packet header.

In addition, the IP packet containing the reference clock information may be prescribed not to undergo the header compression, and may be prescribed to always undergo the header compression. It may be prescribed that the previously determined context identifier is added to the IP packet containing the reference clock information, and that all the headers are compressed.

In addition, such a method is also possible that a TLV data type field defines an identifier indicating that the TLV packet is an IP packet that belongs to the IP data flow containing the reference clock information, or an identifier indicating that the TLV packet is a compressed IP packet that belongs to the IP data flow containing the reference clock information. Also, such an identifier may be defined in a field other than the TLV data type field.

When a direct reference to the reference clock information is made from the lower layer, the reference clock information is stored at a previously determined position, and packets in which the reference clock information is stored (such as the MMT packet, IP packet, and TLV packet) are packets dedicated to the reference clock information. In addition, a length of the field before the reference clock information is fixed by a packet header length being fixed.

However, the length of the field before the reference clock information does not need to be fixed. The reception apparatus only needs to specify the length of the field before the reference clock information in the lower layer. For example, when information on the length to the reference clock information includes two types, A and B, reception apparatus 20 can specify the position of the reference clock information by signaling which of A and B the length information is in the lower layer. Alternatively, by the transmission apparatus storing, in the lower layer, positional information on the reference clock information that allows a direct reference to the reference clock information in the upper layer, reception apparatus 20 may make a reference from the lower layer based on the positional information.

The following specifically describes a method for shortening acquisition time of the reference clock information in the upper layer.

Reception apparatus 20 determines the TLV data type. On determination that the reference clock information is contained, reception apparatus 20 acquires the reference clock information contained within the MMT packet directly from the IP packet.

Reception apparatus 20 may extract the reference clock information contained in the MMT packet by extracting a bit string at a specific position from the IP packet or compressed IP packet, with analysis of the IP address, port number, or context identifier omitted. "Extracting a bit string at a specific position" means, for example, extracting information of a specific length from a position that is offset by fixed-length bytes from the TLV packet header. Reception apparatus 20 acquires the reference clock information by "extracting a bit string at a specific position".

The offset length of the fixed-length bytes for extracting the reference clock information is uniquely determined for each of the IP packet and the compressed IP packet. Therefore, reception apparatus 20 can acquire the reference clock information by extracting the information of the specific length from the position that is offset by the fixed-length bytes immediately after determining the TLV data type. Note that the extraction of the information may be performed not from the position that is offset by the fixed length from the TLV packet header but from a position that is offset by the fixed length from a specific field of TLV.

Note that the aforementioned method is one example, and the reference clock information in the upper layer may be acquired from the lower layer through definition of another protocol or identifier. For example, an identifier indicating whether the IP packet contains the reference clock information may be stored in a field other than the TLV data type field.

In addition, for example, reception apparatus 20 may extract reference time information contained in the MMT packet by extracting the bit string at a specific position from the IP packet or compressed IP packet, with analysis of the IP address, port number, or context identifier omitted.

When it is difficult to determine the IP data flow that contains the reference clock information from identification information on the IP data flow, reception apparatus 20 may specify the MMT packet that contains the reference clock information based on unique identification information (packet ID) added to the MMT packet that contains the reference clock information. In this case, the reference clock information is extracted from the specific field as described above.

In addition, when the reference clock information contained in the MMT packet is not stored at a position determined in advance or when the position where the reference clock information contained in the MMT packet is stored cannot be specified, reception apparatus 20 specifies the MMT packet that contains the reference clock information by using the aforementioned method, specifies the position of the reference clock information based on MMT packet header information, and extracts the reference clock information.

Note that, although an example has been described above in which the MMT packet is stored in the IP packet, data to be stored in the IP packet does not need to be the MMT packet, but may be, for example, data that has another data structure. That is, the reference clock information may be contained in the IP packet in data structure different from data structure of the MMT packet. Even for the data in different data structure, in a similar manner to the aforementioned example, data containing the reference clock information is stored in a dedicated IP data flow, and identification information indicating that the data contains the reference clock information and identification information indicating that the data is an IP data flow containing the reference clock information are added.

Reception apparatus 20 identifies that the data is data containing the reference clock information, or that the data is an IP data flow containing data containing the reference clock information. When the reference clock information is contained, reception apparatus 20 extracts the reference clock information. In addition, when the reference clock information is stored at a specific position of data, reception apparatus 20 can extract the reference clock information contained in the data with reference to the specific position from packet structure of the lower layer.

In the aforementioned example, in order to extract the reference clock information from the IP packet or the compressed IP packet, based on whether the data is the IP packet or the compressed IP packet, reception apparatus 20 extracts the reference clock information from fixed-length offset positions different from each other. However, if it is predetermined that header compression processing is omitted on the IP packet that contains the reference clock information, or if it is predetermined that all the IP packets that contain the reference clock information undergo header compression, reception apparatus 20 may omit the determination on whether the data is the IP packet or the compressed IP packet. In addition, reception apparatus 20 may perform determination on whether the reference clock information is contained, after the header of the compressed IP packet is decompressed.

Figure 21:
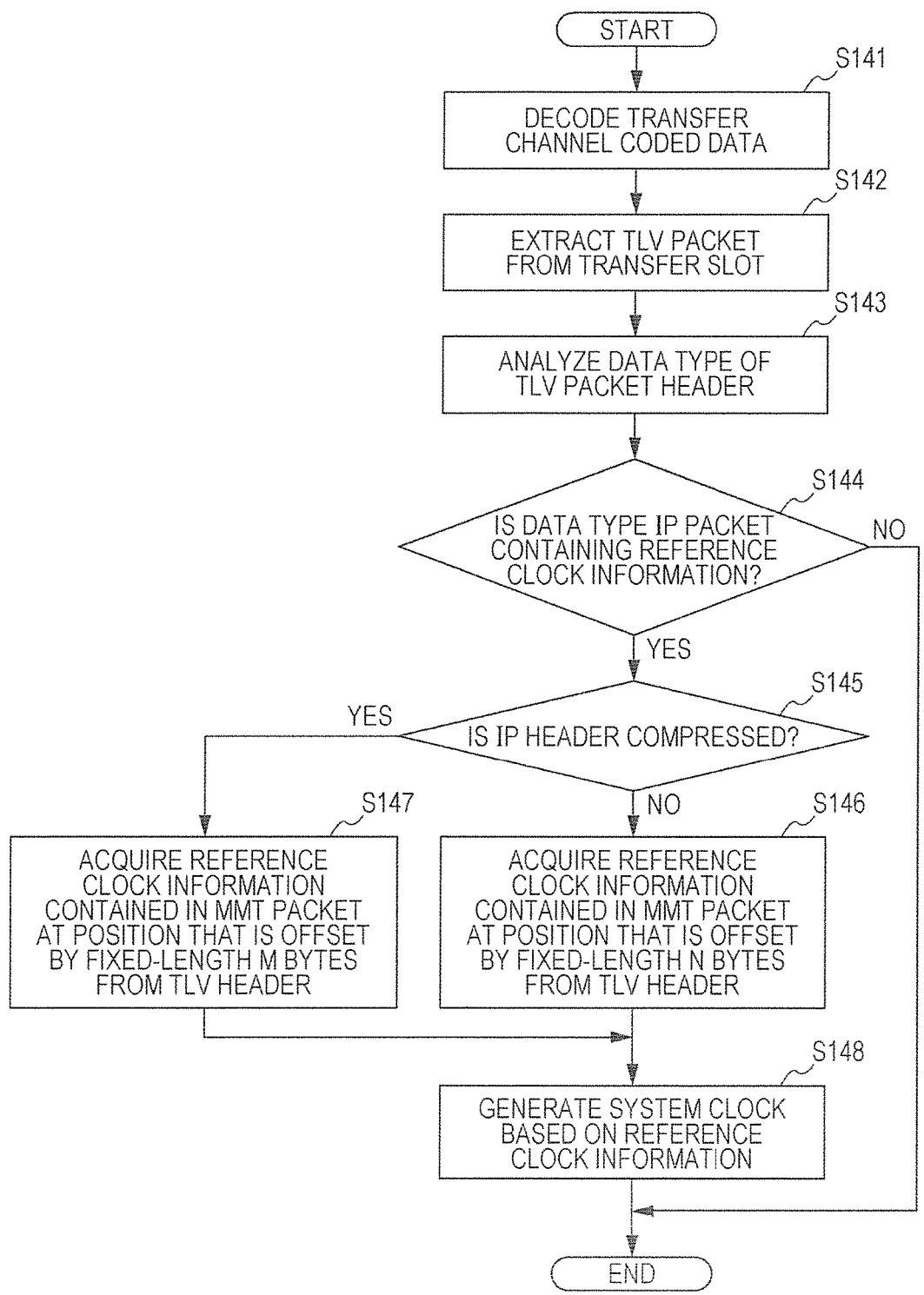
FIG. 21 is a diagram illustrating a flow of extracting a bit string at a specific position from the IP packet or compressed IP packet.

A reception method for extracting the bit string at a specific position from the IP packet or compressed IP packet will be described below with reference to the flowchart. FIG. 21 is a flowchart for extracting the bit string at a specific position from the IP packet or compressed IP packet. Note that the configuration of reception apparatus 20 is similar to the block diagram illustrated in FIG. 8.

In the flow of FIG. 21, first, decoder 11 decodes the transfer channel coded data received by receiver 10 (S141), and extracts the TLV packet from the transfer channel slot (S142).

Next, TLV demultiplexer 12 analyzes the data type of TLV packet (S143), and determines whether the data type is an IP that contains reference clock information (S144).

When the determination is made such that the data type is not an IP packet that contains reference clock information (No in S144), the flow ends. When the determination is made such that the data type is an IP packet that contains reference clock information (Yes in S144), TLV demultiplexer 12 determines whether the IP header is compressed (S145).

When the IP header is not compressed (No in S145), reference clock information extractor 15 acquires the reference clock information contained within the MMT packet at a position that is offset by fixed-length N bytes from the TLV header (S146). When the IP header is compressed (Yes in S145), reference clock information extractor 15 acquires the reference clock information contained within the MMT packet at a position that is offset by fixed-length M bytes from the TLV header (S147).

For example, when the determination is made in step S145 such that the IP header undergoes compression processing, in step S146, reference clock information extractor 15 acquires the reference clock information contained in the MMT packet from the position that is offset by N bytes from the TLV header. On the other hand, when the determination is made in step S145 such that the IP header does not undergo compression processing, in step S147, reference clock information extractor 15 acquires the reference clock information contained in the MMT packet from the position that is offset by M bytes from the TLV header.

Finally, reference clock generator 16 generates the system clock based on the reference clock information (S148).

Note that, since data structure of the IP packet header differs according to whether the IP packet is IPv4 or IPv6, the fixed-length N bytes and M bytes have different values.

While the normal MMT packet containing voice, video, control signal, and the like undergoes DEMUX processing in normal steps, the MMT packet containing the reference clock information undergoes batch DEMUX processing from the lower layer to the upper layer. This allows the reception apparatus to acquire the reference clock information in the lower layer even when the reference clock information is stored in the upper layer. That is, the reception apparatus can reduce the processes for acquisition of the reference clock information, shorten time to the acquisition of the reference clock information, and facilitate hardware implementation.

Second Exemplary Embodiment

Currently, as a method for using an extension area in TMCC control information (hereinafter also simply referred to as TMCC) under an advanced BS transfer scheme, ARIB (Association of Radio Industries and Businesses) is studying a method for transmitting urgent information and the like as a payload.

However, a proposed conventional method for using the extension area in the TMCC control information is limited to a method for transmitting a data payload, such as text and images, by using the TMCC control information extending over several frames. Therefore, the method for using the extension area in the TMCC control information will be limited, which needs to be addressed.

For example, it is difficult to store control information (control signal) that does not change in value for each frame, such as a conventional transfer mode and slot information, or control information that changes in value for each frame, such as reference clock information, in the extension area of the TMCC control information simultaneously with payload data extending over several frames.

Therefore, the second exemplary embodiment describes a method for making it possible to store data with different reception processing simultaneously in the extension area of the TMCC control information, by dividing the extension area of the TMCC control information in accordance with a classification of information and data to be stored in the extension area of the TMCC control information. The present disclosure can enhance flexibility of extension by providing extensibility to the use of the extension area. In addition, the reception apparatus can perform reception and analysis of the TMCC control information by reception methods different for each classification based on the classification of data.

In addition, the method according to the present disclosure allows payload data extending over several frames and payload data of one frame to be included together in the extension area. Since the reception apparatus can acquire the payload data of one frame first even while the payload data extending over several frames cannot be received, urgent information can be acquired and presented more quickly.

[Structure of TMCC Extension Information]

Structure of TMCC extension information will be described below. Note that basic structure of the TMCC control information is structure illustrated in FIG. 16. The control information to be stored in the TMCC control information is classified roughly into a first type and a second type below.

The first type of control information relates to frames, and does not change in value for each frame. A minimum update interval of the control information that does not change in value for each frame is a frame unit. Here, when the value of the control information is changed, the control information after the change is transmitted two frames ahead. In addition, when the value of the control information is changed, notification is made by increment of an 8-bit change instruction. Specifically, information other than pointer information and slot information corresponds to the control information that does not change in value for each frame.

The second type of control information relates to frames, and changes in value for each frame. Since the control information that changes in value for each frame is information that changes in value for each frame, the change instruction is not made. Specifically, such control information is the pointer information and the slot information.

FIG. 22 is a diagram illustrating an example of structure of the TMCC extension information. FIG. 22B is a diagram illustrating another example of structures of TMCC extension information. In FIG. 22A, the TMCC extension information includes 16-bit extension identification and 3598-bit extension area. Setting a value other than all 0 in the extension identification validates the extension area.

FIG. 22B is a diagram illustrating an example of a conventionally proposed bit assignment method when the extension area is used as a payload. In FIG. 22B, when the extension area is used as a payload, a number of pages includes 16 bits, and indicates over how many frames of the TMCC control information during transfer an additional information payload is transferred.

A page number includes 16 bits, and indicates in which page the TMCC control information during transfer is among the number of pages. An additional information classification includes 8 bits, and specifies the classification of the additional information. Specifically, the additional information classification is, for example, superimposed characters (subtitles), graphics, voice, and the like.

All of the extension area will be used as a payload, and thus it is difficult to store control information such as the conventional TMCC control information into an extension area.

[Extension Method of the TMCC Extension Area]

Here, a method will be described for storing data with different reception processing in the TMCC extension area, by dividing the TMCC extension area in accordance with the classification of information and data to be stored in the TMCC extension area.

The classification of information and data to be stored in the TMCC extension area (hereinafter referred to as an extension classification) is classified as follows, for example.

Type A:
Type A indicates control information that relates to frames, and does not change in value for each frame.
The minimum update interval is a frame unit. When there is a change in value, information after the change is transmitted two frames ahead.
In addition, when there is a change in value, notification of the change is made by increment of the 8-bit change instruction.

Type B:
Type B indicates control information that relates to frames, and changes in value for each frame.
Type B indicates information that changes in value for each frame, and the change instruction is not made.

Type C:
Type C indicates information or data that is used as a payload (conventional extension scheme).
However, for the change instruction, a change instruction field which is identical to TMCC which is not the extension area may be used, and the change instruction field may be independently prescribed in the extension area.

FIG. 23 is a diagram illustrating an example of data structure (bit arrangement) of the extension area where the classified extension classification is used. FIG. 24A is a diagram illustrating an example of syntax when the extension classification is used. FIG. 24B is a diagram illustrating another example of syntax when the extension classification is used.

In FIG. 23, only the aforementioned three types are defined as the extension classification. In addition, in FIG. 24A, subsequent to storage of a data length in each of the three types of extension classification, extension data with a length indicated in the data length is stored for each extension classification. The reception apparatus extracts data with the length indicated in the data length from the extension area for each extension classification, and performs processing.

For example, regarding data of Type A, the reception apparatus acquires the data when there is a change instruction. When there is a change in the data of Type A, the reception apparatus considers that the control information is changed, and performs processing on the control information in accordance with the change.

In addition, regarding data of Type B, since the data of Type B changes in value for each frame, the reception apparatus acquires the data for every frame. For example, when the reference clock information that changes in value for each frame is stored in the TMCC control information, the reference clock information is stored in a data area of Type B.

Data of Type C contains payload information of the conventional extension scheme. Regarding the data of Type C, the reception apparatus performs operation in accordance with acquisition under the conventional extension scheme.

In the aforementioned example, details of data structure for each extension classification are separately prescribed. When prescribed separately, an identifier similar to the additional information classification and an object service specification method in the data of Type C in FIG. 22B may be prescribed in other types. Note that the additional information classification may be defined using a common table, and the extension identification and the additional information classification may be merged.

In addition, information that may change in data length on the way may be considered as a classification similar to the data of Type A. When there is a change in data length, a change instruction may be made through transmission of information after the change two frames ahead. When there is a change instruction, the reception apparatus confirms whether there is any change in the data length with reference to the data length of the extension classification.

Note that the data structure is not limited to the structure as illustrated in FIG. 23. For example, when the data length of the extension classification is fixed in advance, transmission of the data length may be omitted. Specifically, when the data length with the extension classification of Type A is fixed-length in FIG. 23, placement of the data length with the extension classification of Type A may be omitted within the data structure. In addition, when the data length with the extension classification of Type A and the data length with the extension classification of Type B are fixed-length, placement of the data length of all types may be omitted. In addition, a flag that indicates whether there is any data of the extension classification may be provided within the data structure.

In addition, syntax for using the extension classification is not limited to syntax illustrated in FIG. 24(a). For example, in FIG. 24(b), an extension area number is set, and the extension classification and extension area length are stored for each extension area number in the syntax. Subsequently, the extension data of the extension area number is stored in the syntax.

The syntax in FIG. 24(a) and FIG. 24(b) supports addition of the extension classification in the future. In addition, since the syntax in FIG. 24(a) and FIG. 24(b) enables storage of a plurality of pieces of data with identical extension classification, it is not necessary to determine details of data structure for each identical extension classification in advance. In addition, even when used as a payload (as Type C), the syntax in FIG. 24(a) and FIG. 24(b) allows description of a plurality of pieces of data with different number of pages, such as video and voice, in an identical frame.

Note that, in the syntax of FIG. 24(b), the extension area number, extension classification, and extension area length may be classifications similar to Type A. That is, these pieces of information may be prescribed to be information that follows the change instruction. Therefore, the reception apparatus can easily make a determination of presence of changes by continuous storage of data that follows the change instruction.

In addition, an undefined area may be provided in the extension classification in preparation for future extension. As an extension classification to be introduced in the future, for example, the following classifications are assumed.

This is a control signal to be updated for each several frames, and the change instruction is not made.
For an urgent signal, the change instruction is made in a similar manner to Type A. However, processing of value change is performed in the frame after acquisition of the change instruction, instead of after acquisition of information that is two frames ahead.

In addition, for the aforementioned urgent signal, an urgent flag may be transmitted using the extension classification accompanied by the change instruction, and urgent data may be transmitted using a payload. In addition, the extension classification may be classified in accordance with whether to follow the change instruction.

[Detailed Configuration and Operation Flow]

Figure 25:
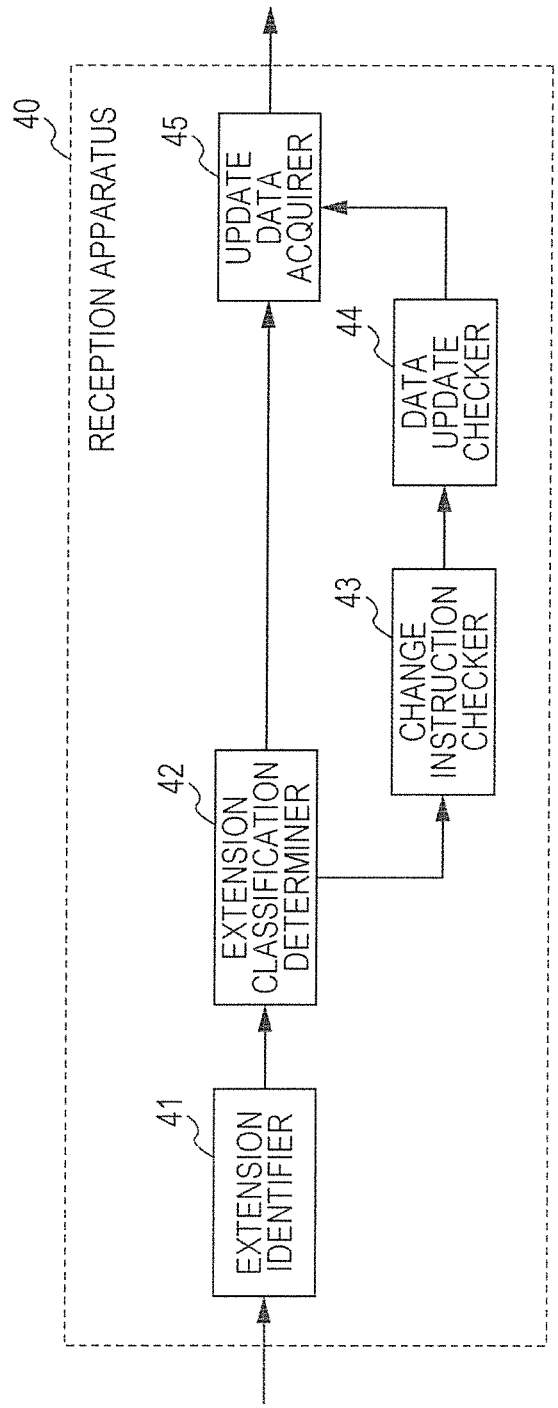
FIG. 25 is a block diagram illustrating a functional configuration of a reception apparatus according to a second exemplary embodiment.
Figure 26:
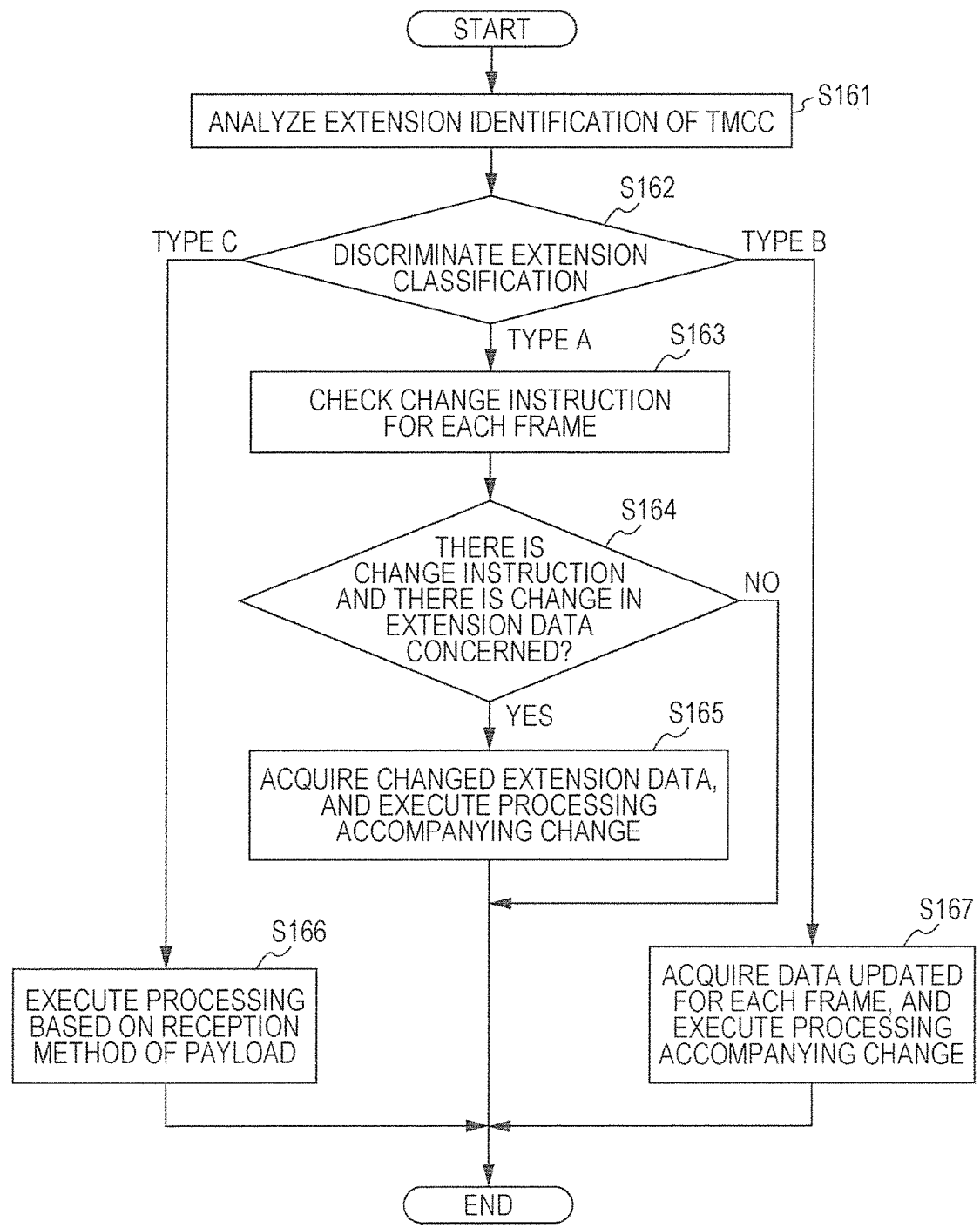
FIG. 26 is a diagram illustrating an operation flow of the reception apparatus according to the second exemplary embodiment.

A functional configuration and operation flow of the reception apparatus as described above will be described. FIG. 25 is a block diagram illustrating the functional configuration of the reception apparatus according to the second exemplary embodiment. FIG. 26 is a diagram illustrating the operation flow of the reception apparatus according to the second exemplary embodiment. Note that, in the following description, the extension classification includes three types, Type A, Type B, and Type C, as described above.

As illustrated in FIG. 25, reception apparatus 40 includes extension identifier 41, extension classification determiner 42, change instruction checker 43, data update checker 44, and update data acquirer 45.

First, extension identifier 41 analyzes the extension identification of the TMCC control information (S161). When the extension identification is other than all 0 here, extension identifier 41 determines that the extension area is effective, and reception apparatus 40 executes the following processing for each extension area.

Next, extension classification determiner 42 discriminates (determines) the extension classification (S162). When it is discriminated that the extension classification is Type A (Type A in S162), data of an area specified by the extension area length is control information which does not change in value for each frame, the control information following the change instruction. Therefore, change instruction checker 43 checks the change instruction for each frame (S163).

Subsequently, data update checker 44 determines data update (S164). When it is determined that there is a change instruction and that there is a change in the extension data (Yes in S164), update data acquirer 45 acquires updated extension data and executes processing accompanying the change (S165).

On the other hand, when it is not determined as described above in step S164 (No in S164), update data acquirer 45 determines that there is no change in the extension data.

In addition, when it is discriminated in step S162 that the extension classification is Type B (Type B in S162), update data acquirer 45 references data specified by the extension area length, acquires data updated for each frame, and executes processing accompanying the change (S167).

When it is discriminated in step S162 that the extension classification is Type C (Type C in S162), update data acquirer 45 executes processing based on the conventional reception method under the payload extension scheme (S166).

Note that, when it is discriminated that the extension area number, extension classification, and extension area length are classifications similar to Type A that follows the change instruction as described above, update data acquirer 45 checks change instructions. When there is a change instruction, update data acquirer 45 checks whether information is updated.

Note that reception apparatus 40 may determine reception processing based on the extension classification, and may determine in which processing block the data processing should be performed. Reception apparatus 40 may determine, for example, to process the data of Type A and the data of Type B by hardware, and to process the data of Type C by software.

[Advantageous Effects, etc.]

As described above, the second exemplary embodiment has described the method for dividing the TMCC extension area under the advanced BS transfer scheme for each extension classification, and for storing the extension data in the TMCC extension area. Reception apparatus 40 determines the extension data processing method based on the extension classification.

Accordingly, the TMCC extension area can store a plurality of pieces of data with different reception processing simultaneously. That is, the present disclosure makes it possible to provide extensibility to the method for using the TMCC extension area.

Specifically, for example, the TMCC extension area can store the payload and the reference clock information simultaneously.

In addition, it is possible to cause the payload data extending over several frames and the payload data of one frame to be included together in the TMCC extension area. Accordingly, even when it is difficult to receive the payload data extending over several frames, reception apparatus 40 can first acquire the payload data of one frame. Therefore, reception apparatus 40 can acquire and present urgent information more quickly.

Third Exemplary Embodiment

A third exemplary embodiment describes a method for transmitting a plurality of pieces of reference clock information that belong to different layers.

[Summary]

Figure 27:
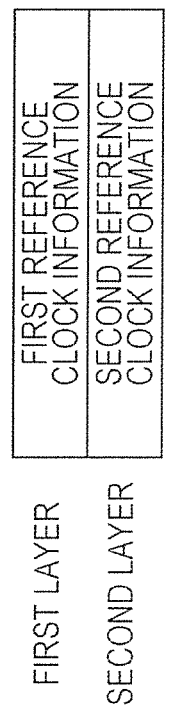
FIG. 27 is a diagram schematically illustrating an example in which the reference clock information is stored in each of a plurality of layers.

FIG. 27 is a diagram schematically illustrating an example in which the pieces of reference clock information are stored in the respective plurality of layers.

In FIG. 27, a first layer is a layer upper than a second layer, and the first layer stores first reference clock information. The second layer stores second reference clock information.

A transmission apparatus performs MUX processing in the second layer after performing MUX processing in the first layer. In addition, a reception apparatus performs DEMUX processing in the first layer after performing DEMUX processing in the second layer.

When storing the first reference clock information in the first layer and storing the second reference clock information in the second layer, as information that indicates a relationship between the first reference clock information and the second reference clock information, the transmission apparatus stores, for example, the following information.

As a first example, the transmission apparatus allows a transmission signal (for example, a transfer frame) to include information indicating that the plurality of pieces of reference clock information is stored within the transmission signal.

Specifically, in at least one or more layers among the layers in which the reference clock information is contained, the transmission apparatus stores information indicating that the reference clock information is stored also in layers other than the aforementioned layers.

In addition, in a layer in which the reference clock information is not contained, the transmission apparatus may indicate that the plurality of pieces of reference clock information is stored. For example, the transmission apparatus may store, in the lower layer (second layer), information that indicates whether the reference clock information is contained in the upper layer (first layer). The reception apparatus may determine whether to perform acquisition of the reference clock information and reproduction of a reference clock in the lower layer in processing of the lower layer taking into consideration whether the reference clock information is contained in the upper layer.

As a second example, the transmission apparatus allows the transmission signal to include information regarding the first reference clock information and the second reference clock information.

Specifically, the transmission apparatus stores, in each layer, information that indicates a type of reference clock information contained in the layer. Alternatively, the transmission apparatus stores, in each layer, information that indicates a type of reference clock information contained in a layer other than the aforementioned layer.

The reference clock information is, for example, a plurality of types of information, such as 32-bit NTP, 64-bit NTP, and 24-bit SMPTE (Society of Motion Picture and Television Engineers) time code. The information that indicates the type of reference clock information is information that can specify a format (including information such as precision) of the reference clock information.

Note that, when it is known in advance that a predetermined type of reference clock information is contained, the layer does not need to contain the information that indicates the type of reference clock information.

As a third example, the transmission apparatus allows the transmission signal to include information that indicates a relative relationship between the first reference clock information and the second reference clock information.

Specifically, the transmission apparatus allows the transmission signal to include information that indicates a relative relationship of precision of the reference clock information. For example, the transmission apparatus allows the transmission signal to include information that indicates whether precision of the second reference clock information is high or low with respect to precision of the first reference clock information.

In addition, the information that indicates the relative relationship may be information that indicates the relative relationship based on size of a total bit number of the reference clock information, and may be information that indicates the relative relationship of a dynamic range based on size of a bit number of an integer part.

Alternatively, the information that indicates the relative relationship may be information that indicates the relative relationship of precision of resolving power (resolution) based on size of a bit number of a decimal part. In addition, the information that indicates the relative relationship may be information that indicates the relative relationship of precision at a time of acquisition of the reference clock information, based on a difference in precision resulting from a difference in reliability of the reference clock information in the transmission apparatus, quality of a transfer channel, and throughput in transmission processing and reception processing.

In addition, the information that indicates the relative relationship may be information that indicates a difference in precision between the pieces of reference clock information. For example, when there is a difference in the decimal bit number, the information that indicates the relative relationship may be information that indicates the difference in the decimal bit number. The information that indicates the relative relationship may be information that indicates information that indicates whether the precision differs for each. When the precision differs for each, the information that indicates the relative relationship may be stored. Note that, when the relative relationship of precision is known in advance, the information that indicates the relative relationship of precision does not need to be included.

By the transmission apparatus transmitting the information that indicates the relative relationship of precision, when the transmitted information indicates that precision of the second reference clock information is low with respect to precision of the first reference clock information, the reception apparatus can perform control including avoiding performing acquisition and reproduction of the second reference clock information, performing acquisition and reproduction of the first reference clock information, and performing synchronous reproduction based on the first reference clock information. Alternatively, when the transmitted information indicates that precision of the second reference clock information is high with respect to precision of the first reference clock information, the reception apparatus can perform control including avoiding performing acquisition and reproduction of the first reference clock information, performing acquisition and reproduction of the second reference clock information, and performing synchronous reproduction based on the second reference clock information.

As a fourth example, the transmission apparatus allows the transmission signal to include information that indicates a relative relationship of time between the pieces of reference clock information. Specifically, the transmission apparatus transmits information that indicates relative time between the first reference clock information and the second reference clock information. For example, the transmission apparatus transmits the information that indicates relative time by using CRI_descriptor in an MMT scheme. Note that information that indicates whether the first reference clock information and the second reference clock information are generated based on an identical reference clock may be included in the transmission signal.

When each of the pieces of reference clock information is generated based on an identical reference clock, in the reception apparatus, a difference may arise in acquisition timing between the first reference clock information and the second reference clock information. That is, a fixed time difference arises between End-to-End delays of respective pieces of reference clock information.

Therefore, the transmission apparatus calculates a time difference $\Delta\_A$ between imparting timing of the first reference clock information and imparting timing of the second reference clock information, and stores the calculated time difference $\Delta\_A$ in the transmission signal as time corresponding to acquisition timing of the first reference clock information and the second reference clock information. The reception apparatus acquires the time difference $\Delta\_A$ from the transmission signal, and corrects the End-to-End delay difference between the first reference clock information and the second reference clock information based on the time difference $\Delta\_A$.

In addition, when each piece of the first reference clock information and the second reference clock information is generated based on the reference clock of an identical format and when each piece of the first reference clock information and the second reference clock information has a fixed delay difference $\Delta\_B$, the transmission apparatus stores and transmits information that indicates the fixed delay difference $\Delta\_B$ of the reference clock information. The reception apparatus acquires the delay difference $\Delta\_B$, and corrects the fixed delay difference of the reference clock based on the delay difference $\Delta\_B$.

In addition, when the reference clock on which each piece of the first reference clock information and the second reference clock information is based has the fixed delay $\Delta\_B$, the transmission apparatus transmits a transmission signal that includes the fixed delay $\Delta\_B$ in the second layer, which is a lower layer.

In addition, when each piece of the first reference clock information and the second reference clock information is generated based on the reference clock of an identical format, the second reference clock information may be represented with a difference from the first reference clock information based on the first reference clock information. Note that the first reference clock information may be represented with a difference from the second reference clock information based on the second reference clock information.

As a fifth example, when the plurality of pieces of reference clock information is stored, the transmission apparatus allows the transmission signal to include information on whether to use the reference clock information stored in a different layer. The transmission apparatus allows the transmission signal to include, for example, information as to instructions to use, in the first layer, the second reference clock information stored in the second layer. Based on the information included in the transmission signal, the reception apparatus can generate the second reference clock information and output the generated second reference clock information in the first layer.

The information described above is stored in at least one or more layers. For example, regarding the information described above, the above-described information may be stored in the first layer among the plurality of layers, may be stored in the second layer, and may be stored in the first layer and the second layer. In addition, regarding the information described above, in each layer, information regarding the reference clock information in the layer may be stored, and information that indicates the relative relationship may be stored in at least one or more layers.

Note that the information that indicates the relative relationship is preferably stored in the lower layer (second layer). In addition, the information that indicates the relative relationship may be stored in a layer lower than the second layer (not illustrated in FIG. 27). The reception apparatus, which can acquire information regarding the reference clock information in the upper layer (first layer) when performing DEMUX processing in the lower layer (second layer), can perform higher-speed processing.

Note that a combination of the first layer and the second layer may be any combination. For example, the combination of the first layer and the second layer may be a combination of an MMT layer and an IP layer, a combination of an MMT layer and a transfer layer, and a combination of an IP layer and a transfer layer. In addition, for MMToverTS, the combination of the first layer and the second layer may be a combination of MMT and TS.

In addition, the information described above is stored in a control signal of each layer. For example, under the MMT scheme, the information described above is stored in a descriptor, table, message, or packet header information. Under an MPEG2-TS scheme, the information described above is stored in a descriptor, table, section, or header information. In addition, the information described above may be stored in TMCC or a slot header in the transfer layer. When a transfer scheme is DVB (Digital Video Broadcasting), the information described above is stored in TPS (Transmission Parameters Signaling), L1 data, L2 data, P1 data, P2 data, and the like.

Note that the first reference clock information and the second reference clock information may be pieces of reference clock information of an identical type, and may be pieces of reference clock information of different types. In addition, the first reference clock information and the second reference clock information may be pieces of reference clock information with different precision. The first reference clock information and the second reference clock information may be pieces of reference clock information based on an identical reference clock, and may be pieces of reference clock information based on different reference clocks.

In addition, the transmission apparatus may transmit three or more pieces of reference clock information, and may store the three or more pieces of reference clock information in three or more respective layers for transmission. In addition, the transmission apparatus may store the respective pieces of reference clock information in different fields within data structure in an identical layer. In addition, another layer may exist between the first layer and the second layer.

The reference clock information, which is, for example, NTP, time code, and PTP (Precision Time Protocol), may be reference clock information other than these examples. In addition, the reference clock information may be another piece of information regarding time (for example, TOT (Time Offset Table) and TDT (Time Date Table)).

Figure 28:
FIG. 28 is a diagram schematically illustrating an example in which a plurality of pieces of the reference clock information is stored in one layer.

FIG. 28 is a diagram schematically illustrating an example in which a plurality of pieces of reference clock information is stored in one layer. In FIG. 28, the first layer contains three pieces of reference clock information, that is, first reference clock information, second reference clock information, and third reference clock information.

The transmission apparatus may store information regarding the first reference clock information and the second reference clock information, information that indicates a relative relationship (of precision or time) between the first reference clock information and the second reference clock information, and the like.

As one example, a case will be described of storing a plurality of pieces of reference clock information in TMCC. As described in FIG. 17, a broadcasting station apparatus can transmit 16 streams under an advanced BS transfer scheme, and it is assumed that, for example, pieces of data generated by different broadcasting station apparatuses are stored in separate streams. FIG. 29 is a block diagram for describing an example in which the pieces of data generated by different broadcasting station apparatuses are stored in separate streams.

In FIG. 29, each of first broadcasting station apparatus 51, second broadcasting station apparatus 52, and third broadcasting station apparatus 53 transmits data generated in each broadcasting station apparatus to satellite transmitting station apparatus 54 by using cables, such as an optical network, and radio. Satellite transmitting station apparatus 54 multiplexes the streams of respective broadcasting station apparatuses into an identical transfer channel under the advanced BS transfer scheme. Satellite transmitting station apparatus 54 stores in TMCC the pieces of reference clock information corresponding to the respective streams of the first, second, and third broadcasting station apparatuses, and transfers the pieces of reference clock information to reception apparatus 50.

In FIG. 28, the first reference clock information corresponds to the reference clock information of first broadcasting station apparatus 51, the second reference clock information corresponds to the reference clock information of second broadcasting station apparatus 52, and the third reference clock information corresponds to the reference clock information of third broadcasting station apparatus 53.

In a case where each broadcasting station apparatus performs processing based on common reference clock information, such as NTP, in satellite transmitting station apparatus 54, the pieces of reference clock information in respective broadcasting station apparatuses 51, 52, 53 have a time difference due to a difference in the End-to-End delay caused by a reception processing delay or a transfer delay until arrival at satellite transmitting station apparatus 54.

When the common reference clock information to be used in respective broadcasting station apparatuses 51, 52, 53 is NTP_base, the first reference clock information in satellite transmitting station apparatus 54 is denoted as NTP_base+$\Delta 1$, the second reference clock information is denoted as NTP_base+$\Delta 2$, and the third reference clock information is denoted as NTP_base+$\Delta 3$.

FIG. 30 is a diagram for describing a transmission method of pieces of difference information. In FIG. 30, the transmission apparatus (satellite transmitting station apparatus 54) may transmit the common reference clock information NTP_base, and may transmit the pieces of difference information between respective pieces of reference clock information and the common reference clock information ($\Delta 1$, $\Delta 2$, $\Delta 3$). In addition, for example, out of 64-bit reference clock information, by representing base reference clock information with top 16 bits, and representing the difference information with remaining 48 bits, the transmission apparatus can reduce an amount of information (size) for transferring the reference clock information.

Note that the base reference clock information (reference value) does not need to be NTP_base, but may be the earliest (with small delay) reference clock information among the plurality of pieces of reference clock information. Alternatively, the base reference clock information (reference value) may be a value smaller than a value of the earliest reference clock information.

In addition, FIG. 31 is a diagram for describing a variation of the transmission method of the difference information. In FIG. 31, the base reference clock information and the difference information may be transmitted at different frequencies; for example, the base reference clock information is transmitted for every frame, and the difference information is transmitted in order for every three frames. By the transmission method in FIG. 31, the transmission apparatus can reduce the amount of information (size) for transferring the reference clock information.

Reception apparatus 50 uses the base reference clock information to reproduce the base reference clock. After reproduction of the base reference clock information, reception apparatus 50 may use the difference information to generate each reference clock.

[Detailed Configuration and Operation Flow]

Figure 32:
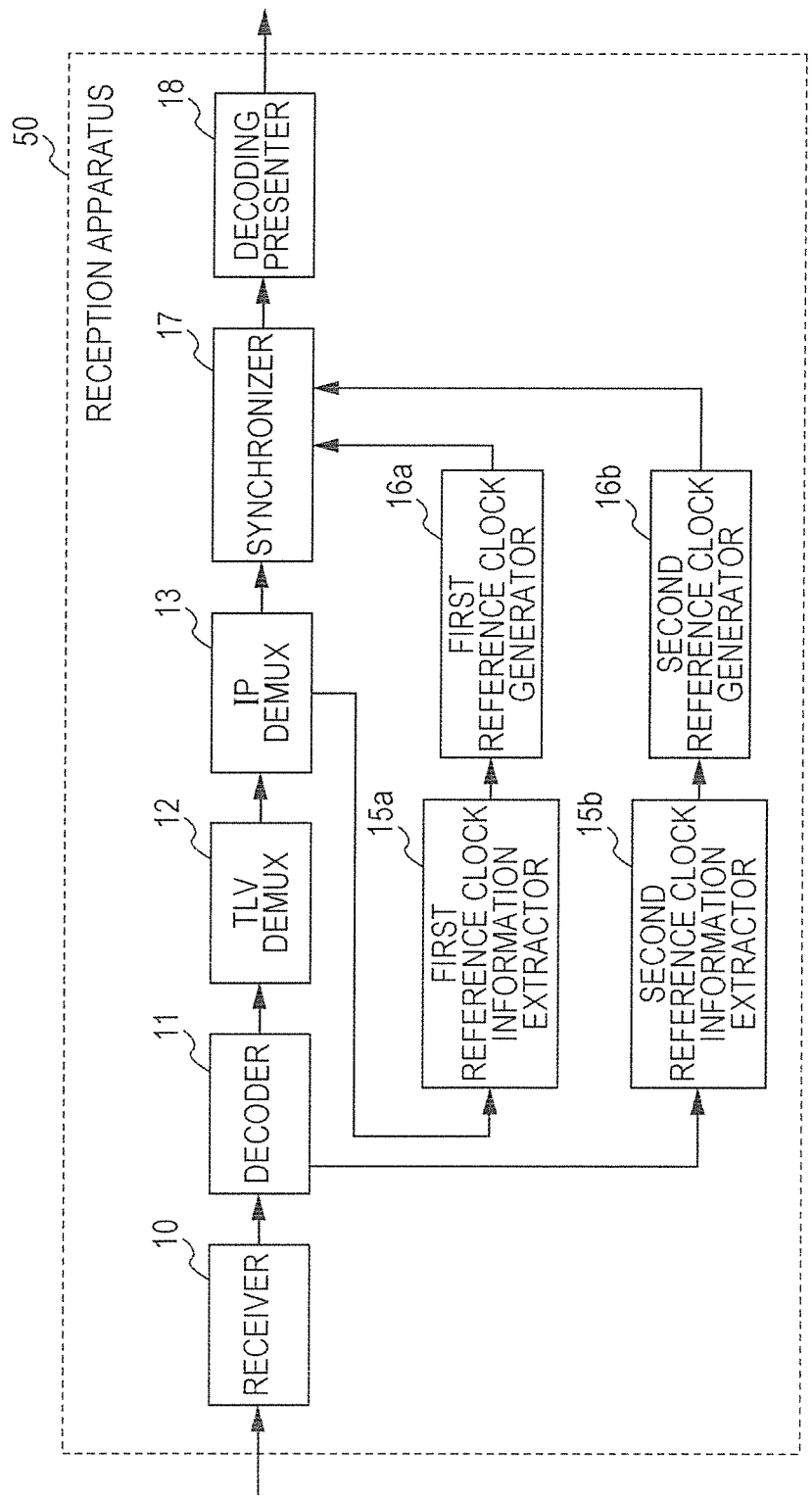
FIG. 32 is a block diagram illustrating a functional configuration of a reception apparatus according to a third exemplary embodiment.
Figure 33:
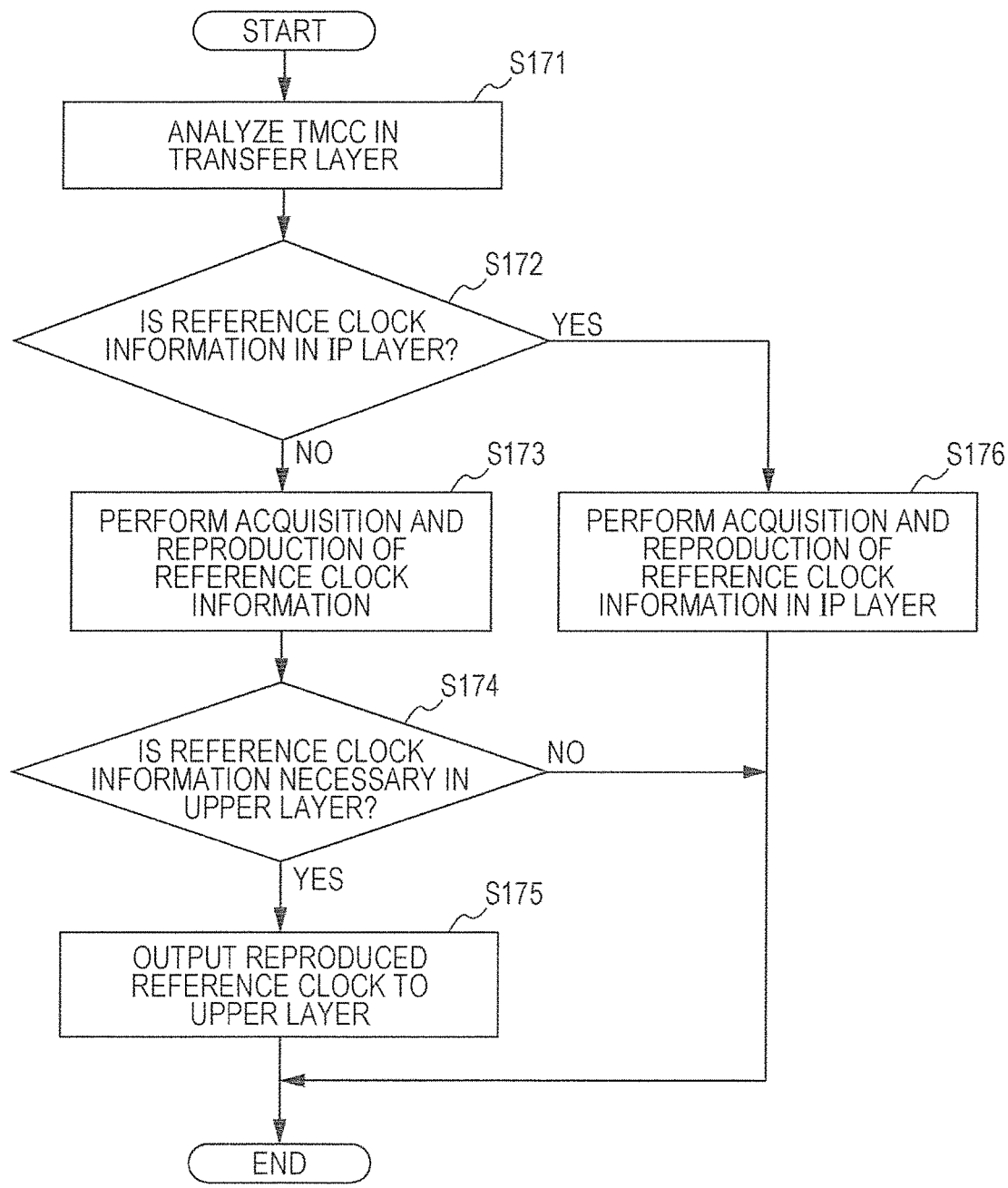
FIG. 33 is a diagram illustrating an operation flow of the reception apparatus according to the third exemplary embodiment.

Here, a functional configuration and operation flow of reception apparatus 50 will be described. FIG. 32 is a block diagram illustrating the functional configuration of reception apparatus 50. FIG. 33 is a diagram illustrating the operation flow of reception apparatus 50. Here, the following describes an example in which the reference clock information is stored in either one of the IP layer and the transfer layer, and based on the reference clock information in either layer, reception apparatus 50 reproduces the reference clock.

Reception apparatus 50 includes receiver 10, decoder 11, TLV demultiplexer 12, IP demultiplexer 13, MMT demultiplexer 14, synchronizer 17, and decoding presenter 18. In addition, reception apparatus 50 includes first reference clock information extractor 15a, second reference clock information extractor 15b, first reference clock generator 16a, and second reference clock generator 16b.

Control information of the transfer layer (such as slot header and TMCC, herein TMCC) stores a flag that indicates whether the reference clock information is in the IP layer. In addition, when there is no reference clock information in the IP layer, the control information of the transfer layer stores the reference clock information.

In addition, the control information of the transfer layer stores, when there is no reference clock information in the IP layer, a flag that indicates whether the reference clock information acquired in the transfer layer is necessary for processing in the upper layer, or a flag that indicates whether the reproduced reference clock information is necessary for processing in the upper layer.

For example, when the reference clock information is 64-bit NTP, NTP is stored in a 64-bit field that indicates reference clock information. In addition, a flag that indicates whether the reference clock information is in the IP layer may be provided in the field for reference clock information. Since the transfer layer does not need to store the reference clock information when the reference clock information is stored in the IP layer, the field may be utilized.

For example, when the reference clock information is in the IP layer and a predetermined value (for example, ALL 1) is in the field for reference clock information, reception apparatus 50 determines that the value is not reference clock information but is the flag that indicates that the reference clock information is in the IP layer. Alternatively, a value based on a predetermined rule may be used as a flag; for example, when ALL 1 is indicated once in the field for reference clock information, reception apparatus 50 determines that the reference clock information is in the field, and when ALL 1 is indicated continuously more often than a predetermined number of times, reception apparatus 50 determines that the reference clock information is in the IP layer.

Decoder 11 of reception apparatus 50 analyzes TMCC, which is control information, in the transfer layer, and analyzes various flags and the reference clock information (S171). Then, decoder 11 makes a determination based on the aforementioned flags (S172). When it is determined that the reference clock information is not in the IP layer (the reference clock information is in the transfer layer) (No in S172), second reference clock information extractor 15b acquires (extracts) the reference clock information in the transfer layer, and second reference clock generator 16b reproduces (generates) the reference clock.

Next, decoder 11 makes a determination on whether the reference clock reproduced in the transfer layer is necessary for processing in the upper layer (S174). When it is determined that the reference clock reproduced in the transfer layer is necessary for processing in the upper layer (Yes in S174), second reference clock generator 16b outputs the reference clock reproduced in step S174 to the upper layer (S175). When it is not determined that the reference clock reproduced in the transfer layer is necessary for processing in the upper layer (No in S174), the processing ends.

On the other hand, when it is determined that the reference clock information is in the IP layer (the reference clock information is not in the transfer layer) (Yes in S172), decoder 11 does not perform acquisition of the reference clock information and reproduction of the reference clock in the transfer layer. In this case, first reference clock information extractor 15a and first reference clock generator 16a respectively perform acquisition of the reference clock information and reproduction of the reference clock in the IP layer (S176).

Note that, when reproduction of the reference clock is not necessary in the transfer layer, and when the upper layer does not need the reference clock, decoder 11 does not need to perform acquisition of the reference clock information and reproduction of the reference clock in the transfer layer (S173).

In addition, when the reference clock is necessary in the upper layer, instead of outputting the reproduced reference clock, reception apparatus 50 may pass the reference clock information to the upper layer, and perform reproduction of the reference clock in the upper layer. In addition, based on the reference clock reproduced in the transfer layer, reception apparatus 50 may newly generate reference clock information, and may output the generated reference clock information to the upper layer.

Methods for outputting the reference clock to the upper layer include a method for outputting the reproduced reference clock as it is, and a method for storing or converting and outputting the acquired reference clock information or the newly generated reference clock information into data structure to be output to the upper layer.

[Another Example of Operation Flow]

Figure 34:
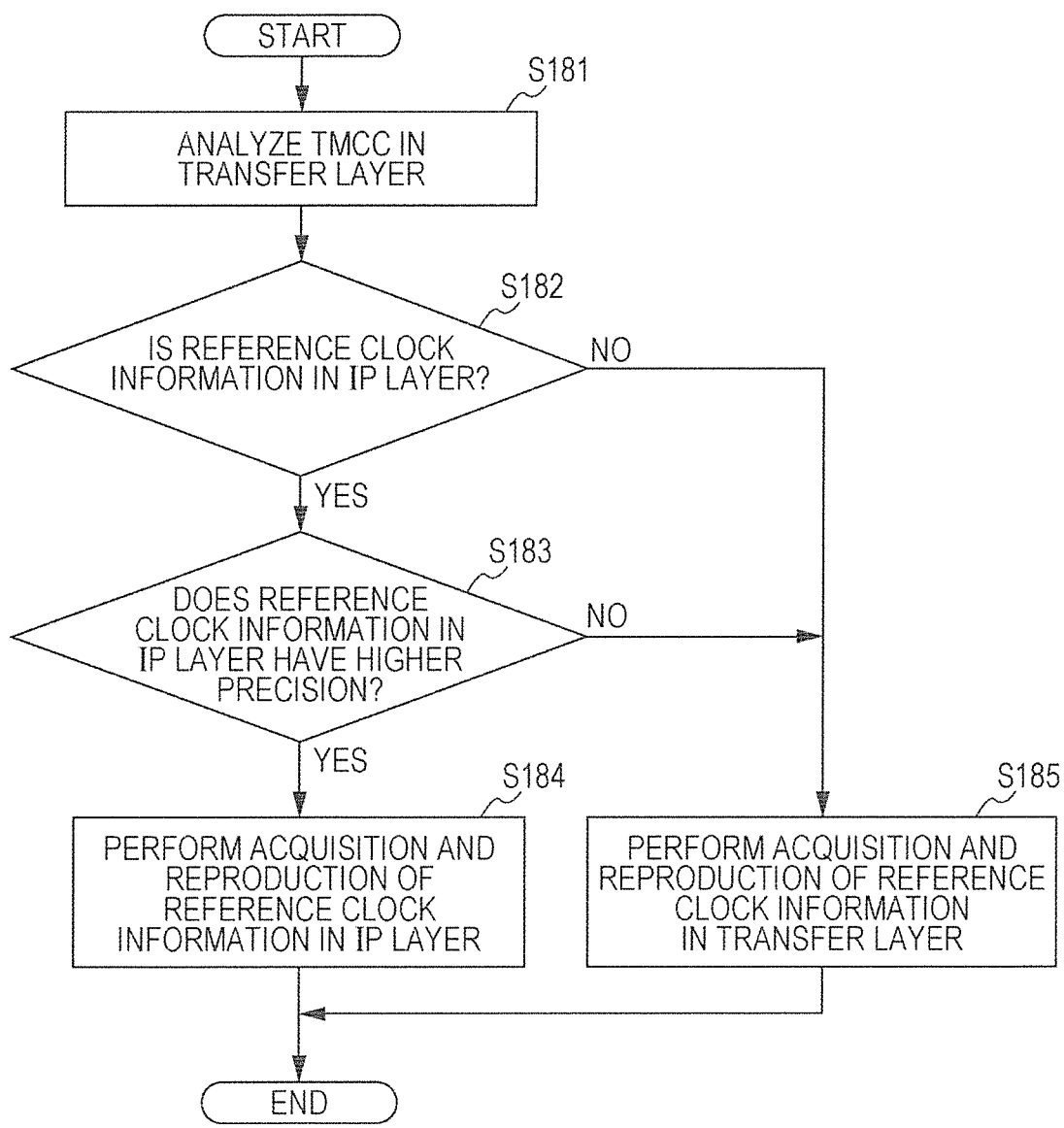
FIG. 34 is a diagram illustrating another operation flow of the reception apparatus according to the third exemplary embodiment.

Next, another operation flow of reception apparatus 50 will be described. FIG. 34 is a diagram illustrating another operation flow of reception apparatus 50. Note that the configuration of reception apparatus 50 is similar to the configuration of FIG. 32.

In FIG. 34, the reference clock information is stored in each of the IP layer and the transfer layer. When a plurality of pieces of reference clock information is stored, relative information on precision of the pieces of reference clock information is stored in either layer.

Decoder 11 analyzes TMCC (S181) and makes a determination based on the flags (S182). When it is determined that the reference clock information is not in the IP layer (No in S182), decoder 11 performs acquisition of the reference clock information and reproduction of the reference clock in the transfer layer (S185).

On the other hand, when it is determined in step S182 that the reference clock information is in the IP layer (Yes in S182), decoder 11 determines which of the reference clock information in the transfer layer and the reference clock information in the IP layer has higher precision (S183). When it is determined that precision of the reference clock information in the IP layer is higher than precision of the reference clock information in the transfer layer (Yes in S183), decoder 11 performs acquisition of the reference clock information and reproduction of the reference clock in the IP layer (S184). When it is determined that precision of the reference clock information in the IP layer is lower than precision of the reference clock information in the transfer layer (No in S183), decoder 11 performs acquisition of the reference clock information and reproduction of the reference clock in the transfer layer (S185).

[Advantageous Effects, Etc.]

As described above, the transmission apparatus may transmit a plurality of pieces of reference clock information in one or more layers. When the plurality of pieces of reference clock information is transmitted, reception apparatus 50 may select either one piece of the reference clock information to be used for generation of the reference clock (system clock), and may use both pieces of the reference clock information to generate the reference clock. Reception apparatus 50 may select high-precision reference clock information, and may select reference clock information that can be acquired more quickly.

In addition, when the reference clock information is transmitted in a plurality of layers, the transmission apparatus may store information indicating that the reference clock information is transmitted in the plurality of layers. In addition, the transmission apparatus may transmit, in the lower layer, information indicating that the reference clock information is transmitted in the plurality of layers, or information related to the layers or protocols in which the reference clock information is transmitted. Furthermore, the transmission apparatus may transmit information that indicates a relationship between the pieces of reference clock information stored in different layers.

Reception apparatus 50 can determine that the reference clock information is contained in the upper layer during DEMUX processing in the lower layer, and can decide which reference clock information to use based on this determination. Reception apparatus 50 may decide which reference clock information to use based on which layer of reference clock reproduction reception apparatus 50 supports, and recommended reference clock reproduction may be specified by broadcasting station apparatuses.

When the reference clock information is transmitted in the plurality of layers, reception apparatus 50 may extract the reference clock information in the lower layer, and may extract, from the lower layer, the reference clock information contained in the upper layer. Then, reception apparatus 50 may use at least one or more pieces of extracted reference clock information to generate the reference clock.

Here, the transmission apparatus may transmit the plurality of pieces of reference clock information through a plurality of transfer channels. The transmission apparatus may transmit the plurality of pieces of reference clock information through the plurality of transfer channels, and may transmit information related to the transfer channels through which the reference clock information is transferred.

Other Exemplary Embodiments

While the exemplary embodiments have been described above, the present disclosure is not limited to the aforementioned exemplary embodiments.

For example, it is assumed that, in addition to the conventional 32-bit short-format NTP contained in the MMT packet header, higher-precision reference clock information is transmitted. In such a case, the transmission apparatus further transmits information for allowing the reception apparatus to use the high-precision reference clock information to reproduce the 32-bit short-format NTP. The aforementioned information is, for example, time information indicating a relative relationship between clocks, and a configuration for transmitting the information by using CRI_descriptor( ), etc. may be considered.

Note that, when the reception apparatus can reproduce the 32-bit short-format NTP, the reception apparatus does not need the conventional NTP field contained in the MMT packet header. Therefore, the transmission apparatus may store another piece of information in the NTP field, and may perform header compression processing by reducing the NTP field. When the header compression processing is performed, the transmission apparatus transmits information indicating that the NTP field is reduced. When the NTP field is reduced, the reception apparatus generates the reference clock by using another piece of reference clock information, and reproduces the 32-bit short-format NTP.

In addition, when the MMT packet is transferred using a broadband transfer channel, the reception apparatus may use not the reference clock information but the 32-bit short-format NTP for QoS control. Accordingly, the transmission apparatus does not need to transmit the reference clock information through the broadband transfer channel. In addition, when the End-to-End delay of the broadband transfer channel is within a certain value, the reception apparatus may use the reference clock information for clock reproduction.

Note that, although the aforementioned first exemplary embodiment has described the case where the MMT/IP/TLV scheme is used as an example, schemes other than the MMT scheme may be used as a multiplexing scheme. For example, the present disclosure may also be applied to an MPEG2-TS scheme, RTP (Real-time Transport Protocol) scheme, or MPEG-DASH (Dynamic Adaptive Streaming over HTTP) scheme.

In addition, methods for header compression processing of IP packets may be RoHC (Robust Header Compression) and HCfB (Header Compression for Broadcasting).

Schemes for storing IP packets in broadcast may be a GSE (Generic Stream Encapsulation) scheme and IPoverTS scheme using ULE (Unidirectional Light-weight. Encapsulation) in addition to the TLV scheme.

The present disclosure may be applied to a case where any of such schemes is used. Application of the present disclosure allows the reception apparatus to achieve shortening of time to the acquisition of the reference clock information and reduction in the processes, and to achieve high precision of the clock by hardware implementation.

Note that, while the reference clock information in the aforementioned exemplary embodiments is NTP when the multiplexing scheme is MMT, for example, the reference clock information is PCR (Program Clock Reference) when the multiplexing scheme is the MPEG2-TS scheme. In addition, when the multiplexing scheme is MMT, the transmission apparatus may transfer PTP prescribed by IEEE 1588 in an NTP form, and may transfer part of bits of NTP. That is, the reference clock information may be information indicating time that is set by the transmission apparatus. Note that NTP does not mean an NTP value in an NTP server commonly used on the Internet.

Figure 35:
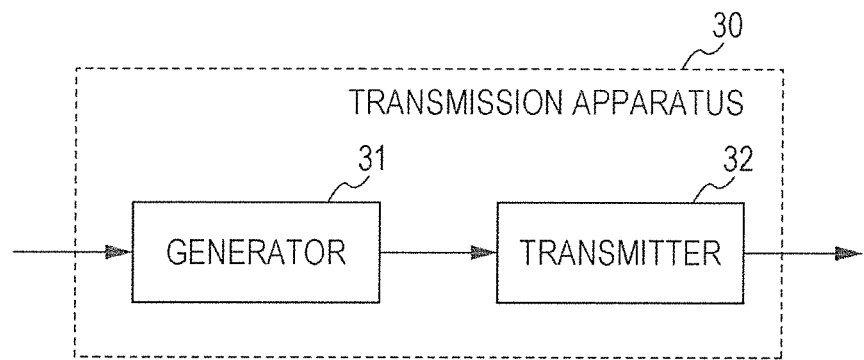
FIG. 35 is a block diagram illustrating a functional configuration of a transmission apparatus.
Figure 36:
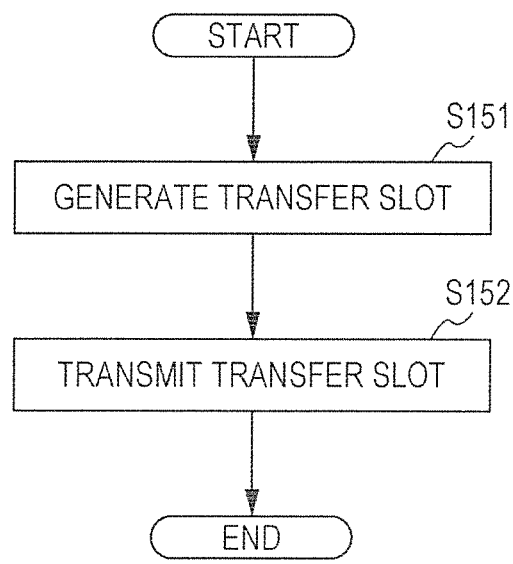
FIG. 36 is a diagram illustrating an operation flow of the transmission apparatus.

In addition, the present disclosure may be implemented as a transmission apparatus (transmission method) that transmits the transfer slot that stores the reference clock information by the aforementioned method. A configuration of the transmission apparatus will be supplemented below. FIG. 35 is a block diagram illustrating a functional configuration of the transmission apparatus. FIG. 36 is an operation flow of the transmission apparatus.

In FIG. 35, transmission apparatus 30 includes generator 31 and transmitter 32. Note that each component of transmission apparatus 30 is specifically implemented by a microcomputer, a processor, a dedicated circuit, or the like.

Transmission apparatus 30 is specifically a broadcasting server, and is an example of the aforementioned "transmission apparatus" of the first exemplary embodiment.

Generator 31 generates, for example, a transfer slot that stores a plurality of slots that each store one or more TLV packets that each store an IP packet (S151 of FIG. 36).

Generator 31 allows the IP packet stored in the TLV packet positioned at a head within the head slot within the transfer slot (hereinafter this IP packet is also referred to as an object IP packet) to contain the first reference clock information, such as NTP, that indicates time for reproduction of content (for example, broadcast content such as video and voice). The object IP packet is an IP packet that does not undergo header compression, and the first reference clock information is stored, for example, within the object IP packet in data structure different from data structure of the MMT packet.

In addition, generator 31 stores the second reference clock information that indicates time for reproduction of content in control information (TMCC) within the transfer slot.

Specifically, generator 31 includes a coder that codes the broadcast content, MMT multiplexer, IP multiplexer, TLV multiplexer, and the like. Here, the TLV packet is an example of a first transfer unit, the slot is an example of a second transfer unit, and the transfer slot is an example of a transfer frame.

Transmitter 32 transmits the transfer slot generated by generator 31 (transfer channel coded data containing the transfer slot) through broadcast (S152 of FIG. 36).

As also described in the aforementioned exemplary embodiments, transmission apparatus 30 can simplify the processes by which the reception apparatus acquires the reference clock information. Therefore, the reception apparatus can shorten time until acquiring the reference clock information.

In addition, by the second reference clock information that indicates time for reproduction of the content being stored in the control information within the frame, the reception apparatus can select which reference clock information to use from among the first reference clock information and the second reference clock information.

Fourth Exemplary Embodiment

The present exemplary embodiment describes a method for passing reference clock information to an upper layer and an interface thereof in a reception apparatus.

Figure 37:
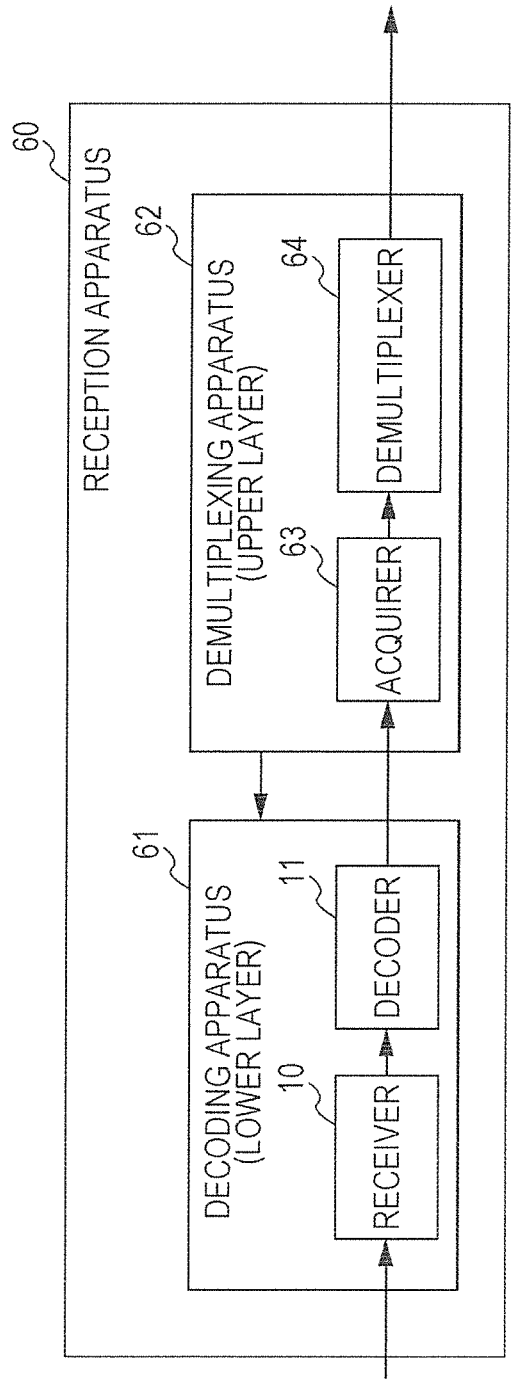
FIG. 37 is a block diagram of a reception apparatus according to a fourth exemplary embodiment.

FIG. 37 is a block diagram illustrating a configuration of reception apparatus 60 according to the present exemplary embodiment. Reception apparatus 60 includes decoding apparatus 61 that performs processes in a lower layer and demultiplexing apparatus 62 that performs processes in an upper layer. For example, decoding apparatus 61 and demultiplexing apparatus 62 are formed as different LSIs. Note that decoding apparatus 61 and demultiplexing apparatus 62 may be formed as a single LSI.

Decoding apparatus 61 includes receiver 10 and decoder 11. Receiver 10 receives transfer channel coded data. Decoder 11 extracts a TLV packet by decoding the transfer channel coded data received by receiver 10, and outputs the TLV packet to demultiplexing apparatus 62.

Demultiplexing apparatus 62 includes acquirer 63 and demultiplexer 64. Acquirer 63 acquires the TLV packet that is output from decoding apparatus 61. Demultiplexer 64 demultiplexes the TLV packet. For example, demultiplexer 64 includes processors other than receiver 10 and decoder 11 among processors illustrated in FIG. 32. Note that demultiplexer 64 may include processors other than receiver 10 and decoder 11 among processors included in reception apparatuses described in other exemplary embodiments. In addition, demultiplexer 64 does not need to include all of these processors, and may include some of these processors. In addition, demultiplexing apparatus 62 controls output of decoding apparatus 61.

In FIG. 32 and FIG. 33, when the reference clock information is contained in the lower layer, decoding apparatus 61 of the lower layer outputs the reference clock information to demultiplexing apparatus 62 without outputting a reproduced reference clock to demultiplexing apparatus 62 of the upper layer, and demultiplexing apparatus 62 reproduces the reference clock. This method will be supplemented and details will be described below.

The following describes a method described in NPTL 2 (Chapter 3: "Guideline for Time Information Transmission" in ARIB Standard ARIB STD-B44 (Ver. 2.0) "TRANSMISSION SYSTEM FOR ADVANCED WIDE BAND DIGITAL SATELLITE BROADCASTING"), and transmission and reception of the reference clock based on data structure.

Although the aforementioned standard describes a method for storing the reference clock information in TMCC, this standard does not prescribe specific transmission time information and operations in the reception apparatus, and it is difficult for the reception apparatus to acquire accurate time information. For example, although this standard describes that "the reference clock information to be stored in TMCC is time when this TMCC signal leaves a transmission server", this is not a specific definition.

TMCC control information (TMCC control signal) is generated in a separate system from a main signal of a main line system for each transfer frame in a transmission apparatus. After error correction coding and an interleave process are performed, the TMCC control information is dispersively mapped in the main signal for one frame (the main signal is also a signal after the error correction coding and interleave process are performed).

Figure 38:
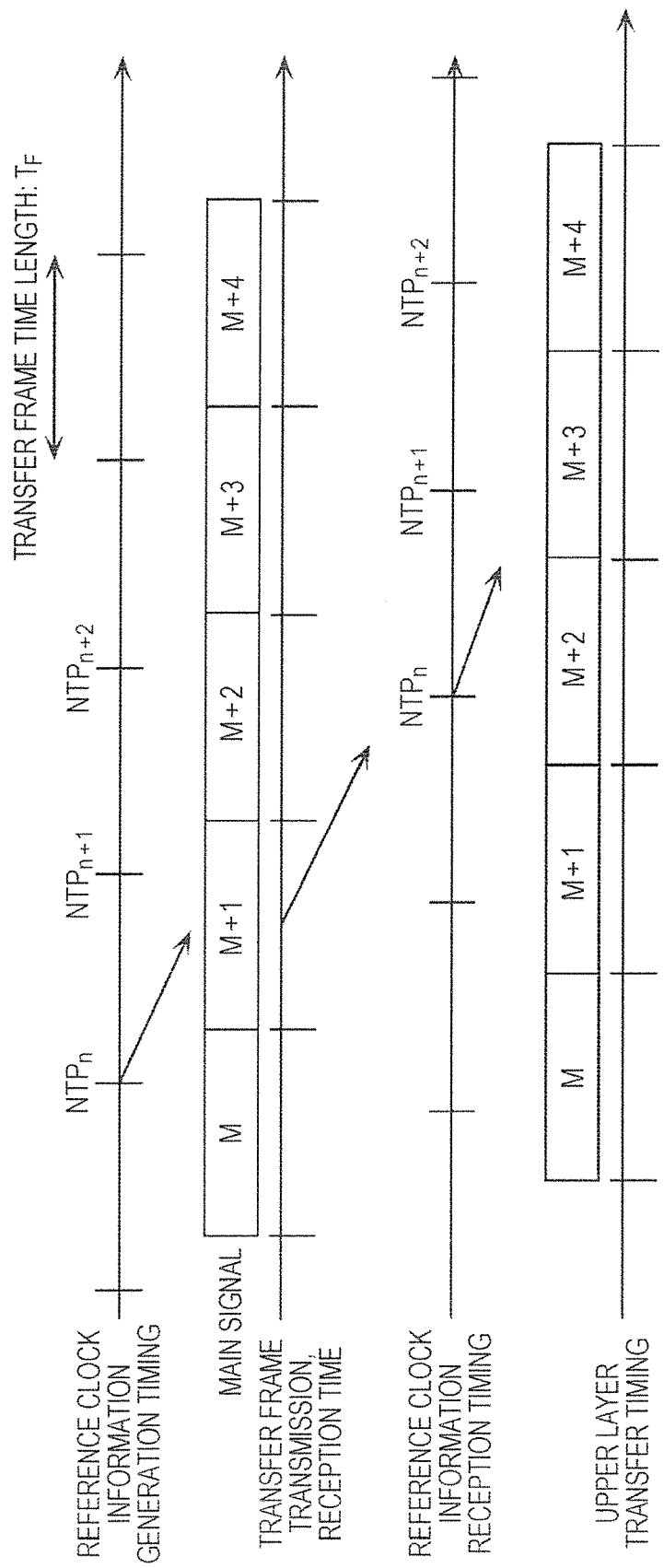
FIG. 38 is a diagram illustrating timing of a main signal and reference clock information according to the fourth exemplary embodiment.

FIG. 38 is a diagram illustrating timing of the main signal and the reference clock information.

When the reference clock information is stored in the TMCC control information, the reference clock information (NPTn, NPTn+1, ... in FIG. 38) is generated at intervals of a transfer frame time length ($T_F$). After being generated, the reference clock information is transmitted in a transfer frame unit. At this time, during a period from generation of the reference clock information to transmission of the transfer frame, processing delay occurs caused by error correction coding, interleave process, transfer frame transmission timing, and the like. In FIG. 38, NTPn is stored in transfer frame M+1 and transferred, whereas NTPn+1 is stored in transfer frame M+2 and transferred. Here, description is provided assuming that transfer delay is 0 and transmission time and reception time of the transfer frame are identical.

The reception apparatus receives data of one transfer frame, performs the error correction process and deinterleave process, and then extracts the TMCC control information. Accordingly, reception timing of the reference clock information is delayed by one or more frames.

Similarly, processing delay also occurs in transmission and reception of the main signal of the main line system due to error correction and interleave process.

However, since delay time differs in each of transmission and reception between the main line system and a TMCC control information system, a phenomenon occurs in which it is unclear to which time of the main line system time the time of the reference clock information acquired by the reception apparatus corresponds. In addition, the above standard has no description about prescription for timing at which to store in the upper layer the reference clock information acquired by the reception apparatus.

Therefore, according to the present exemplary embodiment, the reference clock information is stored in the TMCC control information by the following method.

The transmission apparatus sets, for example, time when the transfer frame of the main signal is transmitted from a server (for example, time when a head packet of the transfer frame is transmitted from the server) as the reference clock information to be stored in the TMCC control information.

The reception apparatus stores the reference clock information extracted from the TMCC control information at a head position of the next transfer frame, and then transfers the reference clock information to the upper layer.

By the above-described operation, a relative relationship caused by a difference in processing delay between the main line system and the TMCC control information system is an integral multiple of the transfer frame ($N \times T_F$) (N is an integer).

Furthermore, correction of $N \times T_F$ is performed in order to match a time relationship between the main line system and the reference clock information extracted from the TMCC control information.

When N is uniquely determined in advance, the transmission apparatus may store the time on which the N×TF correction is performed in the TMCC control information, and the reception apparatus may correct the time. When N is not uniquely determined, the reception apparatus estimates N and corrects the time.

In addition, when the reference clock information is transferred in the main signal (TLV packet) in addition to the TMCC control information, the transmission apparatus stores, in the TMCC control information, time identical to time to be stored in the TLV packet. Alternatively, the transmission apparatus stores in the TMCC control information the time obtained by performing correction according to $N \times T_F$ on the time to be stored in the TLV packet.

By applying correction of $N \times T_F$ to time information extracted from the TMCC control information, the reception apparatus calculates the time identical to the time to be stored in the main signal, and outputs the calculated time to the upper layer.

Note that as a method for extracting the reference clock information from the TMCC control information and transferring the corrected reference clock information to the upper layer, the reception apparatus may replace and output the reference clock information within the TLV packet.

In addition, since time that serves as reference is identical between in the reference clock information stored in the TMCC control information and in the reference clock information stored in the TLV packet, it is possible to handle these pieces of reference clock information as identical information in the upper layer.

In addition, reception apparatus 60 may switch with a selecting switch or the like between a method for outputting one of the reference clock information stored in the TMCC control information and the reference clock information stored in the TLV packet as a main signal (TLV packet), and a method for outputting both pieces of the information. In addition, demultiplexing apparatus 62 in the upper layer may select this switching in the lower layer. In addition, when decoding apparatus 61 is physically different from demultiplexing apparatus 62, one of the methods may be selected with a register or the like. In addition, when one of the reference clock information stored in the TMCC control information and the reference clock information stored in the TLV packet is output, selection may be made which one to output.

Here, when the reference clock information is transferred in the main signal (TLV packet), the reference clock information is stored in a head TLV packet of a head slot of the TLV stream in the transfer frame. Therefore, decoding apparatus 61 can uniquely identify the TLV packet in which the reference clock information is stored in the transfer layer.

However, since it is difficult for demultiplexing apparatus 62 of the upper layer to know boundary information of the transfer frame, demultiplexing apparatus 62 of the upper layer can determine whether the received TLV packet contains the reference clock information after analysis of the TLV packet header and the IP packet header. Therefore, according to the present exemplary embodiment, decoding apparatus 61 of the lower layer performs signaling (notification) to demultiplexing apparatus 62 of the upper layer such that the TLV packet is a head of the TLV stream in the transfer frame, or that the TLV packet contains the reference clock information. Accordingly, demultiplexing apparatus 62 of the upper layer can detect that the TLV packet contains the reference clock information without analyzing the IP packet header.

Examples of the method for performing signaling that the TLV packet is a head of the TLV stream in the transfer frame or that the TLV packet contains the reference clock information include a method for utilizing an undefined region in a packet type of the TLV packet.

For example, when the reference clock information is contained in an IPv4 packet, decoding apparatus 61 rewrites the TLV type from the TLV type that indicates the IPv4 packet to the TLV type that indicates the IPv4 packet containing the reference clock information. Then, decoding apparatus 61 outputs the rewritten TLV packet to demultiplexing apparatus 62. In addition, when the reference clock information is contained in an IPv6 packet, decoding apparatus 61 rewrites the TLV type from the TLV type that indicates the IPv6 packet to the TLV type that indicates the IPv6 packet containing the reference clock information. Then, decoding apparatus 61 outputs the rewritten TLV packet to demultiplexing apparatus 62.

In addition, reception apparatus 60 may have a switch or the like that allows selection whether decoding apparatus 61 performs signaling to demultiplexing apparatus 62 that the TLV packet contains the reference clock information. For example, this selection may be performed by demultiplexing apparatus 62.

The above processes enable acquisition of high-precision reference clock information and clock reproduction.

Figure 39:
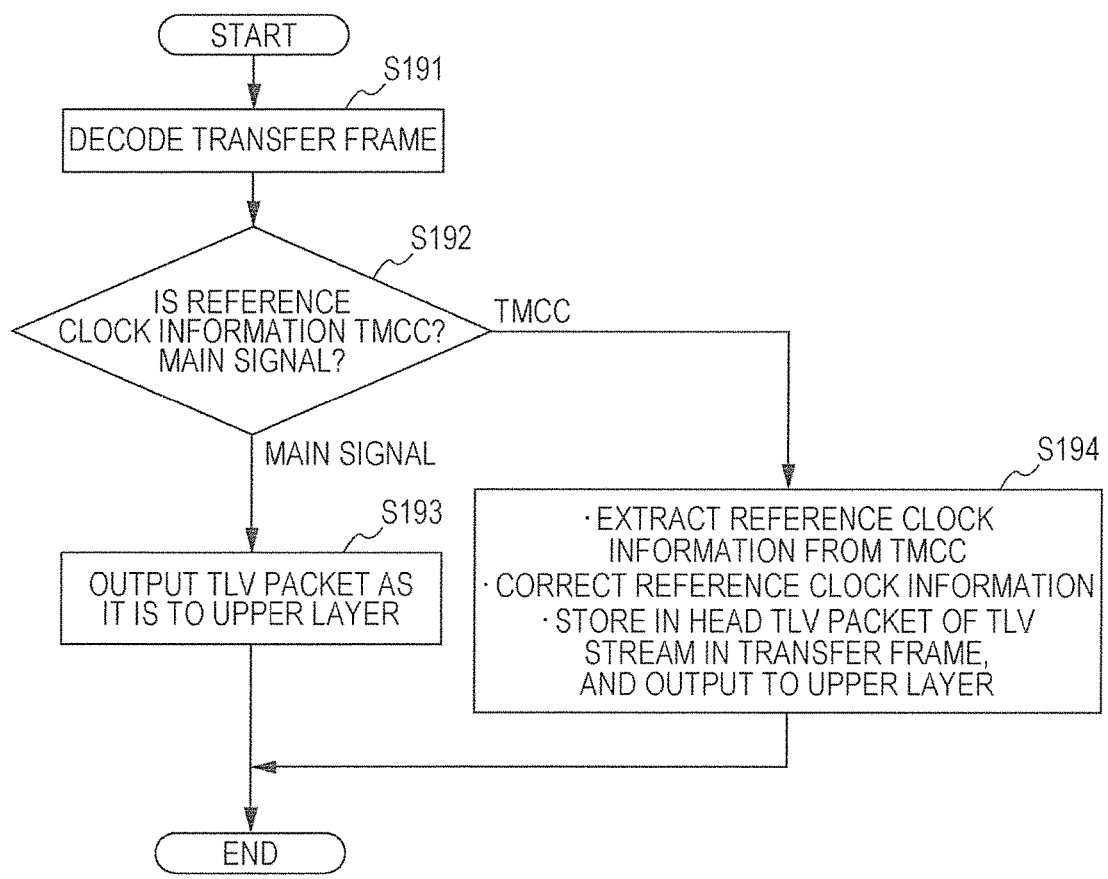
FIG. 39 is a diagram illustrating an operation flow in a decoder according to the fourth exemplary embodiment.

FIG. 39 is a diagram illustrating an operation flow in decoder 11 of reception apparatus 60.

First, decoder 11 decodes the transfer frame (S191), and subsequently determines whether the reference clock information to be processed is the reference clock information stored in TMCC or the reference clock information stored in the main signal (S192). When processing the reference clock information stored in the main signal (main signal in S192), decoder 11 outputs the TLV packet as it is to the upper layer (S193). Meanwhile, when processing the reference clock information stored in the TMCC control information (TMCC in S192), decoder 11 extracts the reference clock information from the TMCC control information, corrects the extracted reference clock information, stores the corrected reference clock information in the head TLV packet of the TLV stream in the transfer frame, and outputs the TLV packet to demultiplexing apparatus 62 (S194).

Figure 40:
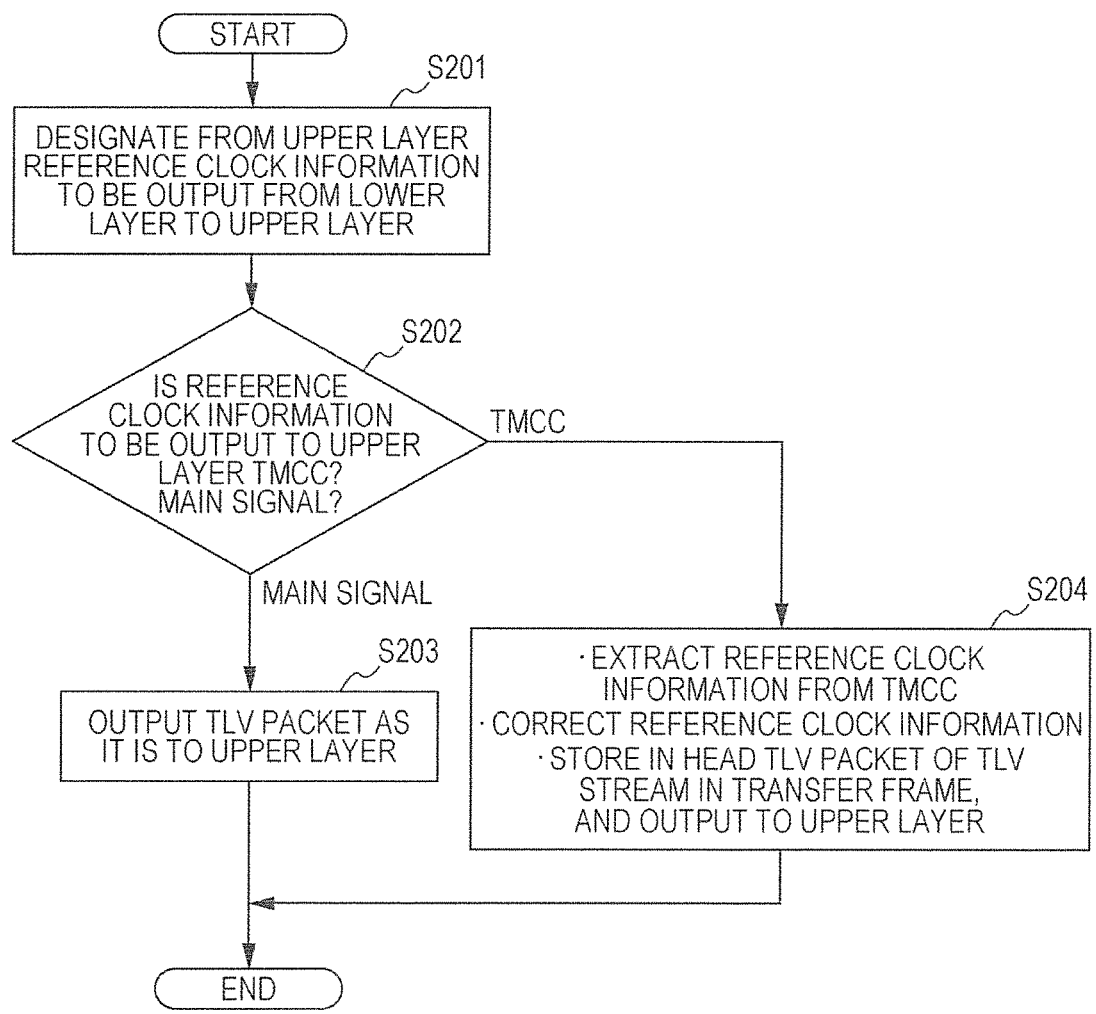
FIG. 40 is a diagram illustrating an operation flow in the reception apparatus according to the fourth exemplary embodiment.

FIG. 40 is a flowchart illustrating an operation of reception apparatus 60 including decoder 11.

First, demultiplexing apparatus 62 (upper layer) designates the reference clock information to be output to demultiplexing apparatus 62 from decoding apparatus 61 (S201). When the reference clock information to be output to demultiplexing apparatus 62 is the reference clock information contained in the main signal (main signal in S202), decoding apparatus 61 outputs the TLV packet as it is to demultiplexing apparatus 62 (S203). Meanwhile, when the reference clock information to be output to demultiplexing apparatus 62 is the reference clock information stored in the TMCC control information (TMCC in S202), decoding apparatus 61 extracts the reference clock information from the TMCC control information, corrects the extracted reference clock information, stores the corrected reference clock information in the head TLV packet of the TLV stream in the transfer frame, and outputs the TLV packet to demultiplexing apparatus 62 (S204).

Figure 41:
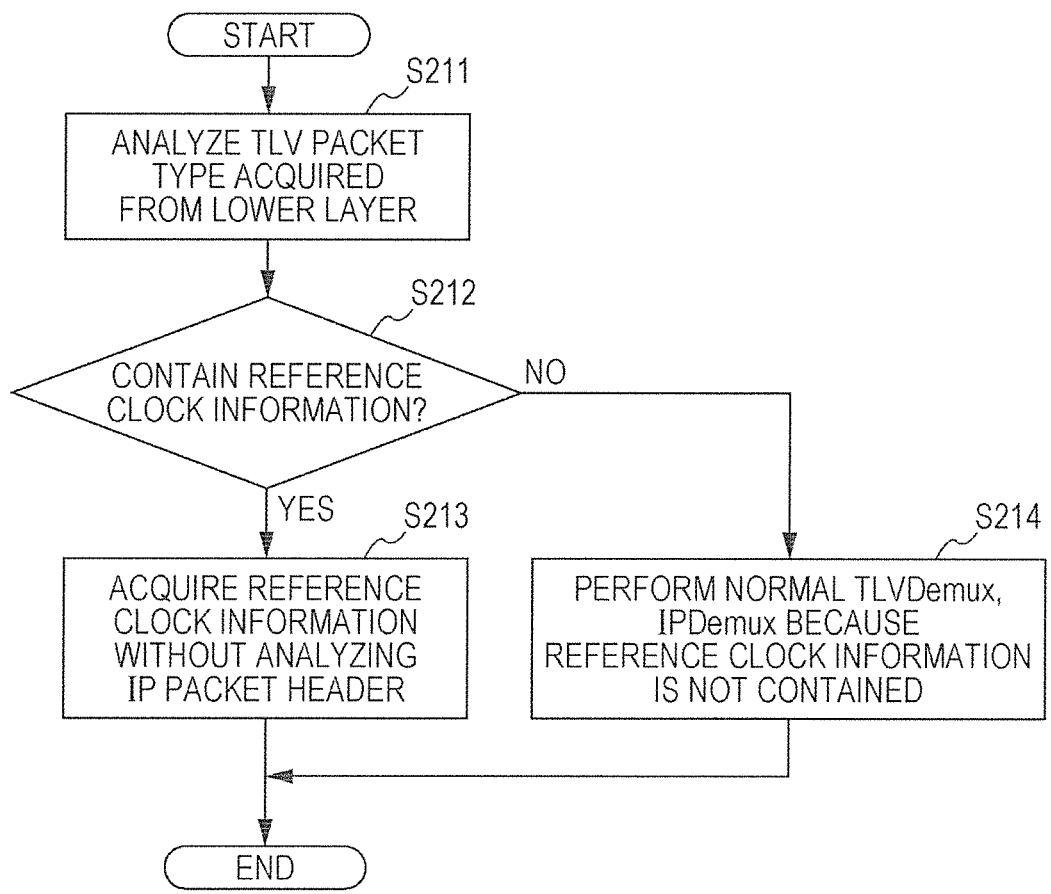
FIG. 41 is a diagram illustrating an operation flow in an upper layer according to the fourth exemplary embodiment.

FIG. 41 is a flowchart illustrating an operation of demultiplexing apparatus 62 when decoding apparatus 61 performs signaling in the TLV packet type about whether the TLV packet contains the reference clock information.

First, demultiplexing apparatus 62 analyzes the packet type of TLV packet acquired from decoding apparatus 61 (S211) to determine whether the TLV packet contains the reference clock information (S212).

When the TLV packet contains the reference clock information (Yes in S212), demultiplexing apparatus 62 acquires the reference clock information without analyzing the IP packet header (S213). This enables reduction in processing time and reduction in the amount of processes.

Meanwhile, when the TLV packet does not contain the reference clock information (No in S212), demultiplexing apparatus 62 performs normal TLVDemux and IPDemux because the TLV packet does not contain the reference clock information (S214).

Note that when an IP data flow of broadcasting services has two types including an IP data flow that stores the MMT packet and an IP data flow that stores the reference clock information, reception apparatus 60 identifies the reference clock information in accordance with the TLV packet type, eliminating the need for analysis of the IP address. This is because, by identifying the reference clock information in accordance with the TLV packet type, there is one IP data flow that stores the reference clock information and one IP data flow that stores the MMT packet, eliminating the need for analysis of the IP address for identifying the IP data flow that stores the MMT packet.

As described above, decoding apparatus 61 and demultiplexing apparatus 62 according to the present exemplary embodiment perform the following processes.

Figure 42:
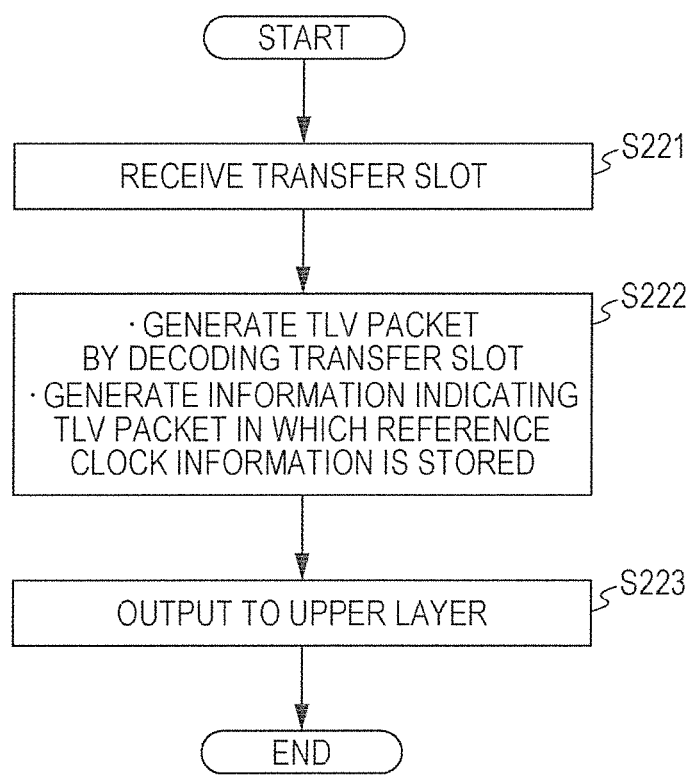
FIG. 42 is a diagram illustrating an operation flow of a decoding apparatus according to the fourth exemplary embodiment.

FIG. 42 is a flowchart illustrating an operation of decoding apparatus 61 according to the present exemplary embodiment.

First, receiver 10 receives the transfer slot (S221). The transfer slot is a transfer frame that stores a plurality of slots (second transfer units) that each contain one or more TLV packets (first transfer units) obtained by multiplexing the content, as illustrated in FIG. 13. In addition, as described above, the TLV packet positioned at a head within the head slot within the transfer slot contains the reference clock information.

Next, decoder 11 acquires a plurality of TLV packets by decoding the transfer slot. In addition, decoder 11 further generates information for identifying the TLV packet positioned at a head within the head slot within the transfer slot (S222).

Specifically, decoder 11 stores information indicating that the TLV packet contains the reference clock information as management information (packet type) of the TLV packet stored in the TLV packet positioned at a head within the head slot within the transfer slot. Alternatively, the information for identifying the TLV packet positioned at a head within the head slot within the transfer slot is information that indicates the TLV packet positioned at a head within the head slot within the transfer slot among the plurality of TLV packets within the transfer slot.

That is, decoder 11 generates the information for identifying the TLV packet positioned at a head within the head slot within the transfer slot, and notifies the information to demultiplexing apparatus 62. Specifically, decoder 11 adds the information within the TLV packet, or notifies the information to demultiplexing apparatus 62 by another signal.

Next, decoder 11 outputs the TLV packet containing the information, or the TLV packet and the information to demultiplexing apparatus (S223).

Figure 43:
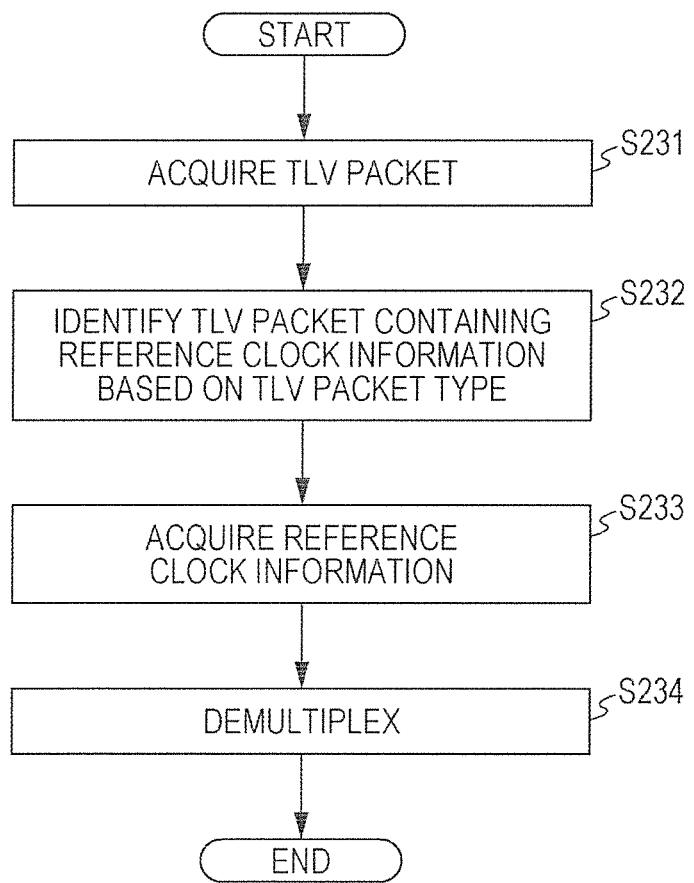
FIG. 43 is a diagram illustrating an operation flow of a demultiplexing apparatus according to the fourth exemplary embodiment.

FIG. 43 is a flowchart illustrating an operation of demultiplexing apparatus 62 according to the present exemplary embodiment.

First, acquirer 63 acquires the transfer slot from decoding apparatus 61 (S231). Here, when each of the TLV packets contains the reference clock information, the TLV packet contains the management information (packet type) indicating that the TLV packet contains the reference clock information.

Demultiplexer 64 identifies the TLV packet containing the reference clock information based on the management information (S232), and acquires the reference clock information from the identified TLV packet (S233). In addition, demultiplexer 64 acquires the content by demultiplexing the plurality of TLV packets (S234).

As described above, in reception apparatus 60 according to the present exemplary embodiment, the information for identifying the TLV packet containing the reference clock information is notified from decoding apparatus 61 to demultiplexing apparatus 62. This allows demultiplexing apparatus 62 to acquire the reference clock information without analyzing the IP packet header and the like, achieving reduction in the amount of processes and high speed.

Fifth Exemplary Embodiment

The present exemplary embodiment provides a supplementary description of the method, which has been described with reference to FIG. 11 to FIG. 17, for storing a TLV packet that contains reference clock information into a head TLV in the first slot of each relative stream of a transfer frame (transfer slot). Here, one transfer frame includes one or plural relative streams.

The pointer/slot information in the TMCC control signal shown in FIG. 16 indicates a head location of the first packet and an end location of the last packet, included in each slot. A top pointer value indicates the location of the first byte of the first packet in the slot by the number of bytes counted from a slot header excluding the slot header. Note that "0xFFFF" indicates that the first byte is absent. A last pointer value indicates the value obtained by adding 1 to the number of bytes counted from a slot header excluding the slot header up to the final byte of the last packet, in the slot, of which the placement has been completed. Note that "0xFFFF" indicates that the final byte is absent.

Figure 45:
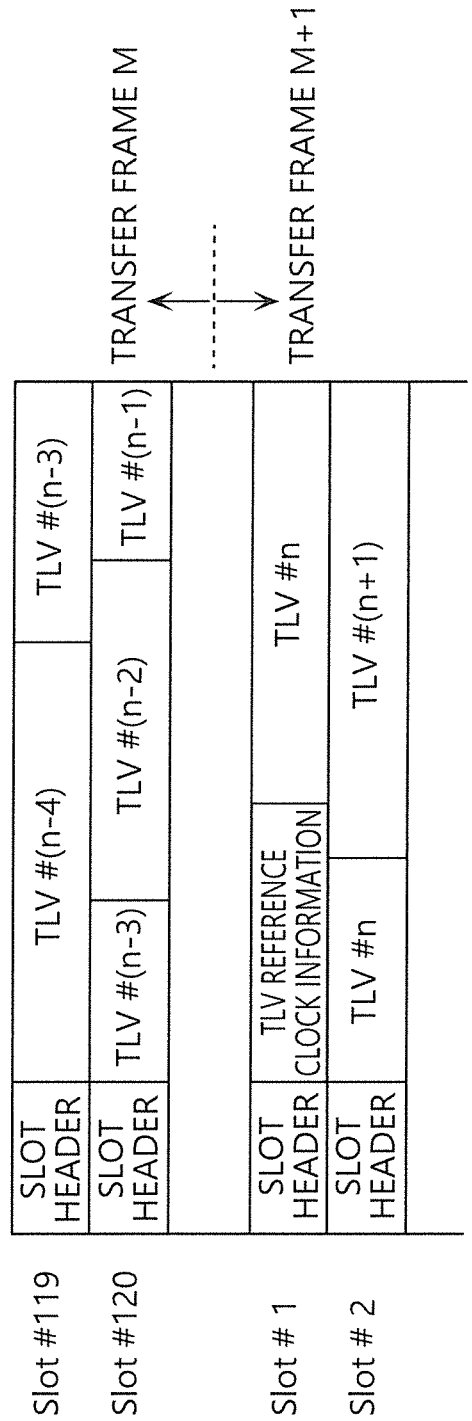
FIG. 45 shows a structure of the transfer frame according to the fifth exemplary embodiment.

For example, in the example of Slot #120 shown in FIG. 45, the top pointer indicates the first byte location of TLV #(n-2) whereas the last pointer indicates the value (first byte location of TLV #(n-1)) obtained by adding 1 to the final byte location of TLV #(n-2).

In the case where a TLV packet containing reference clock information is stored in the head of the first slot for each relative stream, the top pointer value in the slot/pointer information of the slot indicates 0. Naturally, a TLV packet is not stored across the frames, and shall be stored so that the location of the final byte of the last TLV packet stored in the last slot of each relative stream (hereinafter referred to as "final TLV packet") corresponds to the location of the final byte of the last slot of each relative stream (hereinafter referred to as "frame boundary of each relative stream").

Figure 44:
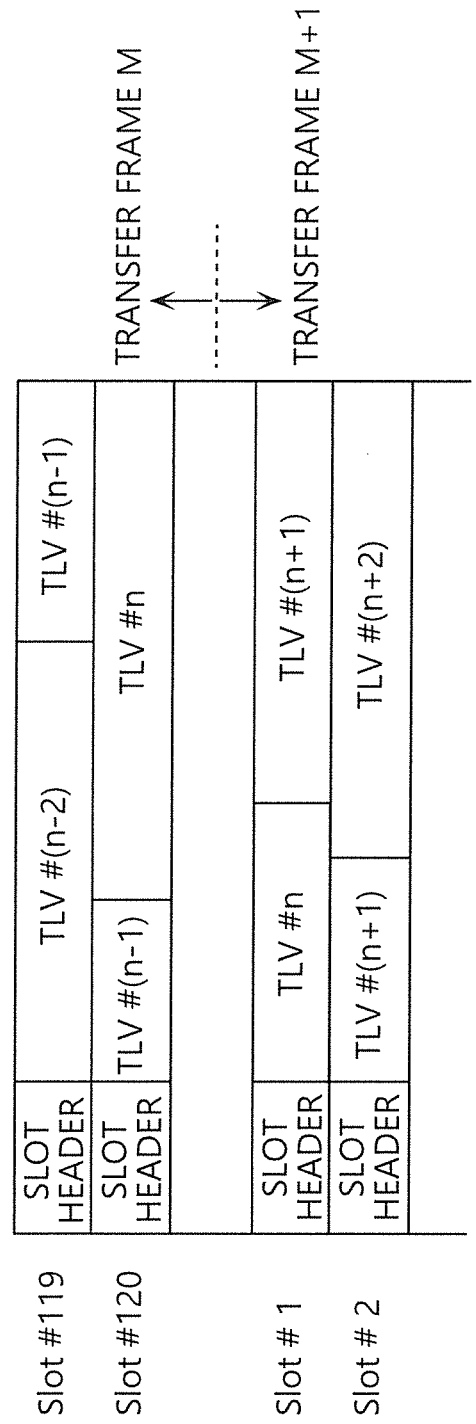
FIG. 44 shows a structure of a transfer frame according to a fifth exemplary embodiment.

FIG. 44 shows a structure of the transfer frame that does not include reference clock information, and FIG. 45 shows a structure of the transfer frame that includes reference clock information in the head of the first slot.

Here, the case where one frame is made up of 120 slots and all of the 120 slots make one relative stream is shown as an example. Slot #120 is the last slot of the relative stream of the transfer frame M, Slot #1 is the first slot of the relative stream of the transfer frame M+1, and the final byte of Slot #120 of the transfer frame M and the first byte, excluding the slot header, of Slot #1 of the transfer frame M+1 are the frame boundary of the TLV stream.

In FIG. 44, TLV #n is placed across the frames. In contrast, in FIG. 45, the TLV packet is not placed across the frames because the reference clock information is placed in the first slot (Slot #1) of the relative stream. In other words, the final byte of Slot #120 of the transfer frame M shall be placed so that its location corresponds to the location of the final byte of TLV #(n-1).

Here, transfer control information, an IP packet, or a compressed IP packet is stored in a TLV packet which has a variable-length packet size. When the variable-length TLV packets are sequentially placed into fixed-length transfer frames, the end of the final TLV packet does not coincide with a frame boundary in some cases. In such case, by placing a TLV packet having a data type that is NULL, the final byte of the final TLV packet can be adjusted to coincide with the frame boundary. Here, the NULL packet having the data type NULL is a packet for storing the data which is invalid and is not used in the reception apparatus.

Figure 46:
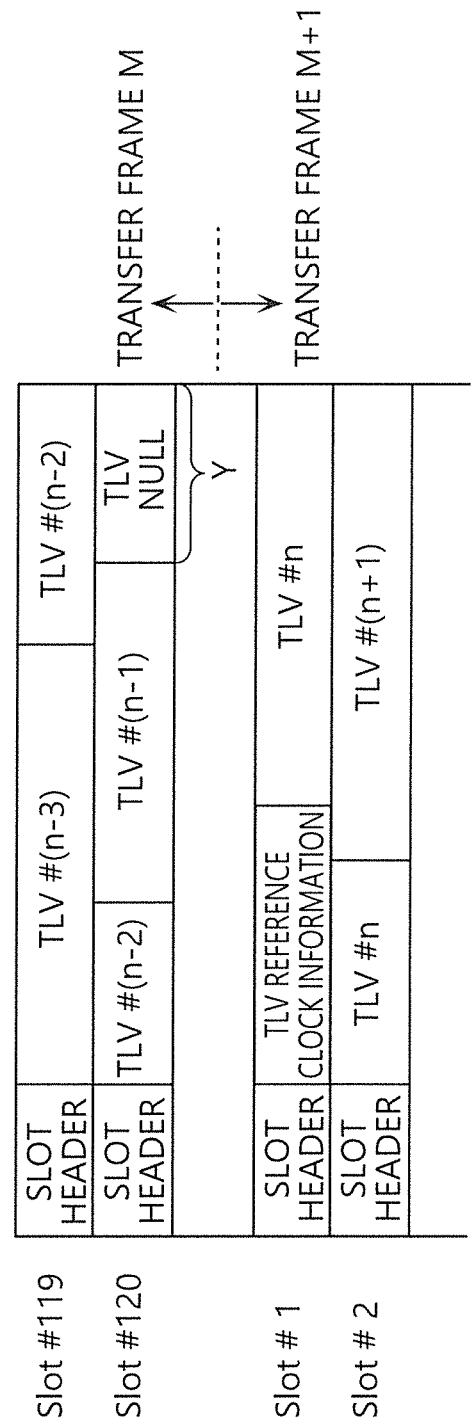
FIG. 46 shows a structure of the transfer frame according to the fifth exemplary embodiment.

As shown in FIG. 46, the TLV packets are placed into the frames for each relative stream. After the TLV packet TLV #(n-1) has been placed into a frame, a NULL packet is placed instead of the packet TLV #n because the packet TLV #n cannot be placed into the same frame. Accordingly, the final byte of the NULL packet coincides with the frame boundary.

However, in some cases, due to the data structure of the TLV packet, the restrictions on the transmission apparatus or the reception apparatus, and the like, minimum and maximum values might be provided for the size of the TLV packet. For example, because the header of the TLV packet is 4 bytes, even when NULL of 0 bytes is placed in the payload of the TLV packet, the TLV packet size is 4 bytes. Therefore, the minimum value of the TLV packet size in this case is 4 bytes. Moreover, due to the restrictions on the transmission apparatus or the reception apparatus, or the restrictions defined by the standards, the minimum value may also be restricted to a greater number of bytes (for example, 20 bytes). Similarly, the maximum value of the TLV packet size can be restricted in some cases.

For example, when the minimum value of the TLV packet is X_min bytes, the maximum value is X_max bytes, and the remaining bytes up to the frame boundary after the packet TLV #(n-1) has been placed is Y bytes, a problem is that a NULL packet cannot be placed when Y<X_min. For example, when X_min is 4 bytes, a NULL packet cannot be placed when the remaining bytes is less than 4 bytes.

The following describes the method according to the present exemplary embodiment for solving the abovementioned problem.

In the present exemplary embodiment, in the operation of sequentially placing TLV packets into a transfer frame and placing a NULL packet in the end, the remaining bytes up to a frame boundary and the numbers of bytes of at least two or more TLV packets to be stored are considered in advance so that the NULL packet is placed appropriately.

For example, a NULL packet is placed according to the following rules.

Figure 47:
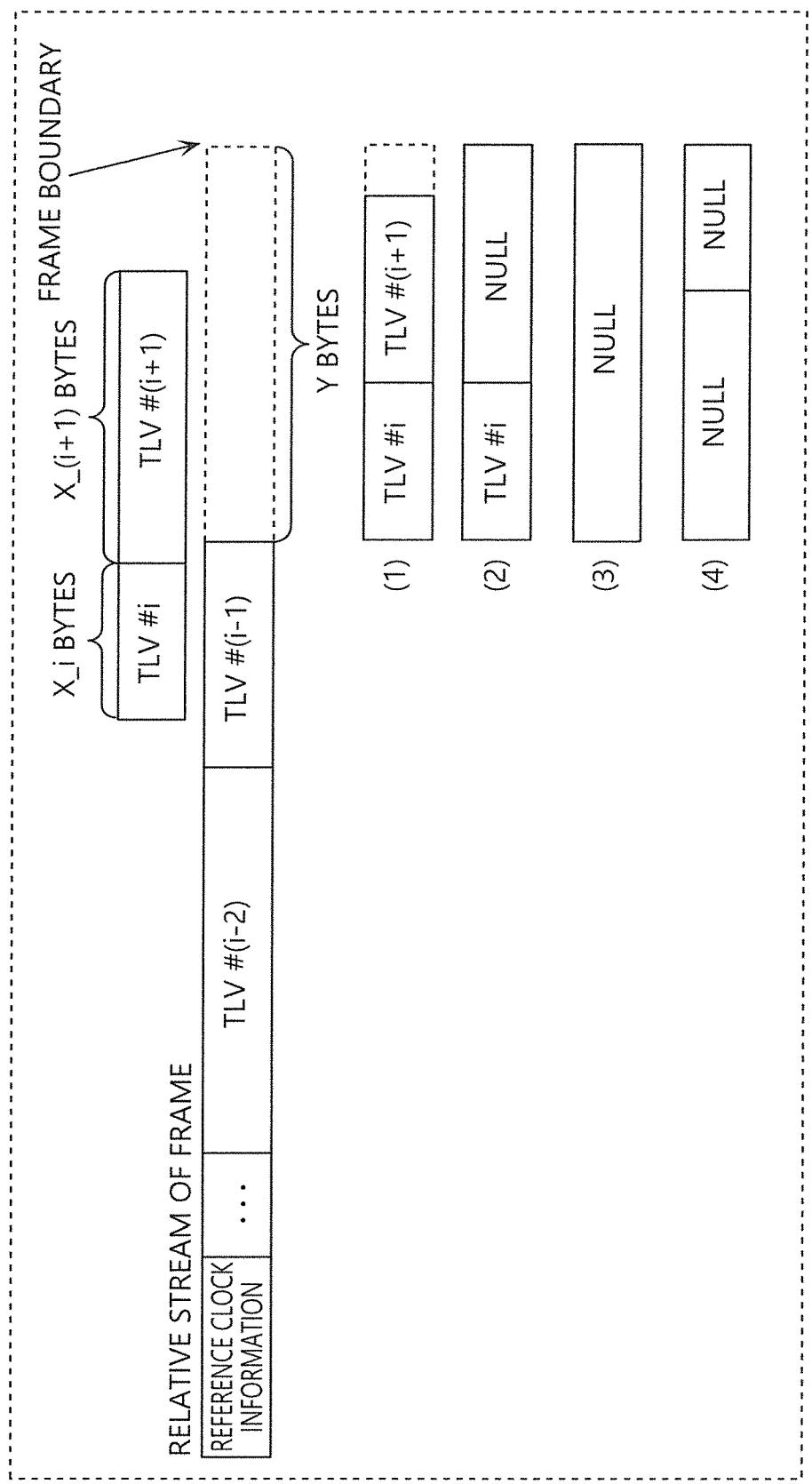
FIG. 47 is a diagram illustrating a transmission method according to the fifth exemplary embodiment.
Figure 48:
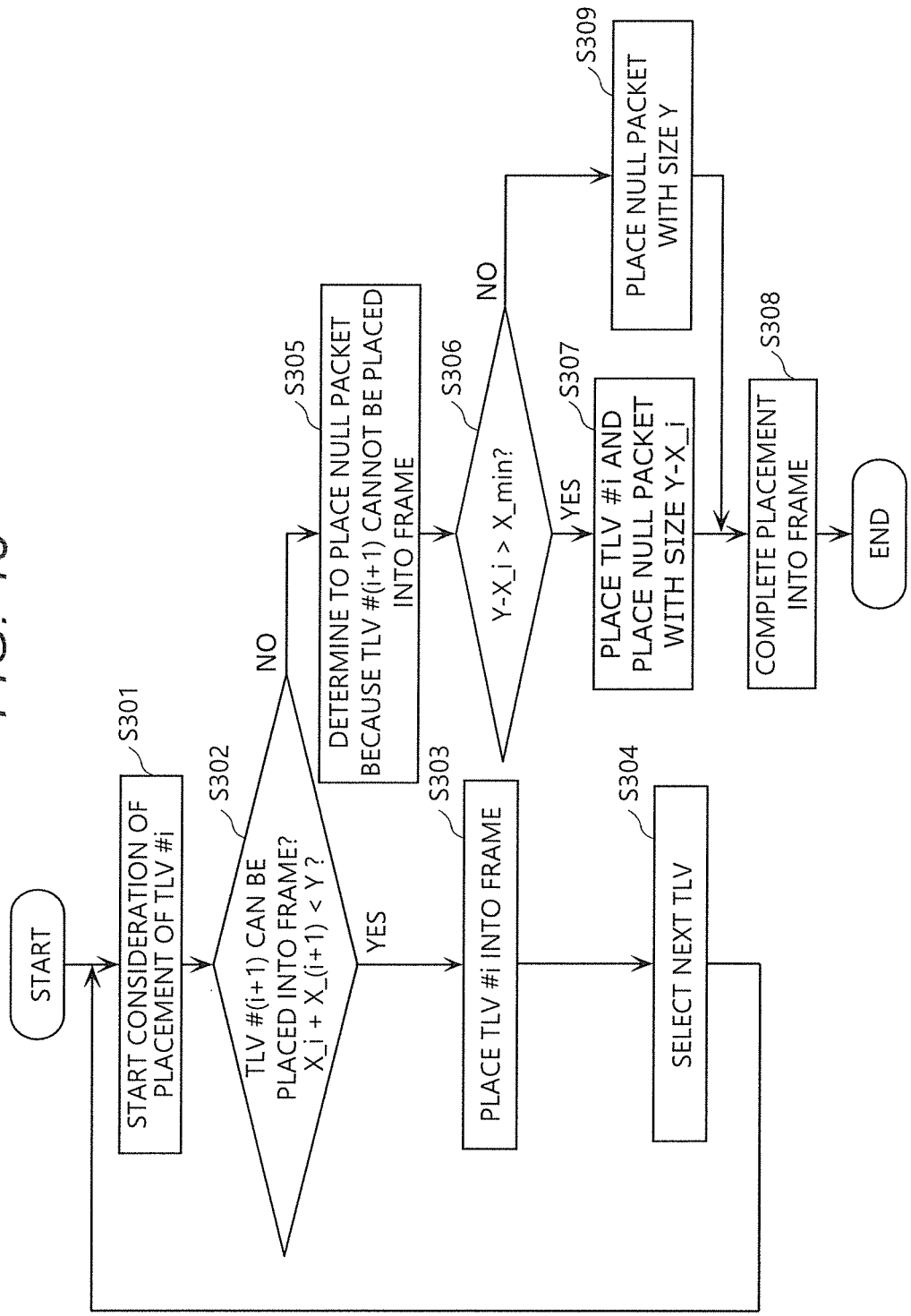
FIG. 48 is a diagram illustrating an operation flow in a transmission apparatus according to the fifth exemplary embodiment.

As shown in FIG. 47, in the relative stream of the frame, it is assumed that the remaining bytes up to the frame boundary is Y, the minimum packet size of the TLV packet is X_min bytes, the maximum packet size of the TLV packet is X_max bytes, the size of the TLV packet (TLV #i) to be placed is X_i bytes, and the size of the next TLV packet (TLV #(i+1)) is X_(i+1). FIG. 48 is a flowchart showing the operation performed by the transmission apparatus according to the present exemplary embodiment.

First, the transmission apparatus considers a placement of TLV #i that is a current TLV packet to be processed, into a frame (S301). Next, the transmission apparatus judges whether or not TLV #(i+1) that is the TLV packet following TLV #i can be placed into the frame (S302). Specifically, the transmission apparatus judges whether the total size of TLV #i and TLV #(i+1) is smaller than the remaining bytes. In other words, the transmission apparatus judges whether X_i+X(i+1)<Y is satisfied.

In the case where TLV #(i+1) can be placed into the frame (Yes in S302), the transmission apparatus places TLV #i into the frame (S303), as shown in (1) in FIG. 47. Next, the transmission apparatus selects TLV #(i+1) following TLV #i (S304) and performs the processing of Step S301 and the subsequent processing for the selected TLV #(i+1). In this case, i in each processing is incremented by 1.

In contrast, in the case where TLV #(i+1) cannot be placed into the frame (No in S302), the transmission apparatus determines to place a NULL packet into the remaining area (S305).

Next, the transmission apparatus judges whether the remaining area after the placement of TLV #i is greater than the minimum value of the TLV packet (S306). Namely, the transmission apparatus judges whether Y-X_i>X_min is satisfied.

In the case where the remaining area after the placement of TLV #i is greater than the minimum value of the TLV packet (Yes in S306), the transmission apparatus places TLV #i into the frame, generates a NULL packet with the size Y-X_i, places the generated NULL packet after TLV #i in the frame (S307), and completes the placement of the TLV packet into the frame (S308), as shown in (2) in FIG. 47.

In contrast, in the case where the remaining area after the placement of TLV #i is smaller than the minimum value of the TLV packet (No in S306), the transmission apparatus does not place the packet TLV #i but places a NULL packet of Y bytes into the frame (S309), as shown in (3) in FIG. 47, and completes the placement of the TLV packet into the frame (S308).

Note that, although not shown in FIG. 48, in the case where Y>X_max is satisfied, the transmission apparatus may place two or more NULL packets into the frame, as shown in (4) in FIG. 47.

As has been described above, in the case where a minimum value of a variable-length NULL packet size is restricted when variable-length TLV packets are stored into a fixed-length data area (or the number of slots), in a frame, which is defined for each relative stream, the transmission apparatus according to the present exemplary embodiment always monitors, for instance, the numbers of bytes of at least two variable-length TLV packets and the remaining bytes up to a frame boundary. Thus, the final TLV packet can be adjusted to coincide with the frame boundary.

Note that the example in FIG. 47 illustrates the method for placing a TLV packet after considering in advance the remaining bytes up to a frame boundary and the numbers of bytes of the two TLV packets to be placed. However, the transmission apparatus may place a NULL packet after considering the numbers of bytes of three or more TLV packets.

In addition, in the example in FIG. 47, the transmission apparatus judges whether it is the end of a frame in Step S302, and in the case where it is the end of a frame (No in S302), the transmission apparatus places a NULL packet only or both the packet TLV #i and a NULL packet according to whether the remaining area after the placement of TLV #i is greater than the minimum value of the TLV packet. However, in the case of not judging in advance whether it is the end of a frame, the transmission apparatus can place a NULL packet after considering the number of bytes of only one TLV packet (TLV #i).

For example, in the case where: (1) the size of TLV #i is smaller than the remaining bytes Y; and (2) the remaining area Y-Xi after the placement of TLV #i is greater than the minimum value of the TLV packet, the transmission apparatus may place TLV #i, and in the case where at least one of (1) and (2) is not satisfied, the transmission apparatus may not place the packet TLV #i but place a NULL packet.

Note that, as shown in FIG. 47, by judging in advance whether it is the end of a frame, the amount of processing performed by the transmission apparatus can be reduced because the occurrence frequency of the processing in Step S305 and the subsequent processing can be lowered.

Moreover, as is apparent from FIG. 46 and so on, the TLV packet that has not been placed into a target frame is placed into the next frame in the frame boundary. Specifically, this TLV packet is placed immediately after the TLV packet that contains the reference clock information of the next frame.

The following describes a variation of the present exemplary embodiment.

The transmission apparatus may perform padding instead of placing a final TLV packet to coincide with a frame boundary. Here, in the case where a TLV packet that contains reference clock information is stored in a head of the first slot of each relative stream of a transfer frame, it is obvious that the TLV packet is not placed across the frames. Therefore, it is defined that padding is performed onto an area from the last pointer value (the value obtained by adding 1 to the final byte of a final TLV packet) up to a frame boundary. In this case, the reception apparatus can determine, by the last pointer value, the number of bytes required for padding.

Figure 49:
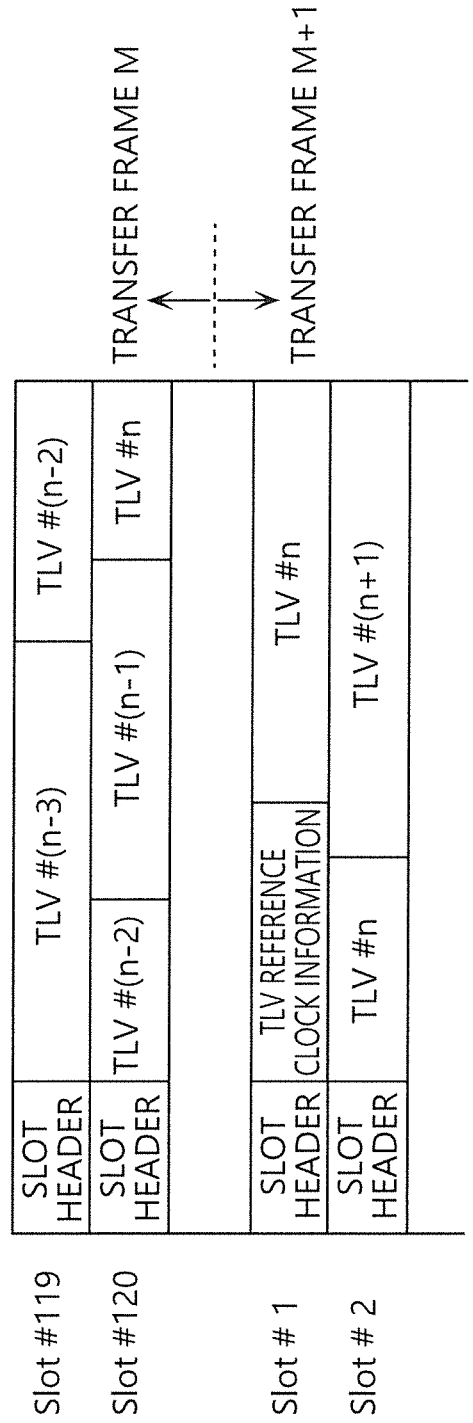
FIG. 49 is a diagram showing a structure of the transfer frame according to the fifth exemplary embodiment.

Moreover, as shown in FIG. 49, the transmission apparatus may place, into a transfer slot, a TLV packet that does not contain reference clock information beyond (across) reference clock information while placing the TLV packet that always contains reference clock information into a head of the first slot of each relative stream.

In FIG. 49, TLV #n is placed across the frames. In addition, TLV #n is placed across the TLV packet that contains reference clock information. In this case, the location and the size of the TLV packet that contains reference clock information are already known. Therefore, the top pointer value may indicate the byte obtained by adding 1 to the final byte of the TLV packet that contains reference clock information or may indicate the first byte of a TLV packet other than the TLV packet that contains reference clock information, instead of the first byte (=0) of the TLV packet that contains reference clock information.

Moreover, up to 16 relative streams are stored in a transfer frame and a TLV packet that contains reference clock information is placed in each of the relative streams. In the case where a reference clock that is common to plural relative streams is provided, the same information is always stored in a head of each relative stream of the frame.

Therefore, in the case of judging that the reference clock is provided, a demodulator of the reception apparatus judges that the respective reference clocks indicate the same bit (value), and performs the processing of averaging the bits. This can improve the ability to correct errors.

Moreover, in the case where the data that is the same as the reference clock information stored in the TLV packet is stored in the area for the TMCC control information, the reception apparatus judges that the reference clock information of the TMCC control information and the reference clock information of the TLV packet indicate the same bit, and performs the same processing as described above. This can improve the ability to correct errors.

Furthermore, because the reception quality of the TMCC control information is high, the reception apparatus may replace the reference clock information of the TLV packet with the reference clock information of the TMCC control information.

In such case, in order to improve the error correction ability, the reference clock information of the TMCC control information and the reference clock information of the TLV packet that contains reference clock information need to indicate the same bit. Therefore, scrambling or power spread may not be performed onto the TLV packet that contains reference clock information. Scrambling sequence may be identically set for each relative stream and the TLV packet that contains reference clock information may be scrambled with the same scrambling sequence.

Figure 50:
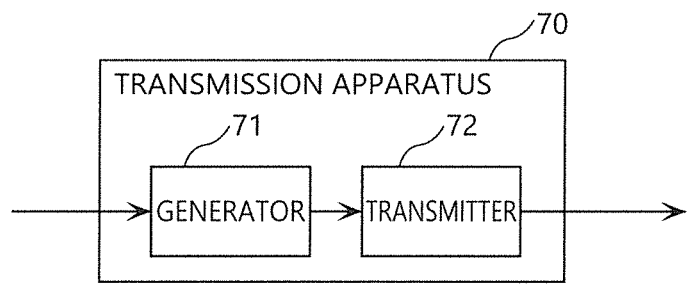
FIG. 50 is a block diagram of the transmission apparatus according to the fifth exemplary embodiment.

As has been described above, the transmission apparatus according to the present exemplary embodiment transmits content through broadcasting. FIG. 50 is a block diagram of transmission apparatus 70 according to the present exemplary embodiment. Transmission apparatus 70 includes generator 71 and transmitter 72.

Figure 51:
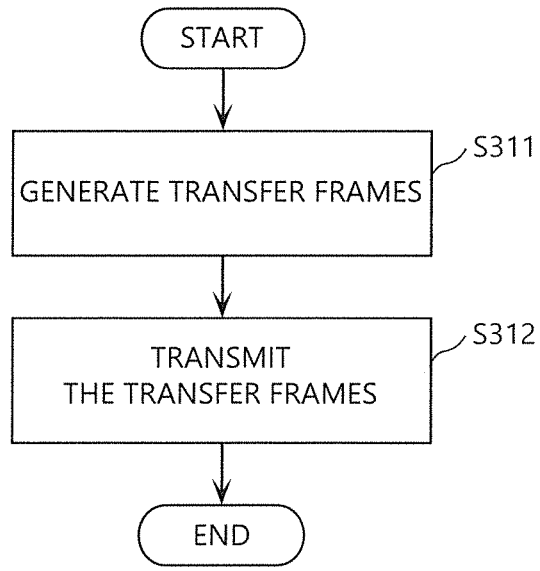
FIG. 51 is a diagram showing an operation flow in the transmission apparatus according to the fifth exemplary embodiment.

FIG. 51 is a flowchart of the transmission method employed by transmission apparatus 70. First, generator 71 generates plural fixed-length frames for transfer (transfer frames), each of which includes plural variable-length first transfer units (TLV packets) in which content is to be stored (S311), as shown in FIG. 46 and so on. Specifically, generator 71 sequentially places plural first transfer units into plural frames, and in the placement, even when the data size of a current first transfer unit to be processed is smaller than the remaining capacity of a current frame to be processed, the current first transfer unit to be processed is placed into the next frame.

More specifically, a minimum data size is defined for the first transfer unit. As shown in FIG. 46 to FIG. 48, in the case where the remaining capacity after the placement of the current first transfer unit into the current frame is smaller than the minimum data size (No in S306), generator 71 places the current first transfer unit into the next frame. In the case of placing the current first transfer unit into the next frame (No in S306), generator 71 places a NULL packet into the remaining part of the current frame (S309).

Generator 71 also places, as a first transfer unit positioned at a head of each frame, a clock transfer unit which is a first transfer unit that contains reference clock information. In the case of placing a current first transfer unit to be processed into the next frame, generator 71 places the current first transfer unit immediately after the clock transfer unit of the next frame.

Next, transmitter 72 transmits the frames generated by generator 71 (S312).

Thus, transmission apparatus 70 can place plural transfer units into plural frames in such a manner that a first transfer unit is not placed across the frames. This can simplify the processing in the reception apparatus, and therefore, the amount of processing in the reception apparatus can be reduced.

Moreover, the reception apparatus according to the present exemplary embodiment receives plural frames from transmission apparatus 70. The system according to the present exemplary embodiment includes transmission apparatus 70 and the reception apparatus which have been described above.

Note that in the aforementioned exemplary embodiments, components may each include dedicated hardware or may be implemented through execution of a software program suitable for each component. The components may be each implemented by a program execution unit, such as a CPU and a processor, reading and executing the software program recorded in a recording medium such as a hard disk and a semiconductor memory.

In addition, the components may be circuits. These circuits may constitute one circuit as a whole, or may be different circuits. In addition, each of these circuits may be a general-purpose circuit or a dedicated circuit.

For example, in each of the aforementioned exemplary embodiments, processes executed by a specific processor may be executed by another processor. In addition, an order of the plurality of processes may be changed or the plurality of processes may be executed in parallel.

The reception apparatus (reception method) and transmission apparatus (transmission method) according to one or more aspects have been described above based on the exemplary embodiments. However, the present disclosure is not limited to these exemplary embodiments. The present exemplary embodiments to which various modifications conceivable by a person skilled in the art are made and aspects that are made by combining elements of different exemplary embodiments may also be included within the scope of the one or more aspects as long as such aspects do not depart from the gist of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The transmission method according to the present disclosure is useful as a transmission method capable of reducing the processes performed on the reception side when the MMT scheme is applied to a broadcasting system.

What is claimed is:

1. A transmission method for transmitting content through broadcasting, the transmission method comprising:
 generating a plurality of frames for transfer, each of which includes a plurality of first transfer units in which the content is to be stored, each of the plurality of frames having a fixed length, each of the plurality of first transfer units having a variable length; and
 transmitting the plurality of frames generated,
 wherein the generating includes sequentially placing the plurality of first transfer units into the plurality of frames, a minimum data size is defined for the first transfer unit, in the generating, when a remaining data capacity up to a frame boundary of a current frame after placement of a current first transfer unit into the current frame is equal to or greater than the minimum data size, the current first transfer unit is placed into the current frame, in the generating, when the remaining data capacity up to the frame boundary of the current frame after the placement of the current first transfer unit into the current frame is smaller than the minimum data size, the current first transfer unit is placed into a next frame, and in the generating, when the current first transfer unit is placed into the next frame, a NULL packet is placed into a remaining part of the current frame.

2. The transmission method according to claim 1,
wherein in the generating:
- a clock transfer unit which is a first transfer unit containing reference clock information is placed as a first transfer unit positioned at a head of each frame; and
- when the current first transfer unit is placed into the next frame, the current first transfer unit is placed immediately after the clock transfer unit of the next frame.

3. The transmission method according to claim 2,
wherein the reference clock information is a Network Time Protocol (NTP).

4. The transmission method according to claim 1,
wherein each of the plurality of first transfer units includes an Internet Protocol (IP) packet in which the content is to be stored.

5. The transmission method according to claim 4,
wherein the content is stored in an MPEG Media Transport (MMT) packet in the IP packet.

6. The transmission method according to claim 1,
wherein each of the plurality of frames includes a plurality of second transfer units each having a fixed length, and each of the plurality of second transfer units includes one or more of the plurality of first transfer units.

7. The transmission method according to claim 6,
wherein each of the plurality of first transfer units is a Type Length Value (TLV) packet, each of the plurality of second transfer units is a slot under an advanced transfer scheme, and each of the plurality of frames is a transfer slot under the advanced transfer scheme.

8. A transmission apparatus which transmits content through broadcasting, the transmission apparatus comprising:
- a generator which generates a plurality of frames for transfer, each of which includes a plurality of first transfer units in which the content is to be stored, each of the plurality of frames having a fixed length, each of the plurality of first transfer units having a variable length; and
- a transmitter which transmits the plurality of frames generated, wherein the generator sequentially places the plurality of first transfer units into the plurality of frames, a minimum data size is defined for the first transfer unit, when a remaining data capacity up to a frame boundary of a current frame after placement of a current first transfer unit into the current frame is equal to or greater than the minimum data size, the generator places the current first transfer unit into the current frame, when the remaining data capacity up to the frame boundary of the current frame after the placement of the current first transfer unit into the current frame is smaller than the minimum data size, the generator places the current first transfer unit into a next frame, and when the current first transfer unit is placed into the next frame, the generator places a NULL packet into a remaining part of the current frame.

9. A system comprising:
the transmission apparatus according to claim 8; and
a reception apparatus which receives the plurality of frames from the transmission apparatus.

* * * * *